(12) United States Patent
Fu et al.

(10) Patent No.: US 11,765,324 B1
(45) Date of Patent: Sep. 19, 2023

(54) SECURITY LIGHT-CAM WITH CLOUD-BASED VIDEO MANAGEMENT SYSTEM

(71) Applicant: Kuna Systems Corporation, San Bruno, CA (US)

(72) Inventors: Sai-Wai Fu, Los Altos, CA (US); Murali Sharma, Walnut Creek, CA (US); Harold G. Sampson, Sunnyvale, CA (US); Ognian Mitzev, San Ramon, CA (US)

(73) Assignee: KUNA SYSTEMS CORPORATION, San Mateo, CA (US)

( * ) Notice: Subject to any disclaimer, the term of this patent is extended or adjusted under 35 U.S.C. 154(b) by 358 days.

(21) Appl. No.: 17/241,410

(22) Filed: Apr. 27, 2021

Related U.S. Application Data

(63) Continuation-in-part of application No. 17/164,595, filed on Feb. 1, 2021, now Pat. No. 11,678,011, and a continuation-in-part of application No. 17/026,647, filed on Sep. 21, 2020, now Pat. No. 11,212,886, which is a continuation-in-part of application No. 16/850,944, filed on Apr. 16, 2020, now Pat. No.
(Continued)

(51) Int. Cl.
| | |
|---|---|
| *H04N 7/18* | (2006.01) |
| *G06V 20/40* | (2022.01) |
| *G06V 20/52* | (2022.01) |
| *G06V 40/10* | (2022.01) |
| *H04N 23/56* | (2023.01) |
| *H04N 23/62* | (2023.01) |
| *H04N 23/661* | (2023.01) |

(52) U.S. Cl.
CPC ............. *H04N 7/183* (2013.01); *G06V 20/40* (2022.01); *G06V 20/52* (2022.01); *G06V 40/103* (2022.01); *H04N 23/56* (2023.01); *H04N 23/62* (2023.01); *H04N 23/661* (2023.01)

(58) Field of Classification Search
CPC ........ H04N 7/183; H04N 23/56; H04N 23/62; H04N 23/661; G06V 20/40; G06V 20/52; G06V 40/103
See application file for complete search history.

(56) References Cited

U.S. PATENT DOCUMENTS

| | | | |
|---|---|---|---|
| 9,728,023 B2 * | 8/2017 | Johnson | .................. H04N 7/181 |
| 2015/0264296 A1 * | 9/2015 | Devaux | .................... H04N 5/77 386/226 |
| 2017/0300755 A1 * | 10/2017 | Bose | ...................... H04N 7/181 |

* cited by examiner

Primary Examiner — Gevell V Selby
(74) Attorney, Agent, or Firm — Christopher P. Maiorana, PC

(57) ABSTRACT

The invention concerns a system comprising a security device and a computing device. The security device may be configured to generate first video frames at a first bitrate and second video frames at a second bitrate from pixel data, store the video frames and metadata comprising index information for the video frames, communicate the second video frames and the metadata. The computing device may be configured to receive a video selection and a command from a user via an interface, display the second video frames using the interface in response to the video selection and communicate the command to the security device. The command may enable a modification to the first video frames stored on the security device using the display of the second video frames on the interface based on the metadata. The security device may generate modified first video frames in response to the command.

19 Claims, 13 Drawing Sheets

Related U.S. Application Data

11,195,398, which is a continuation-in-part of application No. 16/540,309, filed on Aug. 14, 2019, now Pat. No. 11,599,392.

(60) Provisional application No. 63/051,930, filed on Jul. 15, 2020, provisional application No. 62/969,400, filed on Feb. 3, 2020, provisional application No. 62/961,401, filed on Jan. 15, 2020, provisional application No. 62/835,167, filed on Apr. 17, 2019.

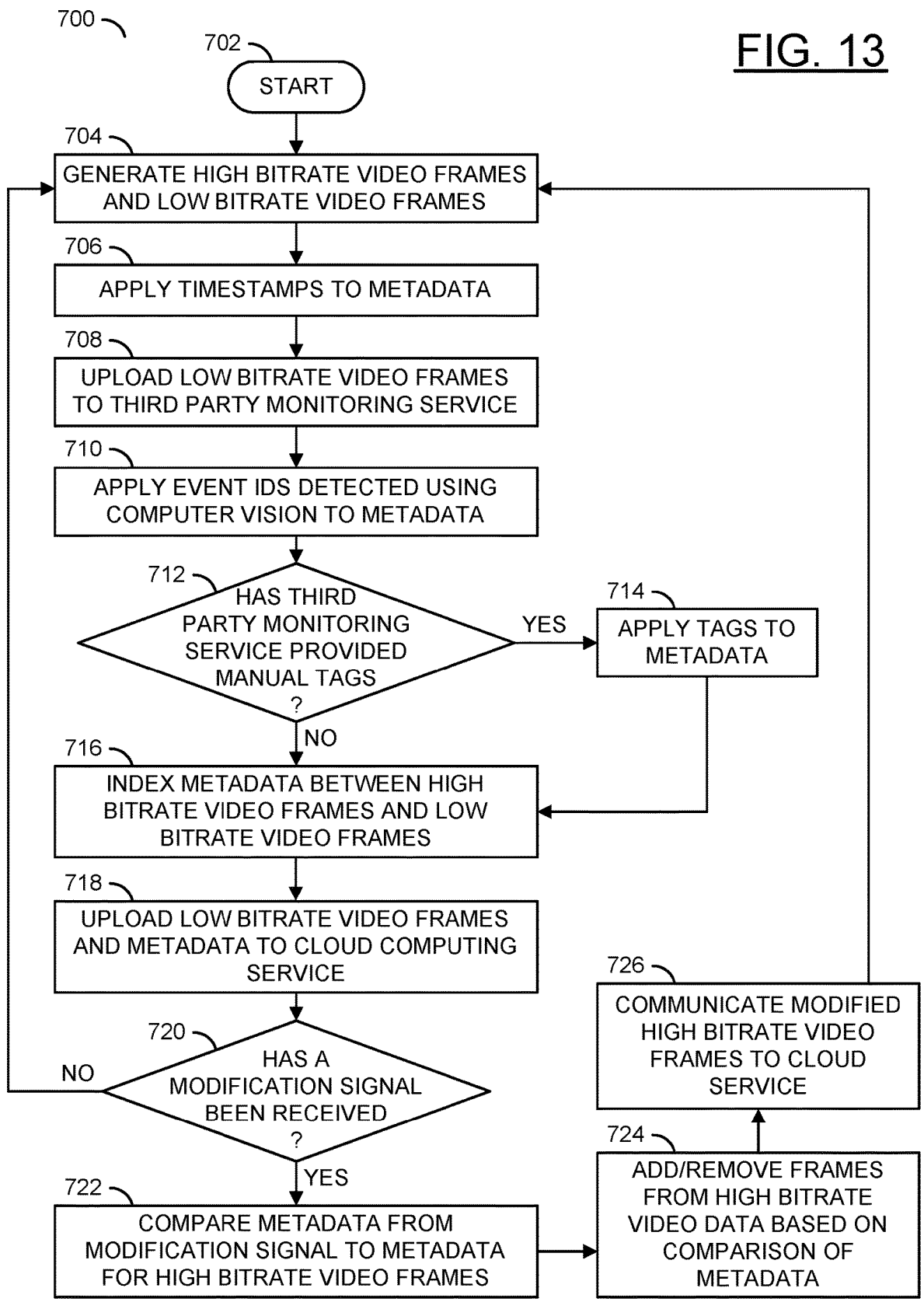

SECURITY LIGHT-CAM WITH CLOUD-BASED VIDEO MANAGEMENT SYSTEM

This application relates to U.S. Provisional Application 63/051,930, filed on Jul. 15, 2020, U.S. application Ser. No. 16/540,309, filed on Aug. 14, 2019 and U.S. Application Ser. No. 17/026,647, filed on Sep. 21, 2020. This application also relates to U.S. application Ser. No. 17/164,595, filed on Feb. 1, 2021, which relates to U.S. Provisional Application 62/969,400, filed on Feb. 3, 2020. This application also relates to U.S. application Ser. No. 16/850,944, filed on Apr. 16, 2020, which relates to U.S. Provisional Application No. 62/835,167, filed on Apr. 17, 2019 and U.S. Provisional Application No. 62/961,401, filed on Jan. 15, 2020. Each of the mentioned applications are hereby incorporated by reference in its entirety.

FIELD OF THE INVENTION

The invention relates to communicating video data generally and, more particularly, to a method and/or apparatus for implementing a security light-cam with cloud-based video management system.

BACKGROUND

Security devices that capture video are popular for consumers, prosumers, and commercial operations. Security cameras can provide various levels of security services. Some security cameras (i.e., dumb security cameras) merely record video footage to a recording system. Dumb security cameras can be low cost, but rely on manually managing locally recorded video and manually reviewing video footage, which can be expensive and time-consuming. Since video has to be reviewed, the level of security can be low since the video has to be reviewed after an incident occurs. Some security cameras (i.e., IP cameras) offer access to cloud-based features. Instead of recording video locally, the video can be uploaded to a cloud service for storage. Some IP cameras offer advanced features such as video analysis, remote access to recorded video and real-time detection of events by utilizing the processing capabilities of cloud computing services. Individual IP cameras can be sold for a relatively inexpensive price since hardware costs for local storage and processing are not as significant. The storage and processing are offloaded from the IP camera to the cloud computing service. The various processing and storage features can be sold as a service (i.e., a recurring fee).

Relying on cloud services for storage and computing can be convenient and cost-effective for the end-users of the IP cameras. However, for the vendor that sells the IP camera and manages the associated services, the cloud services for storage and computing come at a significant cost. Uploading and storing large amounts (i.e., 24/7 footage) of high bitrate video is expensive. Bandwidth costs associated with uploading video from the IP camera to the cloud service and subsequent downloading from the cloud service by end-users to local devices (i.e., smartphones) are higher with high bitrate video. Similarly, storage costs associated with storing video are higher with high bitrate video. There are additional storage costs for enabling quick access to stored data. Processing high bitrate video (i.e., for transcoding to different formats or bitrates, or for detecting objects) also has higher costs for high bitrate video (i.e., more pixels to process). However, end-users want fast access to their video data and usually want high quality video.

It would be desirable to implement a security light-cam with cloud-based video management system.

SUMMARY

The invention concerns a system comprising a smart security device and a computing device. The smart security device may be configured to capture pixel data of an area, generate first video frames at a first bitrate and second video frames at a second bitrate from the pixel data, analyze the first video frames to detect objects, store the first video frames, the second video frames and metadata comprising index information for the first video frames and the second video frames, communicate the second video frames and the metadata and control a light in response to the objects detected. The computing device may be configured to receive the second video frames and the metadata from the smart security device, generate an interface configured to search the second video frames based on the metadata, receive a video selection input and an input command from a user via the interface, display a subset of the second video frames using the interface in response to the video selection input and communicate the input command to the smart security device. The subset of the second video frames may be selected from the second video frames by matching the video selection input with the metadata. The input command may enable the user to select a modification to the first video frames stored on the smart security device using the display of the subset of the second video frames on the interface based on the metadata. The smart security device may generate a subset of the first video frames by performing the modification to the first video frames in response to the input command and communicate the subset of the first video frames to the computing device.

BRIEF DESCRIPTION OF THE FIGURES

Embodiments of the invention will be apparent from the following detailed description and the appended claims and drawings.

FIG. 13 is a flow diagram illustrating a method for generating index information for high bitrate video frames.

DETAILED DESCRIPTION OF THE EMBODIMENTS

Figure 1:
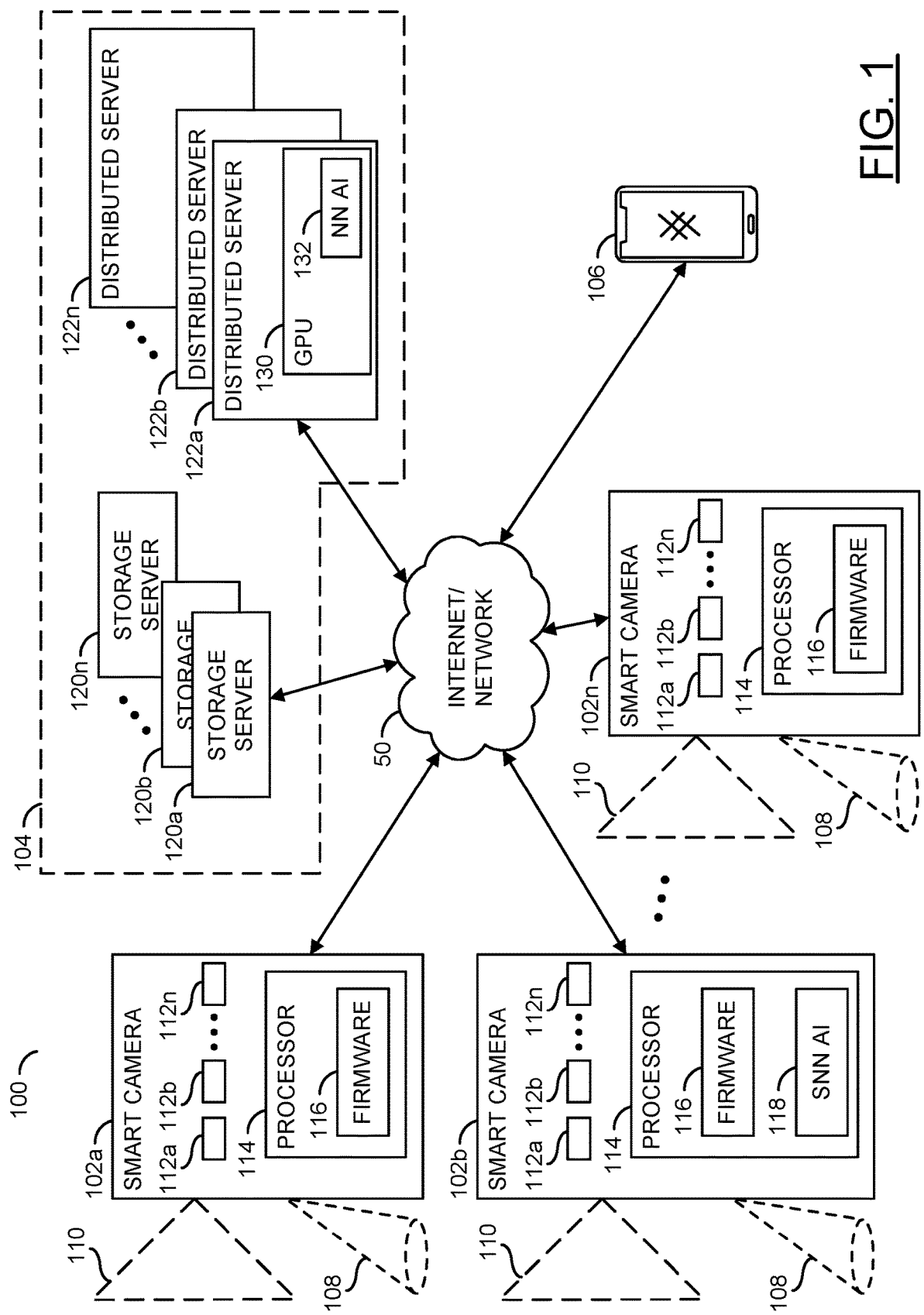
FIG. 1 is a diagram illustrating a system according to an example embodiment of the present invention.

Embodiments of the present invention include providing a security light-cam with cloud-based video management system that may (i) reduce costs for a vendor of the security light-cam, (ii) reduce the bandwidth used between the security light-cam, an end-user and a cloud computing service, (iii) reduce an amount of storage capacity used on a cloud computing service, (iv) reduce an amount of processing performed by a cloud computing service, (v) implement local storage for high bitrate data, (vi) index high bitrate video data and low bitrate video data to enable synchronization, (vii) enable end-users to edit low bitrate video using an online interface to access data stored in the cloud computing service, (viii) synchronize modifications made to low bitrate video to locally stored high bitrate video, (ix) provide edited versions of high bitrate video to the cloud computing service instead of a full high bitrate video stream, and/or (x) be implemented as one or more integrated circuits.

Embodiments of the present invention may be configured to implement security lights with cameras and a cloud-based video management system (VMS). The smart security lights/cameras may be configured to capture video and record video data. In an example, 24/7 video may be generated. The smart security camera lights may be configured to implement local storage (e.g., edge storage) for storing high bitrate video (e.g., high resolution and/or high frame rate video). The cloud-based VMS may be configured to store a low bitrate version (e.g., low resolution and/or low frame rate video) of the high bitrate video. The cloud-based VMS may enable end users to perform modifications to the video based on the low bitrate video stored in the cloud-based VMS. The modifications to the low bitrate video may be synchronized with the high bitrate video stored locally on the smart security lights. The smart security lights may upload the modified high bitrate video to the cloud-based VMS, which may then be provided to the end users.

The smart security devices may be configured to index the video captured. Indexing the video captured may enable the high bitrate video and the low bitrate video to be synchronized. For example, the indexing may enable the modifications made to the low bitrate video stored in the cloud-based VMS to be applied to the high bitrate video stored on the smart security devices. The indexing may be performed based on metadata.

Embodiments of the present invention may be configured to implement forensic analysis of the video captured. The smart security devices may be configured to generate video for real-time video surveillance. However, most end-users may not continually monitor real-time video footage. The end-users may review video footage that has been previously recorded and stored. The indexed low bitrate video may enable quick searching by the end users to find particular events and/or review video captured at a particular time. The modifications made to the low bitrate video may be synchronized with the high bitrate video and then uploaded to the cloud-based VMS. The end users may review the modified high bitrate video to have a high quality (e.g., high resolution, high frame rate) view of the desired event.

The modifications performed to the low bitrate video stored in the cloud-based VMS may comprise various operations. In one example, the modifications may comprise select a first and the last video frame to extract. The end users may search the low bitrate video by performing fast-forward, rewind, pause, skip, etc. The end users may search the low bitrate video using a time-based search (e.g., by date, hour, minute, second, etc.). The end users may search the low bitrate video based on the information in the metadata (e.g., search by person detected, search by detection of a loiterer, search by when a loiterer was undeterred by a security response, search by detection of a vehicle, etc.). The end users may review the modifications made by playing back the modified low bitrate video (e.g., a preview may be generated). The modifications may comprise editing the extracted low bitrate video by trimming and/or adding video frames.

Communicating the low bitrate video instead of the high bitrate video to enable the end-users to perform modifications may provide a savings in bandwidth (e.g., reduced amount of data communicated) and/or a savings in storage in the cloud-based VMS. Less data stored may result in lower costs. Synchronizing the modifications made to the low bitrate video data with the locally stored high bitrate data may enable the end-users to operate on the low bitrate video data in the cloud-based VMS that has similar video content as the high bitrate video data locally stored on the edge device. The modified high bitrate video may be communicated to the cloud-based VMS. The end-user may access the modified high bitrate video. Communicating the low bitrate video and the modified high bitrate video may comprise communicating less data than communicating all of the high bitrate video. Communicating the modified high bitrate video may enable the end-user to have access to a high quality (e.g., high resolution, high frame rate) view of the desired event, to provide a balance between bandwidth and cost savings with providing the end-user with a satisfying customer experience (e.g., even though the end-user may not have access to all of the high bitrate video via the cloud-based VMS, the end-user still has access to a high bitrate video of the desired video content).

Referring to FIG. 1, a diagram illustrating a system according to an embodiment of the present invention is shown. The system 100 is shown. The system 100 may implement security light cameras with cloud-based video management. The cloud-based video management may enable the system 100 to restrain an amount of data that may be uploaded to a cloud-based server that implements an advanced neural network and/or restrain an amount of data stored on the cloud-based server. Restraining the amount of data uploaded may provide a cost savings in data transmission fees, data storage fees and/or data processing fees that may be charged by an internet service provider and/or an operator of the cloud-based server.

The system 100 may comprise a network 50, blocks (or circuits) 102a-102n, a block (or circuit) 104 and/or a block (or circuit) 106. The network 50 may be a local network and/or a wide area network. For example, the network 50 may be the internet. The circuits 102a-102n may implement smart camera lights and/or smart camera lights. The circuit 104 may implement a cloud computing service (e.g., a cluster of server computers). The circuit 106 may implement a user device. The number, type and/or arrangement of the components of the system 100 may be varied according to the design criteria of a particular implementation.

The smart camera lights 102a-102n may be configured to capture video data and/or generate light. A dotted shape 108 and a dotted shape 110 is shown extending from each of the smart camera lights 102a-102n. The dotted shape 108 may represent a light emitted by the smart camera lights 102a-102n. The light 108 may comprise a spotlight (e.g., light directed and/or focused at a particular location and/or object), general illumination (e.g., lighting for visibility and/or decorative effect) and/or colored lighting (e.g., flashing red and blue lights that provide a deterrent effect). The light 108 may be emitted, turned on/off, dimmed/brightened and/or strobed. In an example, the light 108 may comprise a combination of three lights (e.g., a white light at 10,000 lumens, a red light at 1,000 lumens and a blue light at 1,000 lumens).

The dotted shape 110 may represent one field of view (e.g., a boundary, a range, etc.) captured by a capture device (e.g., a camera) implemented by each of the smart camera lights 102a-102n. The video data may comprise pixel data, video frames arranged from the pixel data and/or images of the field of view 110. In the example shown, each of the smart camera lights 102a-102n may have one field of view 110. However, one or more of the smart camera lights 102a-102n may capture more than one field of view (e.g., implement dual cameras, implement a multi-camera system, etc.).

Each of the smart camera lights 102a-102n are shown comprising blocks (or circuits) 112a-112n and/or a block (or circuit) 114. The circuits 112a-112n may implement various components of the smart camera lights 102a-102n that enable functionality and/or features of the smart camera lights 102a-102n. In one example, one or more of the components 112a-112n of the smart camera lights 102a-102n may comprise a lighting element. The circuit 114 may implement a processor. The smart camera lights 102a-102n may comprise other components (not shown). In some embodiments each of the smart camera lights 102a-102n may have differing capabilities and/or features. The number, type and/or arrangement of the components of the smart camera lights 102a-102n. Details of the smart camera lights 102a-102n may be described in association with FIGS. 4-5.

The components 112a-112n may be configured to monitor and/or sense the environment (e.g., an area) near the smart camera lights 102a-102n. For example, one or more of the components 112a-112n may be sensors. In an example, one of the components 112a-112n may be an image sensor configured to capture video frames. One or more of the components 112a-112n may be configured store and/or communicate data. In one example, one or more of the components 112a-112n may be a memory. In another example, one or more of the components 112a-112n may be a communication device configured to upload information to the internet 50.

The processor 114 may be configured to read information from the components 112a-112n, write information to the components 112a-112n and/or execute computer readable instructions. In one example, the processor 114 may be a video processor (e.g., a processor configured to execute computer readable instructions and comprising dedicated hardware for processing video data). The processor 114 may be configured to perform video processing operations to generate video frames. The processor 114 may be configured to select still images from the video frames to upload to the distributed servers 122a-122n. The processing capability of processor 114 may be limited due to size constraints, power constraints, cost constraints, etc.

The processor 114 may comprise a block (or circuit) 116. The block 116 may be a firmware for the processor 114. The firmware 116 may configure how the processor 114 interacts with the components 112a-112n and/or the input/output generated by the processor 114. The smart camera lights 102a-102n may operate based on the firmware 116. Updating the firmware 116 may alter functionality and/or features performed by the smart camera lights 102a-102n. In some embodiments, the smart camera lights 102a-102n may be updated to operate with the system 100 by updating the firmware 116.

One or more of the smart camera lights 102a-102n may comprise a block (or circuit) 118. In the example shown, only the smart camera 102b is shown comprising the block 118. The block 118 may be a module of the processor 114. The module 118 may be a neural network. For example, the processor 114 may implement a neural network artificial intelligence. The neural network artificial intelligence 118 may be configured to detect objects in the video frames generated by the processor 114.

The processor 114 may be configured to detect one or more triggering events. The triggering events may occur when a particular input is determined to be above some pre-determined threshold value. The processor 114 may analyze input detected by one or more of the components 112a-112n to determine whether the detected input is above the pre-determined threshold. In one example, if one of the components 112a-112n is a passive infrared (PIR) sensor configured to detect motion, then the triggering event may be when the processor 114 determines that the input from the PIR sensor is above a threshold for motion. In another example, if one of the components 112a-112n is a microphone, then the triggering event may be when the processor 114 determines that the incoming audio is above a particular audio level and/or matches a particular frequency pattern.

In some embodiments, the triggering event may occur in response to an output of the processor 114. For example, the processor 114 may be configured to analyze video frames generated by the processor 114. In one example, the processor 114 may be configured to analyze the video frames for a particular amount of motion and/or a change in the amount of light to detect a triggering event (e.g., an amount of motion above a threshold amount of motion). In another example, the processor 114 may use the neural network artificial intelligence module 118 to determine whether the video frame has captured a particular type of object (e.g., a person, an animal, a vehicle, a package, etc.) to detect the triggering event. The type of input and/or the threshold for the triggering event may be varied according to the design criteria of a particular implementation.

The cloud computing service 104 may comprise a number of blocks (or circuits) 120a-120n and/or a number of blocks (or circuits) 122a-122n. The circuits 120a-120n may each implement a storage server. The circuits 122a-122n may each implement a distributed server. The cloud computing service 104 may comprise other components (not shown). The number, type and/or arrangement of the components of the cloud computing service 104 may be varied according to the design criteria of a particular implementation.

The storage servers 120a-120n may be configured to provide storage resources. The storage servers 120a-120n may be implemented as a remote server computer. The storage servers 120a-120n may be provided as a service. The storage servers 120a-120n may not be dedicated to the system 100 (e.g., multiple end-users may access the storage resources of the storage servers 120a-120n). For example, the storage servers 120a-120n may comprise multiple, redundant storage media (e.g., hard disk drives, solid state drives, etc.) to enable multiple end-users to access data stored across the storage servers 120a-120n. Access to the storage resources of the storage servers 120a-120n may be fee-based (e.g., based on an amount of total storage resources used).

The storage servers 120a-120n may comprise a hierarchy of data storage. One tier of storage may be archival storage (e.g., glacial storage). Archival storage may be suited to data that may be accessed infrequently and/or data that may not be needed urgently. The storage servers 120a-120n may enable data to be retrieved from archival storage but may implement a waiting period (e.g., content may be available after waiting a day). Another tier of storage may be on-demand retrieval. On-demand storage may enable fast access to data (e.g., content may be available instantly or after a shorter amount of time than archival storage, such as a one hour wait). On-demand storage may have greater costs associated in terms of bandwidth costs and storage costs. In an example, archival storage may be on the order of 1000 times less expensive than on-demand storage. However, archival storage may not be suitable for real-time video access by end-users and/or providing notifications of events detected.

The distributed servers 122a-122n may be configured to provide computational resources. The distributed servers 122a-122n may be provided as a service. The distributed servers 122a-122n may not be dedicated to the system 100 (e.g., multiple end-users may access the computational resources of the distributed servers 122a-122n). The distributed servers 122a-122n may provide tiered services to enable access to the computational resources. Access to the computational resources of the distributed servers 122a-122n may be fee-based (e.g., based on an amount of computational resources used at one time, based on how long the computational resources are used, based on a percentage usage of the computational resources, etc.). For example, when an end-user accesses more of the computational resources of the distributed servers 122a-122n, then more fees may be charged. Generally, the system 100 may keep fees lower by restraining usage of the computational resources of the distributed servers 122a-122n (e.g., providing selected video frames and/or providing a low bitrate version of video frames instead of a full high bitrate video stream). For example, the computational resources of the distributed servers 122a-122n may use less computational resources and/or time when operating on low bitrate video streams compared to high bitrate video streams (e.g., less video data to operate on results in less computational resources used).

The distributed servers 122a-122n may each comprise a block (or circuit) 130. The circuit 130 may be a graphics processing unit (e.g., a video card). The graphics processing unit 130 may comprise a block (or circuit or module) 132. The module 132 may be a neural network artificial intelligence module. For example, the graphics processing unit 130 may be customized to perform neural network operations of the neural network artificial intelligence module (e.g., a dedicated neural network card). The distributed servers 122a-122n may comprise other components (such as a CPU, RAM, storage, etc., not shown). The number, type and/or arrangement of the components of the distributed servers 122a-122n may be varied according to the design criteria of a particular implementation.

The neural network artificial intelligence module 132 may be configured to perform a detection. In an example, the smart camera lights 102a-102n may perform an initial detection to detect the triggering event. The neural network artificial intelligence module 132 may perform a second (e.g., additional) detection. The neural network artificial intelligence module 132 may be configured to perform advanced image analysis (e.g., object detection, object classification, facial recognition, computer vision, etc.) corresponding to the triggering event. In an example, the advanced image analysis may be configured to not only detect that a person is in the video frame but also that the person is a mail carrier (e.g., wearing a uniform, carrying a package, etc.). In another example, the advanced image analysis may be configured to not only detect that a vehicle is in the video frame but also detect the make and model of the vehicle. The advanced image analysis performed by the neural network artificial intelligence module 132 may use more computing resources than the computing resources used by the smart camera lights 102a-102n to detect the triggering event. In an example, the advanced image analysis may use more computing resources than the processor 114 for analyzing the video frames for a particular amount of motion and/or a change in the amount of light to detect the triggering event (e.g., an amount of motion above a threshold amount of motion) and/or reading the input detected by the sensors 112a-112n.

The neural network artificial intelligence module 132 may be more effective (e.g., accurate) at detecting objects and/or recognizing characteristics of objects in video frames than the simple neural network artificial intelligence module 118 that may be implemented by one or more of the smart camera lights 102a-102n. For example, the smart camera lights 102a-102n may not implement the dedicated GPU 130. The neural network artificial intelligence module 132 may consume more power and/or more processing resources than the simple neural network module 118 of the smart camera lights 102a-102n. For example, the simple neural network module 118 may be a modified and/or compressed version of the neural network module 132. The compressed simple neural network module 118 may have a reduced size and/or complexity to enable execution on the processor 114. The compressed simple neural network module 118 may use less computing resources than the neural network module 132. However, the reduced size and/or complexity of the simple neural network module 118 may result in less predictive power and/or accuracy than using the neural network module 118. In some embodiments, the simple neural network 118 and the neural network artificial intelligence module 132 may comprise overlapping (or redundant capabilities). For example, the smart camera lights 102a-102n may be capable of performing some (or all) of the functionality of the distributed servers 122a-122n locally (e.g., as an edge device, without uploading video data to the cloud computing service 104).

The distributed servers 122a-122n may be configured to provide packages of tools that may be suitable for internet-of-things (IoT) devices such as the smart camera lights 102a-102n. The tools offered by the distributed servers 122a-122n may be useful to end-users of the smart camera lights 102a-102n, but may comprise a cost to the vendors of the smart camera lights 102a-102n. Access to the GPU 130 of the distributed servers 122a-122n may be more expensive for high bitrate video (e.g., more of the distributed servers 122a-122n may be needed to process high bitrate video and/or more time may be reserved from the distributed servers 122a-122n in order to process the high bitrate video).

Generally, storage resources provided by the storage servers 120a-120n are less expensive than the computing resources provided by the distributed servers 122a-122n. For example, the video data generated by the smart camera lights 102a-102n may be stored by the storage servers 120a-120n at a less expensive fee than using the neural network artificial intelligence module 132 to analyze the same amount of video data with the distributed servers 122a-122n. The system 100 may be less restrictive with storing video data in the storage servers 120a-120n than with processing the video data in the distributed servers 122a-122n.

The distributed servers 122a-122n and/or the storage servers 120a-120n may be configured to store data, retrieve and transmit stored data, process data and/or communicate with other devices (e.g., the user device 106). The distributed servers 122a-122n and/or the storage servers 120a-120n may be implemented as part of a cloud computing platform (e.g., distributed computing). In an example, the distributed servers 122a-122n and/or the storage servers 120a-120n may be implemented as a group of cloud-based, scalable server computers. By implementing a number of scalable servers, additional resources (e.g., power, processing capability, memory, etc.) may be available to process and/or store variable amounts of data. For example, the distributed servers 122a-122n and/or the storage servers 120a-120n may be configured to scale (e.g., provision resources) based on demand. The distributed servers 122a-122n and/or the storage servers 120a-120n may implement scalable computing (e.g., cloud computing). The scalable computing may be available as a service to allow access to processing and/or storage resources without having to build infrastructure (e.g., the provider of the system 100 may not have to build the infrastructure of the distributed servers 122a-122n and/or the storage servers 120a-120n). In some embodiments, a same cloud-services provider may provide both the distributed servers 122a-122n and/or the storage servers 120a-120n.

The user device 106 may be configured to enable a user (e.g., a homeowner) to interact with the system 100. For example, the circuit 106 may have a wired and/or wireless connection to the network 50 and/or the smart camera lights 102a-102n. In some embodiments, the user device 106 may be separated from the smart camera lights 102a-102n by long distances (e.g., miles). In the example shown, the user device 106 may be a smartphone (e.g., a handheld or portable user device). In some embodiments, the user device 106 may be implemented as a desktop computer, a laptop computer, a smart watch, a tablet computing device, etc. Generally, the user device 106 may be a device configured to communicate wirelessly, display video content and/or receive/transmit audio. The type of device implemented as the user device 106 may be varied according to the design criteria of a particular implementation.

The smart camera lights 102a-102n and/or the cloud computing service 104 may be configured to wirelessly communicate the video data (e.g., one or more video streams) to the user device 106. In an example, the processor 114 and/or the distributed servers 122a-122n may be configured to format the video streams to be communicated and/or establish a wireless communication link between the smart camera lights 102a-102n, the cloud computing service 104 and the user device 106 (e.g., using Wi-Fi, cellular communication such as 3G/4G/LTE/5G, Bluetooth, etc.). Video streams and/or other data may be transmitted between the smart camera lights 102a-102n, the cloud computing service 104 and the user device 106 (e.g., instructions and/or commands may be sent from the smartphone 106 to one or more of the smart camera lights 102a-102n and/or the cloud computing service 104, audio for implementing a two-way intercom may be transmitted, information about objects detected by video analysis performed by the distributed servers 122a-122n may be transmitted to the smartphone 106, etc.). The type of information communicated, and/or the wireless communication protocol(s) implemented may be varied according to the design criteria of a particular implementation.

The smart camera lights 102a-102n may be configured to detect triggering events in real-time. The triggering events may be detected based on thresholds that are less computationally intensive than the object detection performed by the neural network artificial intelligence module 132. When the processor 114 detects one or more triggering events, the processor 114 may generate a control signal. The control signal may be configured to control the various components 112a-112n. In one example, the light 108 may be generated in response to the triggering events.

In some embodiments, the processor 114 may generate and/or apply metadata to the video frames that correspond to the triggering events (e.g., objects detected). For example, in response to detecting a person, metadata may be added to the video frames that indicate a person has been detected. The metadata may further comprise characteristics of objects detected. For example, characteristics of the person detected may comprise a hair color, a height, color of clothing worn, an amount of time that the person loitered in the area, etc. The type of metadata added by the processor 114 to the video frames may be varied according to the design criteria of a particular implementation.

The video frames and/or the metadata generated and/or applied to the video frames by the processor 114 may be uploaded to the cloud computing service 104. The cloud computing service 104 may enable the end users to access the stored video frames using the user device 106. The storage servers 120a-120n may store the video frames and/or metadata. The distributed servers 122a-122n may be configured to perform various operations (e.g., modifications such as encoding, transcoding, cutting, cropping, etc.) on the stored video frames. In some embodiments, the neural network AI 132 may be configured to perform various computer vision operations (e.g., object detection, characteristic detection, facial recognition, etc.). The various operations performed by the cloud computing service 104 may have a monetary cost that may depend on the amount of time spent performing the operations and/or the hardware resources applied to perform the operations.

The distributed servers 122a-122n may be configured to process the still images using the neural network AI modules 132. The distributed servers 122a-122n may generate a response based on the results of analyzing the still images using the neural network AI modules 132. In one example, if the neural network AI modules 132 do not detect an object, the distributed servers 122a-122n may generate a response that notifies the smart camera lights 102a-102n to not upload the video data to the storage servers 120a-120n. In another example, if the neural network AI modules 132 do not detect an object, the distributed servers 122a-122n may determine why the triggering event detected by the smart camera lights 102a-102n resulted in a false positive and generate a response that provides feedback to the smart camera lights 102a-102n to help prevent future false positives. In yet another example, if the neural network AI modules 132 does detect an object, the distributed servers 122a-122n may generate a response that instructs the smart camera lights 102a-102n to upload the video data that corresponds to time of the detected object to the storage servers 120a-120n. In still another example, if the neural network AI modules 132 does detect an object, the distributed servers 122a-122n may generate a response that notifies the smart camera lights 102a-102n that the object was detected and the smart camera lights 102a-102n may send a real-time notification to the user device 106 with information about the detected object. The response of the distributed servers 122a-122n and/or the smart camera lights 102a-102n to the detected object may be varied according to the design criteria of a particular implementation.

Various types of input detected by the smart camera lights 102a-102n may be determined to be one of the triggering events. For example, the triggering events may be any type of event determined to be relevant (e.g., motion detected, a button pressed, a time schedule, data from an external sensor, etc.). For example, the system 100 may combine multiple modalities of detection on the smart camera lights 102a-102n (e.g., using a combination of any, some, or all of vision, passive IR motion, sound, touch sensors, etc. to decide when to trigger) to determine information that may be used for metadata.

The smart camera lights 102a-102n may not necessarily implement the simplified neural network AI modules 118. One, or more, or none of the smart camera lights 102a-102n may implement the simplified neural network AI modules 118. Generally, the smart camera lights 102a-102n may be less capable of detecting objects (e.g., relatively dumb) compared to the distributed servers 122a-122n. However, the smart camera lights 102a-102n may be capable (e.g., smart enough) to filter down the set of events for the distributed servers 122a-122n to process.

The smart camera lights 102a-102n may be configured to upload data (e.g., the captured video data, still images, audio, etc.) to the distributed servers 122a-122n and/or the storage servers 120a-120n. For example, the data uploaded to the storage servers 120a-120n may be streamed to the user device 106. The user device 106 may connect to the storage servers 120a-120n to allow the user to request the stored video data. For example, the video data may be sent to the user device 106 as a live (or nearly live) video stream. The data traffic to/from the smart camera lights 102a-102n, the distributed servers 122a-122n, the user device 106 and/or the storage servers 120a-120n may be encrypted (e.g., AES 128-bit encryption, AES 256-bit encryption, etc.). User account passwords may be salted and hashed with a cryptographic hash function.

The functionality of the system 100 may be configured to leverage the hardware of the smart camera lights 102a-102n and the processing capabilities of the distributed servers 122a-122n. For example, the hardware of the smart camera lights 102a-102n may be capable of implementing the functionality for detecting the triggering event (e.g., detecting motion, recording video data, analyzing audio, etc.). In some embodiments, the system 100 may be enabled by performing a firmware update of the smart camera lights 102a-102n. The firmware update may provide updated computer readable instructions for the processor 114 to enable selecting images from the video data and communicating the selected images to the distributed servers 122a-122n (e.g., instead of uploading the full video stream). Details of the system 100 may be described in association with U.S. application Ser. No. 16/540,309, filed on Aug. 14, 2019, appropriate portions of which are incorporated by reference.

In some embodiments, the smart camera lights 102a-102n may appear similar to a standard outdoor light (e.g., a porch light, a flood light, etc.). The smart camera lights 102a-102n may be configured as edge devices for the system 100. In an example, the smart camera lights 102a-102n may be configured to perform edge processing and/or provide edge (e.g., local) storage. The edge storage may enable storage of high bitrate video, without communicating a large amount of video data to the cloud computing service 104. For example, the edge storage may provide 24/7 storage for the highest quality video. Storing high bitrate video may enable forensic analysis of the video by the end users. In an example, one of the components 112a-112n may comprise local storage (e.g., a SD card, a portable solid state drive a portable hard drive, a flash drive, etc.). The local storage may enable video data to be stored locally on the smart camera security lights 102a-102n. Storing data locally may enable 24/7 video recordings to be stored without incurring costs (e.g., bandwidth costs and/or storage costs associated with the storage servers 120a-120n). The smart security camera lights 102a-102n may be configured to upload low bitrate video to the cloud computing service 104 instead of the high bitrate video. The indexing and/or metadata generated by the processor 114 may enable the common video content between the high bitrate video and the low bitrate video to be synchronized.

Figure 2:
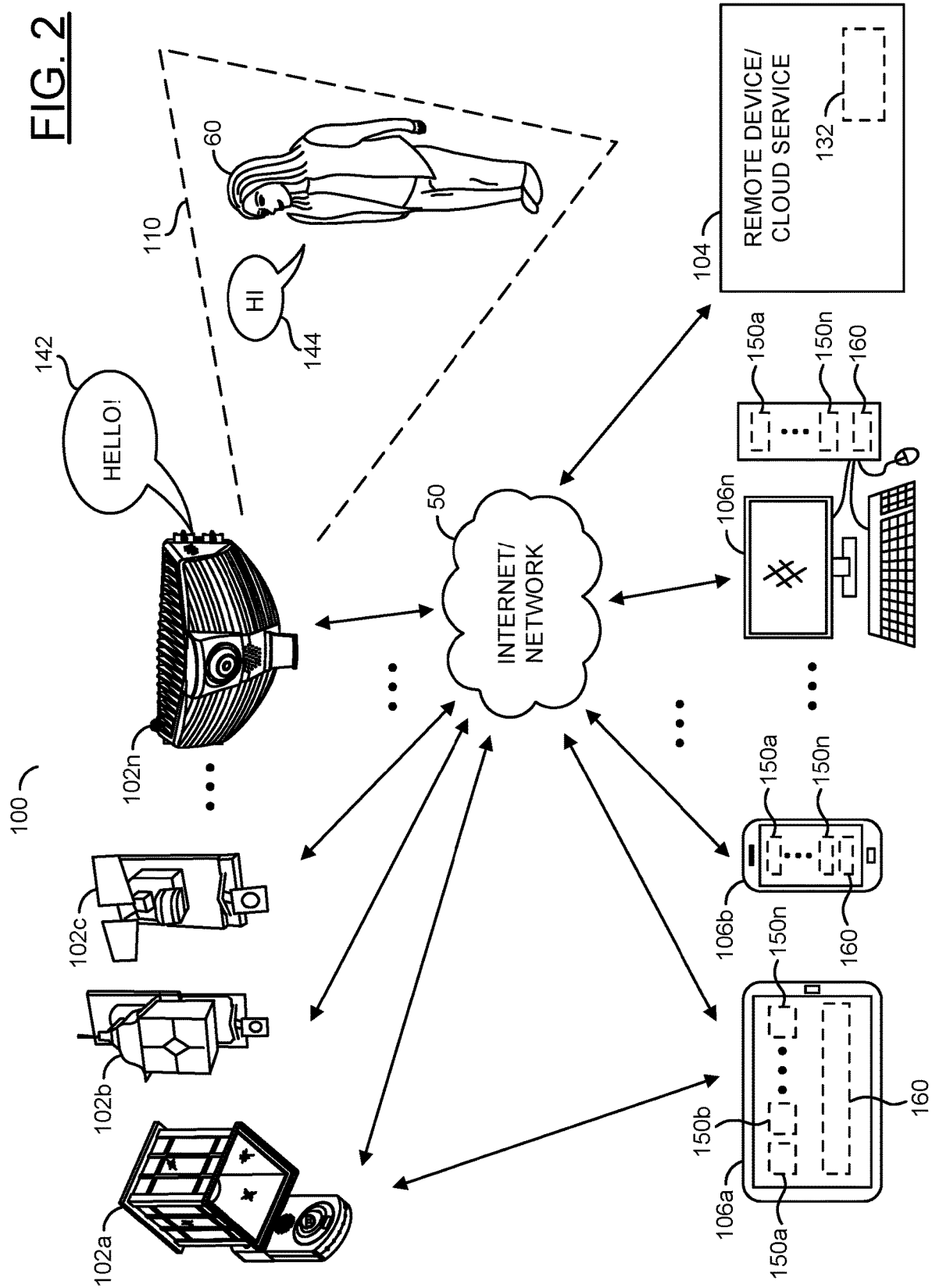
FIG. 2 is a diagram illustrating a system configured to implement mobile distributed security.

Referring to FIG. 2, a diagram illustrating a system configured to implement mobile distributed security is shown. An alternate embodiment of the system 100 is shown. The system 100 may comprise the network 50, a visitor 60, the smart security camera lights 102a-102n, the cloud computing service 104 and a number of the user devices 106a-106n. The visitor 60 may be a visitor to a premises, a property owner, an employee, a loiterer, a burglar, a delivery person, etc. In the system 100, the smart security camera lights 102a-102n may implement an outdoor hub for outdoor internet-of-things (IoT) devices.

In the example shown, the smart device 102a may be a smart security light implemented as an exterior porch light (e.g., a camera integrated with a light implemented as a single unit as described in association with U.S. application Ser. No. 15/611,975, filed on Jun. 2, 2017, now U.S. Pat. No. 10,117,309, appropriate portions of which are incorporated by reference). In the example shown, the smart devices 102b-102c may implement an exterior light attached to a wall plate (e.g., a standalone outdoor light fixture attached to a wall plate with a camera and the components 112a-112n, the processor 114, etc.). The wall plate embodiment of the smart devices 102a-102n may enable an end user to add functionality of the components 112a-112n and the processor 114 to any light fixture. For example, the wall plate embodiment may be compatible with any standard outdoor light fixture available at common hardware stores. Details of the wall plate camera may be described in association with U.S. application Ser. No. 16/585,342, filed on Sep. 27, 2019 and U.S. application Ser. No. 17/026,647, filed on Sep. 21, 2020, appropriate portions of which are incorporated by reference. The smart device 102n may be a smart security floodlight. In some embodiments, the smart devices 102a-102n may implement a smart security doorbell. The smart devices 102a-102n may be implemented at a single location (e.g., at one property) and/or at multiple locations (e.g., at multiple properties such as security for a neighborhood). The types and/or styles of smart security devices 102a-102n may be varied according to the design criteria of a particular implementation.

The smart security devices 102a-102n may each comprise the various sensors and/or actuators 112a-112n. The smart devices 102a-102n may be configured to read sensor data from the sensors 112a-112n to make inferences about the environment. In one example, one of the sensors 112a-112n implemented by the smart devices 102a-102n may be a camera sensor.

Camera sensors implemented by the smart devices 102a-102n may be configured to enable video frames to be generated (e.g., convert light input to raw pixel data that may be used by a processor to generate video frames). The processor 114 implemented by each of the smart devices 102a-102n may be configured to perform video analysis (e.g., object detection, behavior detection, facial recognition, object classification, conduct inferences against a machine learning model, etc.). The smart devices 102a-102n may each implement a wireless module. The wireless modules may enable the smart devices 102a-102n to communicate wirelessly (e.g., using Wi-Fi, ZigBee, Bluetooth, LTE, etc.) via the internet 50 and/or a local connection. In the example shown, the smart device 102a may communicate directly with the user device 106a (e.g., a device-to-device connection, such as Bluetooth). The wireless communication capability may enable the smart devices 102a-102n to operate as a hub for a variety of network-connected devices. For example, the network-connected devices may communicate directly with the smart devices 102a-102n on a local network and the smart devices 102a-102n may communicate information from the network-connected devices to the cloud computing service 104 via the internet 50.

The smart devices 102a-102n may be configured to communicate the sensor data and/or the inferences made in response to performing sensor fusion operations on the sensor data to the cloud computing service 104 and/or the user devices 106a-106n via the network 50. The smart devices 102a-102n may operate independently of the network 50 (e.g., without instructions from the cloud computing service 104 and/or the user devices 106a-106n). Communication with the cloud computing service 104 and/or the user devices 106a-106n may enhance the capabilities of the smart devices 102a-102n. In one example, the processing capabilities of the cloud computing service 104 may enable faster and/or more detailed video analysis of the video frames and/or audio data captured by the smart devices 102a-102n. In another example, the cloud computing service 104 may enable greater storage capacity than is available on the smart devices 102a-102n.

The cloud computing service 104 may be configured to provide processing and/or mass storage for the system 100. Generally, the cloud computing service 104 may be located off-site from the smart devices 102a-102n. The cloud computing service 104 may be configured to store data, retrieve and transmit stored data, process data and/or communicate with other devices.

In some embodiments, the video analysis and/or audio analysis may be performed by the processor 114 implemented by the smart devices 102a-102n (e.g., local inferencing performed by an edge device). For example, the smart devices 102a-102n may implement a machine learning model configured to run on a low-powered and/or low-resource device such as the smart devices 102a-102n. In some embodiments, the smart devices 102a-102n may be configured to generate the video frames and capture the audio input and upload the video frames and audio input to the cloud computing service 104. The cloud computing service 104 may perform the video analysis and/or the audio analysis (e.g., inferencing performed remotely by a cloud processing service). For example, the cloud computing service 104 may comprise high-powered and/or have access to more computing resources in order to implement the machine learning model. The cloud computing service 104 may generate results based on the video analysis and/or the audio analysis and the results may be transmitted to the smart devices 102a-102n.

The user devices 106a-106n may enable a user to send and/or receive information to/from the smart devices 102a-102n. The user devices 106a-106n may provide a graphical user interface to enable a property owner (or another authorized person) to interact with the smart devices 102a-102n (e.g., a companion app). In an example, the graphical user interface of the user devices 106a-106n may be used to adjust the settings of the various sensors implemented by the smart devices 102a-102n. In another example, the companion app may provide an interface to provide a schedule to control greetings output by the smart devices 102a-102n. In yet another example, the companion app may be used to enable 2-way audio between the visitor 60 and the property owner (e.g., without having to be physically near each other).

The user devices 106a-106n may be configured to communicate with the cloud computing service 104. For example, the user devices 106a-106n may be configured to retrieve video data and/or audio data stored by the cloud computing service 104. The user devices 106a-106n may be configured to receive notifications from the smart devices 102a-102n and/or the cloud computing service 104. In one example, the notification may be a message that indicates that the sensors 112a-112n of the smart devices 102a-102n have detected an object (e.g., a person, a vehicle, a package, etc.).

The user devices 106a-106n may be implemented as portable devices configured to display graphics (e.g., text, interfaces, video, etc.), communicate audio (e.g., send and receive audio) and/or communicate with a network (wired or wirelessly). In some embodiments, one or more of the user devices 106a-106n may be implemented as a smartphone, a smart watch, a tablet computing device, a phablet, a desktop computer, a laptop computer, a netbook, etc. The user devices 106a-106n may be configured to execute instructions to provide the companion app that enables and/or facilitates communication between the user devices 106a-106n and the smart devices 102a-102n. The type of devices implemented as the user devices 106a-106n may be varied according to the design criteria of a particular implementation.

A speech bubble 142 is shown. The speech bubble 142 may be an audio message generated by the smart devices 102a-102n. In the example shown, the audio message 142 may be a greeting generated in response to the detected visitor 60. The smart devices 102a-102n may comprise an audio output device (e.g., an audio processor and/or a speaker) to generate audio and/or the speech 142. In the example shown, the visitor 60 may be an object detected based on the video analysis of the video frames. In one example, the audio message 142 may be intelligently selected by each of the smart devices 102a-102n in response to the visitor 60, characteristics of the visitor 60 and/or behavior of the visitor 60. In another example, the audio message 142 may be real-time two-way communication to enable a remote operator to speak from another location using the smart devices 102a-102n.

The smart devices 102a-102n may be configured to use artificial intelligence to generate context-relevant speech (e.g., select an appropriate greeting when the visitor 60 is detected, a personalized greeting when a resident is detected, delivery instructions when a package is detected, an appropriate audio reaction to sounds made by the visitor 60, etc.).

The smart devices 102a-102n may be configured to implement sensor fusion to make inferences based on various sensor readings. The sensor fusion may enable inferences to be made by combining sensor readings from disparate sources that would not be able to be determined from reading one of the sensor readings alone. Implementing the sensor fusion may enable the smart devices 102a-102n to implement a conversational artificial intelligence.

The field of view 110 may represent an area monitored by the smart devices 102a-102n. The field of view 110 may capture the visitor 60. The smart devices 102a-102n may be configured perform video analysis on video frames to detect the visitor 60 and determine an identity of the visitor 60. The smart devices 102a-102n may generate metadata for the video frames captured that indicates that the visitor 60 was detected in the field of view 110 at a particular time. For example, one or more features/characteristics (e.g., the face, the height, the gait, etc.) of the visitor 60 may be detected by the smart devices 102a-102n and compared with stored features/characteristics. The video analysis may be used to determine a classification and/or identification of the visitor 60 based on the object detected and/or the features/characteristics of the object.

A speech bubble 144 is shown. The speech bubble 144 may be a response from the visitor 60. In the example shown, the speech bubble 144 may be a vocal response to the audio message 142. In some embodiments, the speech bubble 144 may be a noise caused by the visitor 60 (e.g., breaking glass, knocking on a door, etc.). The smart devices 102a-102n may comprise an audio capture device (e.g., an audio processor and/or a microphone) configured to receive audio and/or the response 144. In the example shown, the visitor 60 may be an object detected based on the video analysis of the video frames. The audio input 144 may be received by the smart devices 102a-102n. The audio input 144 may be analyzed (e.g., audio analysis) in order to determine the content of the audio input 144. The content of the audio input 144 may be used to generate a context-appropriate reaction. Analyzing the audio input 144 may be part of the analysis of the response of the visitor 60 (e.g., the behavior of the visitor 60). The audio message 142, the response 144 and/or the reaction by the smart devices 102a-102n may be part of the active engagement implemented by the smart devices 102a-102n.

In some embodiments, the smart devices 102a-102n may be configured to perform the authentication of the visitor 60. In one example, the identification performed by the audio analysis may implement the authentication. Other sensors implemented by the smart devices 102a-102n may be configured to provide evidence and/or confidence for the authentication. For example, video analysis, voice detection, RFID, etc. may be implemented to perform the authentication. In some embodiments, the audio message 142 may be generated in response to the authentication (e.g., the authentication may provide the identity of the visitor 60, and the audio message 142 may be configured to greet the visitor 60 by name based on the identification).

The authentication may be configured to enable the smart devices 102a-102n to receive commands from the visitor 60. In one example, if the visitor 60 has been authenticated, the visitor 60 may provide voice-based commands (e.g., the audio input 144 may be the voice-based commands if the visitor 60 is authentication). For example, there may be a list of voice commands that property owners would like to have while outside the home. To enable voice commands outside the home, authentication may be implemented. With authentication, the voice commands may be configured to provide wireless control of various network-connected devices (e.g., door locks, garage door openers, outdoor lighting, keeping the devices quiet, arm/disarm door alarm systems, etc.). The smart devices 102a-102n may be configured to receive the commands, and then perform a functionality corresponding to the commands. The functionality corresponding to the received commands may be performed by one or more of the network-connected devices. The smart devices 102a-102n may communicate (e.g., wirelessly) the commands to the network-connected devices. The detection of the audio input 144 may be stored as part of the metadata.

A robust and easy outdoor classification process may be implemented by the smart devices 102a-102n. The identification and/or classification may rely on two or more data points and/or signals (e.g., sensor fusion). Once visitors are authenticated (e.g., against a whitelist (or allow list) of approved visitors such as family and friends), other detected visitors may be considered 'unfamiliar' and/or 'unwanted' visitors.

The system 100 may be configured to provide a reaction to the visitor 60 detected, the classification detected and/or the behavior of the visitor 60 detected. The smart devices 102a-102n may implement a hub that provides a connection to the Internet (e.g., the network 50) and provides control to other network connected devices. For example, one or more of the smart devices 102a-102n may perform an authentication and initiate the reaction (e.g., a command) in response to a voice command. The reaction may be initiated by controlling another network connected device such as a door lock. Generally, one or more of the smart devices 102a-102n and/or one or more of the internet-connected devices may implement a microphone (e.g., for voice authentication, to analyze the vocal response 144 by the visitor 60 and/or to receive the voice command 144).

A combination of audio (e.g., voice) analysis, video analysis and/or a schedule may enable intelligent selection of the audio message 142 and/or the reaction to the input audio 144. The characteristics detected may be used to adjust a confidence level of the classification and/or identification of the visitor 60. When the confidence level is determined to be above a threshold (e.g., 99% confidence) then the audio message 142 and/or reaction may be selected. The confidence level may represent a likelihood that the classification and/or identification of the visitor 60 determined is correct. Classification and/or identification factors (e.g., characteristics) may comprise facial recognition, a barcode, hand gestures, height of visitors, etc.

The smart devices 102a-102n may be configured to generate different audio messages and/or reactions that may be adapted to the situation. In one example, the situation may be the time of day. The audio message 142 and/or the reaction may be selected to correspond to the detected time of day. For example, the audio message 142 may be a greeting that comprises "good morning" may be selected for the morning (e.g., between 6 am and 11 pm) and another greeting that may comprise "good evening" may be selected for the evening (e.g., between 4 pm and midnight). Similarly, the selection of the reaction may be affected by the time of day (e.g., a welcome message during the day, and a warning to leave the premises at night).

The reaction may be selected based on an analysis of the video and/or audio detected after the audio message 142 has been provided. The reaction may be further selected based on other factors. In one example, the reaction may be further selected based on the time of day. In another example, the reaction may be further selected based on using sensors implemented by the smart devices 102a-102n (e.g., using sensor fusion). In yet another example, the reaction may be further selected based on settings input on the companion app. The selection of the audio message 142 and/or reaction may be triggered by the detection of the visitor 60 at any time of (e.g., available 24/7). For example, the visitor 60 may be an unexpected visitor (e.g., an unrecognized person). In another example, the visitor 60 may be an expected visitor (e.g., a scheduled appointment and/or a face recognized using facial recognition video analysis). In yet another example, the video analysis may detect a package delivery and the visitor 60 may be the delivery person with a delivered package at the door.

Using camera sensor technology, AI technology (performed by the server 104 and/or the smart devices 102a-102n), and market understanding of user behavior, the smart devices 102a-102n may be configured to automatically select the audio message 142 and/or the reaction to deliver depending on the detected circumstance. The reaction may comprise a sequence of interactions with the visitor (e.g., continuous, active engagement).

The video analytics may be used to detect and/or classify objects (e.g., the visitor 60). Other sensor data may be captured (e.g., audio, motion, temperature, light levels, etc.). The processor 114 on the smart devices 102a-102n and/or distributed (e.g., cloud) processing may be configured to perform sensor fusion to make inferences using information from multiple disparate sources (e.g., inferences that may not be performed from a single source of information alone). In one example, using video analytics and conversational AI, a package delivery person may be detected. The reaction may comprise specific instructions provided by the smart devices 102a-102n when the package delivery person is detected. For example, the conversational AI may provide the reaction having an audio message such as, "please leave packages behind planter".

The smart devices 102a-102n may be configured to intelligently react to responses (e.g., the audio response 144) by the detected visitor 60. For example, the smart devices 102a-102n may provide reactions that comprise learning questions to attempt encourage the visitor 60 to provide information that may be used to identify and/or classify the visitor 60. Once the smart devices 102a-102n learn the type (e.g., classification) of the visitor 60, the smart devices 102a-102n may generate reactions appropriately (e.g., contextually accurate reactions). For example, if the smart devices 102a-102n identify the visitor 60 as a burglar, the smart devices 102a-102n may provide escalating reactions (e.g., first ask the burglar to leave politely, then provide a warning, then perform more aggressive actions such as sounding an alarm, then contacting the police, etc.). In response to detecting and/or classifying the visitor 60, the processor 114 may generate metadata for the captured video frames that indicate that the visitor 60 has been detected in the captured video frames.

After providing an action based on the selected reaction (e.g., asking a question), the smart devices 102a-102n may observe the response of the visitor 60. The next reaction performed by the smart devices 102a-102n may be selected based on the response of the visitor 60 (e.g., determined by further performing video analysis and/or audio analysis). For example, if the visitor 60 leaves, then no next reaction may be necessary. If the visitor 60 provides a name in the response 144, then the next reaction may include the name of the visitor (e.g., "Hi, Bob, we were expecting you, please wait while we come to the door").

The user devices 106a-106n are shown comprising a number of blocks (or circuits) 150a-150n. The circuits 150a-150n may implement various hardware components of the user devices. In an example, the circuit 150a may implement a processor, the circuit 150b may implement a memory, the circuit 150c may implement an input/output (I/O) interface, the circuit 150d may implement a communications module, etc. The circuits 150a-150n may enable the user devices 106a-106n to present output and/or receive input. The circuits 150a-150n may be configured to execute computer readable instructions. The number, type and/or functionality of the circuits 150a-150n may be varied according to the design criteria of a particular implementation.

The user devices 106a-106n may comprise a block (or circuit or module) 160. The module 160 may be the companion app. In an example, the companion app 160 may implement a video feed monitoring app configured to provide a mobile distributed security response. The various hardware circuits 150a-150n may be configured to execute the computer readable instructions to display output, receive input and/or determine internal states for the companion app 160. The companion app 160 may be configured to implement the AI-based security monitoring service. The companion app 160 may be configured to intelligently display video feeds in response to the video data generated by the smart devices 102a-102n and/or events detected. The companion app 160 may be configured to enable the real-time two-way communication (e.g., the generation of the audio output 142 and the reception of the audio response 144). In one example, the companion app 160 may be a mobile app and/or a desktop executable program. In another example, the companion app 160 may be implemented as a web-app. The companion app 160 may be configured to operate using various computing devices (e.g., mobile phones, desktop computers, laptop computers, netbooks, tablet computing devices, etc.) and/or operate using various operating systems (e.g., Windows, iOS, Linux, Android, etc.). The functionality of the companion app 160 may be varied according to the design criteria of a particular implementation.

The AI model 132 may be configured to intelligently select the video feeds for the companion app 160 to display and/or the arrangement for displaying the video feeds. The AI model 132 may be configured to filter out only events of interest as the events occur. The AI model 132 may be configured to determine the output selected for the smart security devices 102a-102n. In an example, the AI model 132 may determine the order of responses to generate the increasingly severe messages. The AI model 132 may be configured to determine when to generate a request for live engagement (e.g., from a security service) and/or when to request a physical presence (e.g., request an on-scene visit from a security guard (or security personnel) or the police as a last resort). The AI model 132 may be configured to learn in response to feedback. The learning performed by the AI model 132 may be based on feedback received in response to the arrangement of the video feeds displayed, feedback received in response to detecting events, feedback received in response to selecting particular reactions for the smart devices 102a-102n, feedback received in response to enabling live engagement, feedback received in response to deploying on-site security, etc.

Figure 3:
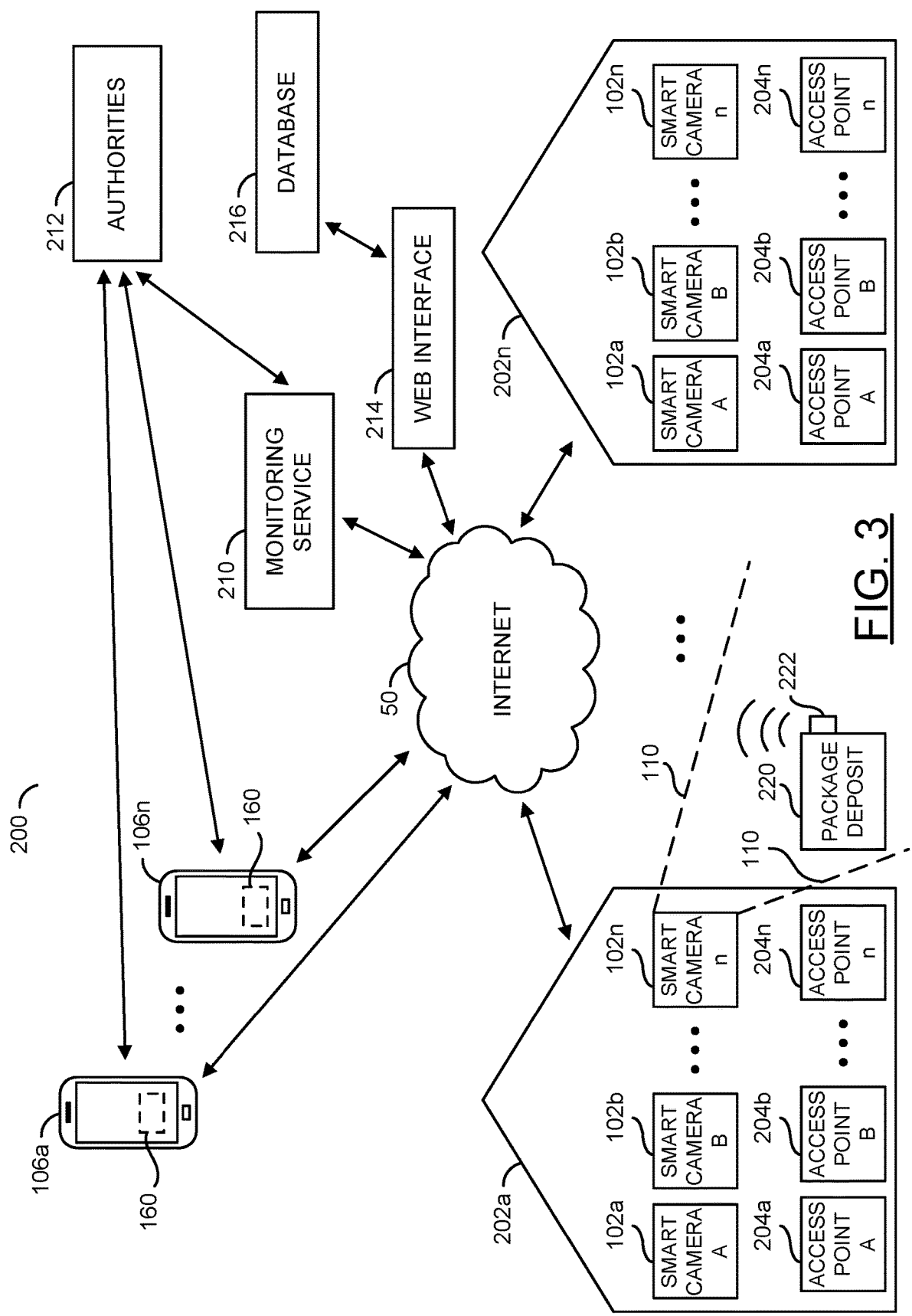
FIG. 3 is a diagram illustrating an example cloud-based security system.

Referring to FIG. 3, a diagram illustrating an example cloud-based security system 200 is shown. The system 200 generally comprises blocks 202a-202n. The blocks 202a-202n may be homes and/or business premises. Each of the homes 202a-202n may comprise blocks 204a-204n. The blocks 204a-204n may be areas of interest (e.g., access points to the homes and/or business premises 202a-202n).

The smart cameras (e.g., implemented as doorbells, floodlights, security cameras, etc.) 102a-102n may be set up at each of the areas of interest 204a-204n of the homes and/or business premises 202a-202n. For example, the smart cameras 102a-102n may be configured to monitor the areas of interest 204a-204n.

The system 200 may further comprise the internet 50 and/or the cloud service 104, the mobile devices 106a-106n, a monitoring service 210, authorities 212 (e.g., for in-person response), a web interface 214 and/or a database 216. The companion app 160 is shown implemented by the mobile devices 106a-106n. In one example, the monitoring service 210 may be a virtual monitoring service. In another example, the monitoring service 210 may be a person from a central monitoring service (e.g., a live receptionist working at a remote call center that may be located anywhere in the world). In one example, the authorities 212 may be the police department, the fire department, an ambulance, a private security service and/or other emergency services. The web interface 214 may be used to generate the interface for the companion app 160.

In one example, the video feed monitoring app 160 may be used by monitoring personnel and/or patrol guards. The monitoring personnel may be located on-site and/or at an entirely different (e.g., remote location). The monitoring personnel may work for the central monitoring service 210 and/or a small distributed office monitoring. The patrol guard may be a person located on-site that may provide a live response. The patrol guard may use the video feed monitoring app 160 while on patrol and may receive notifications of events. The patrol guard may respond to the notification of the events by moving to the location of the event to provide a human presence on-site. The video feed monitoring app 160 may route the patrols of the patrol guards geographically near the protected sites 202a-202n. The video feed monitoring app 160 may route the patrol guards to a next site on a designated route (e.g., route the patrol guards from a first location at the property 202a to a second location at the property 202b).

The areas of interest 204a-204n may be doors, windows, garages, other entrances, and/or vantage points. Generally, the smart cameras 102a-102n may be mounted at the areas of interest 204a-204n. Data from the smart cameras 102a-102n at the homes and/or business premises 202a-202n may be sent to the internet and/or cloud service 104.

Data sent to the internet 50 and/or the cloud service 104 may be sent to the user devices 106a-106n. For example, an alert from one of the smart cameras 102a-102n from the home 202a may be sent to the device 106a of the homeowner indicating that another family member has arrived home. In another example, an alert from one of the smart cameras 102a-102n from the home 202n may be sent to the smartphone 106c of an owner of another home (e.g., the owner of the home 202b) that a suspicious person has been identified in the neighborhood. Users may then send a notification to the authorities 212. In yet another example, the device 106a may receive an alert from one of the smart cameras 102a-102n indicating that a package has been delivered. A user of the user devices 106a-106n may send data back to the smart cameras 102a-102n of the homes and/or business premises 202a-202n through the internet and/or cloud service 104. In one example, a homeowner may send a command to arm an alarm (e.g., one of the security responses) at their home.

In one example, the user devices 106a-106n may be in the possession of trusted volunteers. The trusted volunteers may be other home owners in the system 200. The trusted volunteers may be the first line of response to a security issue detected by the system 200. Alerts by the system 200 may be sent in parallel to all the trusted volunteers. The trusted volunteers may use available communication channels provided such as cell phones, telephone and/or emails. The homeowner may use the companion application 160 to schedule particular pre-defined responses (e.g., the audio message 142 and/or reactions) to particular alerts such as calling the authorities 212 (e.g., the police and/or the fire department). The trusted volunteers may be able to activate a set of pre-defined actions using the user devices 106a-106n. The trusted volunteers may take training sessions to learn how to properly respond to various alerts. The training sessions may be taken on-line. The on-line training sessions may be available on the web interface 214 and/or using the companion application 160. For example, the web interface 214 may be used to access the companion application 160 via a desktop computer and/or smart TV.

If the network of trusted neighbors 202a-202n has the same system (e.g., one or more of the smart cameras 102a-102n), they may exchange images, video, and/or other information of unwelcome visitors. The website and/or web interface 214 may have access to the storage database 216 implemented by the cloud computing service 104 (e.g., stored in the storage servers 120a-120n) to manage the images, video, and/or other information. Unwelcome visitors stored in the database 216 may be shared with other neighbors and/or the authorities 212 using the web interface 214. For example, when the unwelcome visitors learn about the database 216 they may not target the neighborhood 202a-202n. Data in the database 216 may be used to classify types of visitors (e.g., comparisons may be performed between the captured video data and information in the database 216).

In some embodiments, the mobile devices 106a-106n may be used by patrol officers such as the authorities 212 (e.g., police, private security, etc.). The mobile devices 106a-106n may enable the patrol officers 212 to remotely monitor the video feeds generated by the smart cameras 102a-102n. For example, the patrol officers 212 may patrol the neighborhood 202a-202n in a vehicle and the mobile devices 106a-106n may be implemented within the vehicle. The companion app 160 may indicate which access points 204a-204n have events detected and alert the patrol officers 212.

Multiple levels of alerts may be implemented to distinguish unwelcome visitors from welcomed visitors (e.g., household members). Since most visitors may be welcomed, identifying strangers and raising the level of alert for immediate attention may be important. To prevent false alarms the smart cameras 102a-102n may be configured to provide automatic greetings (e.g., the audio message 142). The automated audio message 142 and/or the reactions may be implemented to engage the visitor 60 (e.g., implement a conversational AI). Engaging the visitor 60 may enable the AI model 132 implemented by the processor of the smart devices 102a-102n and/or the remove device 104 to analyze video of the visitor 60 (e.g., by having them face the lens to talk) and/or determine the behavior of the visitor 60.

The technology to identify and/or classify welcomed visitors may include facial recognition, voice recognition, machine learning of habits and schedules of household members, and/or user inputs when errors occur. Learned behavior may be used to determine which pre-defined function to perform. For example, the learned behavior may determine that nobody is home at a particular time, and the pre-defined function may be to automatically arm the security system and/or perform energy saving functions (e.g., adjust the heating and/or cooling of a home). In another example, the daily schedule of inhabitants may be observed and/or recorded. The daily schedule of inhabitants may be learned using various sensors. For example, patterns may be observed such as daily energy use requirements at a certain time of day and/or the arming/disarming of a security system. In another example, smart lighting may estimate the amount of lighting needed at a particular time of day based on the occupants in a home. If nobody is home, the system 200 may determine that exterior lighting is needed and/or interior lighting is not needed. In another example, if a family is on vacation the system 200 may turn on interior lighting to make it appear to a potential burglar that the home is occupied. The learned behavior may develop a unified status of the home (e.g., based on occupancy, time of day, weather, security status, etc.). Pre-defined functions may be performed based on the unified status of the home.

In some embodiments, the smart cameras 102a-102n may initiate storage of the video data (e.g., the video streams/feeds) in response to motion detection in the area of interest. The user device 106a (e.g., a smart phone) may be used to allow a user to set a motion threshold for each of the smart cameras 102a-102n. For example, a lower motion threshold may be more sensitive to motion. In another example, a higher motion threshold may be less sensitive to motion (e.g., reduce a number of false positives). The motion threshold may be adjustable.

In some embodiments, the smart cameras 102a-102n may initiate storage of the video data in response to detecting and/or locating a person (e.g., the visitor 60) and/or other type of object (e.g., a delivery vehicle) in the video data. In one example, the video processor of the smart cameras 102a-102n and/or the AI model 132 may analyze the video data to detect people and/or animals. In some embodiments, facial recognition may be implemented to classify and/or recognize visitors. The activation state may be selected based on the classification. In some embodiments, the video data may be analyzed to determine a behavior of the visitors.

In some embodiments, machine learning techniques may be implemented by the AI model 132 to improve detection and/or classification accuracy of visitors and/or objects. For example, the user may use the companion app 160 to provide a correct and/or incorrect label to a detection performed by the smart cameras 102a-102n. If the detection and/or classification is incorrect, the incorrect label may be used by the smart cameras 102a-102n to incorporate an incorrect result of the detection into the machine learning techniques of the AI model 132. In some embodiments, the machine learning techniques may be implemented in the cloud service 104 (e.g., the analysis is performed using cloud computing resources configured to scale available resources on demand to enable learning for the AI model 132). Similar machine learning techniques may be implemented by the edge AI model 118 implemented by each of the smart devices 102a-102n. Video data and/or correct/incorrect labels may be uploaded and/or stored anonymously (e.g., without personal identification information) by the cloud service 104. The smart cameras 102a-102n may be configured to ignore (e.g., not respond to, not track and/or not send notifications in response to) small animals and/or shadows.

In some embodiments, the smart security cameras 102a-102n may be configured to send notifications to the user devices 106a-106n in response to the detection. For example, a text message and/or an email may be transmitted in response to the notification. In another example, a notification may be sent via an API (e.g., push notifications) for a particular operating system (e.g., Android notifications, iOS notifications, Windows notifications, etc.). Generally, the user may create a user account (e.g., comprising at least an email address and a password as credentials) for the cloud service (e.g., using the companion application 160 and/or the web-based interface 214). The user account may allow the user to configure preferences. The preferences may comprise the notification and/or greetings settings. The type of notifications sent by the smart cameras 102a-102n may be based on the notification settings. The smart cameras 102a-102n may implement the activation states and/or arm/disarm the security responses to limit a number of the notifications sent. Intelligently limiting the number of notifications sent may reduce a number of false alarms and/or reduce an amount of data transferred via the network 50 and/or the amount of data processed by the cloud service 104 (e.g., prevent QoS issues and/or dropped data).

The cloud service 104 and/or the database 216 may store portions of the video data from each of the smart cameras 102a-102n. For example, portions of the video data may be saved in response to the particular types of detections. The portions of video data may be video clips. The video clips may be encoded and/or compressed by the video processor of the smart devices 102a-102n and/or the cloud service 104 to reduce a size of storage capacity of the video clips. The video clips may have a limited video length (e.g., 30 seconds, one minute, 90 seconds, five minutes, etc.). The length of the video clips may be based on the configuration preferences and/or in response to the detections by the smart cameras 102a-102n (e.g., a longer video clip may result in response to continuous detections). In some embodiments, the video clips may be pre-padded and/or post-padded with video data before and/or after the detection. For example, the video clip may store video data from a pre-determined time before and/or after the detection (e.g., 30 seconds before the detection and/or 30 seconds after the detection for a video clip approximately one minute long). In some embodiments, the video clips may comprise 24/7 storage of the video captured by the smart devices 102a-102n.

In some embodiments, a user interface may be provided for the user devices 106a-106n (e.g., the companion application 160, an executable program, the web-based interface 214, etc.). For example, the companion application 160 may be executable by a computing device such as the user devices 106a-106n. The user interface may allow one or more of the user devices 106a-106n to control various components of the smart cameras 102a-102n. For example, one or more user devices 106a-106n may be configured to access the user account. The control signals may be generated in response to the input from the user devices 106a-106n. For example, an icon may be provided on the user interface representing a light bulb. The user may activate and/or deactivate the light bulb by pressing (touching on a touchscreen, clicking, etc.) a control option using the companion app 160.

Other components such as security response components may be turned on and/or off from the user interface of the companion app 160. For example, one of the controls available in the companion app 160 may be provided to allow the user to control the speaker of one or more of the smart cameras 102a-102n. In one example, the speaker of the smart cameras 102a-102n may playback a pre-recorded audio message (e.g., the user may select from one or more pre-recorded audio messages on the user interface). In another example, the speaker of the smart cameras 102a-

102*n* may sound an alarm (e.g., one or more alarm types may be selected from the user interface of the companion app 160).

In some embodiments, the smart cameras 102*a*-102*n* may be configured for two-way audio communications (e.g., an intercom). For example, the voice of a visitor may be received using a microphone of the smart cameras 102*a*-102*n*. A communication module implemented by the smart cameras 102*a*-102*n* may transmit the received audio to one or more of the user devices 106*a*-106*n* and/or the remote device 104. The user devices 106*a*-106*n* may playback the audio to the user. The user may speak via a microphone on the user devices 106*a*-106*n*. The user devices 106*a*-106*n* may transmit the audio to one or more of the smart cameras 102*a*-102*n* (e.g., the user may select which of the smart cameras 102*a*-102*n* to playback the audio using the companion application 160) via the communication module (e.g., a Wi-Fi connection) implemented by the smart devices 102*a*-102*n*. The speaker component of the smart devices 102*a*-102*n* may transmit and/or stream the received audio.

The smart cameras 102*a*-102*n* may provide various APIs (application programming interface) to connect with other devices (e.g., other home automation devices). For example, the APIs may allow various other devices to communicate with the smart cameras 102*a*-102*n*. In one example, the companion application 160 may be configured to receive/transmit data between the smart devices 102*a*-102*n* and/or other smart devices (e.g., home heating systems, interior lighting, etc.). For example, the smart cameras 102*a*-102*n* and/or other smart devices may provide a smart home security system. The smart cameras 102*a*-102*n* may generate control signals based on the communication with the various devices other devices. The types of APIs available may be varied according to the design criteria of a particular implementation.

A package deposit 220 is shown at the home 202*a*. The package deposit 220 may be implemented to allow the visitor 60 to deliver packages. The package deposit 220 may be implemented as a container, a bag, a delivery slot, a mailbox, etc. In an example, the package deposit 220 may be implemented as a large net with a zipper and a lock. A delivery person may be instructed by the smart security cameras 102*a*-102*n* to place a package inside the package deposit 220 and zip up and/or lock the package deposit 220. In some embodiments, the package deposit 220 may implement a hazardous waste storage (e.g., medical waste for a medical facility) and/or other secure information (e.g., confidential data such as attorney documents) and the package deposit 220 may be monitored to ensure proper disposal of materials in the package deposit 220 (e.g., the package deposit 220 may be implemented for package pick-up). The implementation of the package deposit 220 may be varied according to the design criteria of a particular implementation.

A wireless device 222 is shown on the package deposit 220. The wireless device 222 may be configured to transmit wireless signals to indicate a status of the package deposit 220. In an example, the wireless device 222 may send a notification to the smart cameras 102*a*-102*n* indicating that the package has been delivered. In another example, the wireless device 222 may be configured to send a notification to the smart security cameras 102*a*-102*n* indicating that the package deposit 220 has been tampered with. The smart cameras 102*a*-102*n* may forward the notification to one or more of the user devices 106*a*-106*n*. The type of notifications transmitted by the wireless device 222 may be varied according to the design criteria of a particular implementation.

The smart security cameras 102*a*-102*n* may be configured to adjust an activation state in response to a package being delivered and/or picked up (e.g., in response to the notification from the wireless device 222). A security zone is shown in the field of view 110*a*-110*b* (e.g., the field of view of the lens of the smart security floodlight 102*n*). The smart security camera 102*n* may monitor the security zone within the field of view 110*a*-110*n* near the package deposit 220. In an example, when the security zone 110*a*-110*n* is invaded (e.g., by a visitor such as a potential package thief) the smart camera 102*n* may be configured to perform a security response (e.g., activate an alarm, send an alert to a designated user, play the audio message 142, perform various security reactions, etc.). The security zone 110*a*-110*n* may be an area of interest below the smart security floodlight 102*n*. In some embodiments, the capture device may be configured to capture package information about a delivered package (e.g., a bar code, a tracking number, an identification of the delivery person, etc.).

Figure 4:
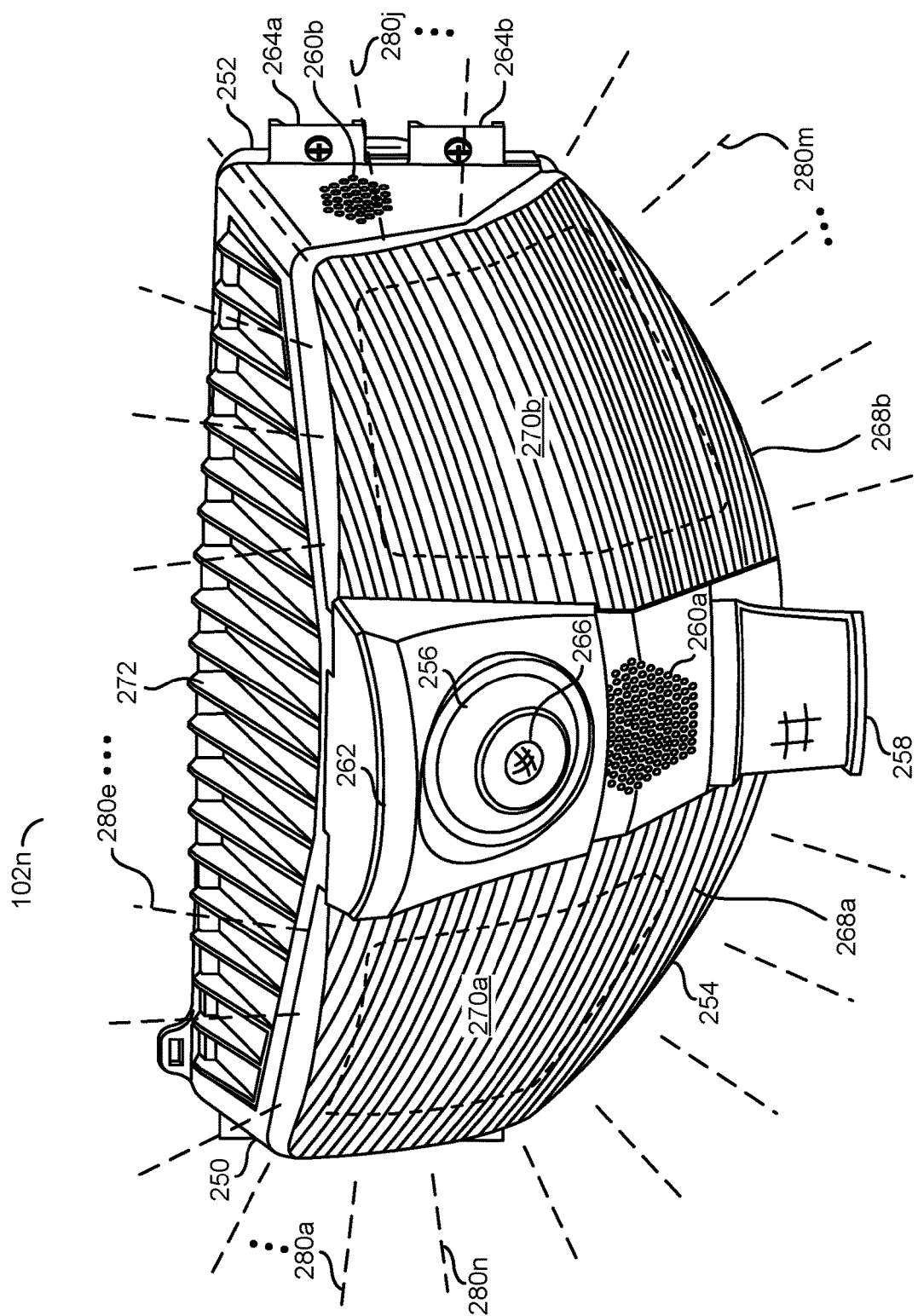
FIG. 4 is a diagram illustrating an example embodiment of a smart security floodlight.

Referring to FIG. 4, a diagram illustrating an example embodiment of a smart security floodlight is shown. The smart security floodlight 102*n* is shown as a representative example of the various smart security devices 102*a*-102*n* described in association with FIG. 2. The smart security floodlight 102*n* may be configured to capture video and/or provide illumination. The smart security floodlight 102*n* may be configured to implement a preventative and deterring security measure. The security floodlight 102*n* may be configured to implement intelligent deterrence. The security floodlight 102*n* may implement one or more deterrent responses (e.g., reactions). The deterrent responses may prevent crimes before damage is done. In an example, the deterrent responses may comprise sound and/or light. In some embodiments, the deterrent measures may be performed by the smart security floodlight 102*n* intelligently in response to analyzing video data captured (e.g., by the AI model 118 implemented by the smart security floodlight 102*n* and/or by the AI model 132 implemented in the cloud computing service 104). In some embodiments, the deterrent measures may be performed by the smart security floodlight 102*n* in response to communication from the companion app 160. The smart security floodlight 102*n* may be configured to capture the video data and communicate the video data to the remote device 104.

The smart security floodlight 102*n* may comprise a housing 250, a back panel 252 and/or a front face panel 254. The housing 250 may be configured to provide an enclosure and/or protection for various components of the smart security floodlight 102*n*. The components 112*a*-112*n* within the housing 250 may be configured to implement the security features of the smart security floodlight 102*n*. The housing/body 250 may be designed to be vandal proof/resistant. The back panel 252 may be configured to provide an enclosure and/or protection for external wiring and/or a power supply for the smart security floodlight 102*n*. The back panel 252 may be configured to enable the smart security floodlight 102*n* to be mounted (e.g., attached to a wall of a premises). The front face panel 254 may be configured to provide protection to lights implemented by the smart security floodlight 102*n*. The lights may be covered by the front face panel 254. The front face panel 254 may be configured to diffuse the lighting emitted by the smart security floodlight 102*n* and/or provide a decorative cover for the smart security floodlight 102*n*. In an example, the front face panel 254 may be replaceable (e.g., swappable) to enable an end user to select various aesthetic designs for the smart security floodlight 102n. The front face panel 254 may be curved LED panel cover that may be clipped on to the smart security floodlight 102n.

In some embodiments, the front face panel 254 may extend from top to bottom and along the sides of the smart security floodlight 102n. The front face panel 254 may be an LED panel. Implementing the front face panel 254 as a frosted LED panel may provide a wide angle of coverage for general illumination. In one example, the LED panel 254 may be a one-piece curved panel to cover the front and sides of the smart security floodlight 102n. In some embodiments, the front face LED panel 254 may extend to the mounting location (e.g., extend along the bottom close to the wall) to provide all-around illumination to limit the amount of dark spots. The front face panel 254 may comprise one or more LED panel covers. For example, the LED panel covers may comprise frosted and/or colored glass/plastic to provide frontal illumination. In some embodiments, one or more of the panels of the front face panel 254 may be an IR window.

The smart security floodlight 102n may comprise a capture device 256, a light (not shown), multiple speakers (not shown), a communication device (not shown), the processor 114 (not shown) and/or passive infrared (PIR) sensor 258. The capture device 256 may be configured as a high resolution camera (e.g., a camera capable of capturing 4K and/or 8K video frames). The light may be configured to provide general illumination and/or a focused spotlight. The speakers may be configured to output audio. The communication device may be configured to communicate with the remote device 104 and/or the user devices 106a-106n. The processor 114 may be configured generate the video data and/or perform video analysis of the video frames captured by the capture device 256 and/or generate control signals for the speakers and/or lights. The PIR sensor 258 may be configured to detect motion.

The capture device 256 is shown attached to the front of the smart security floodlight 102n. The capture device 256 may be configured to capture video data of an area below a level of the smart security floodlight 102n. In an example, the smart security floodlight 102n may be mounted to a wall from at a high location (e.g., higher than six feet to be above people), and the capture device 256 may be directed to capture the ground below the smart security floodlight 102n. In the example shown, the capture device 256 may be implemented as a spherical shape that partially protrudes from the front of the smart security floodlight 102n. The partial protrusion of the capture device 256 may enable some electronics of the capture device 256 to be within the housing 250 (e.g., for protection and/or to enable connection to other internal components of the smart security floodlight 102n, such as the processor 114). The partial protrusion of the capture device 256 may enable the capture device 256 to move (e.g., pan and tilt) to monitor a wide field of view of the area below the smart security floodlight 102n.

The PIR sensor 258 is shown extending down from the bottom of the front of the smart security floodlight 102n. The PIR sensor 258 is shown attached to the bottom of the smart security floodlight 102n without having a neck connector (e.g., a connection that may provide a hook for a rope that could be used to pull off the PIR sensor 258). Implementing the PIR sensor 258 without a neck may enable the PIR sensor 258 to resist vandalism (e.g., no anchor point for a rope). The PIR sensor 258 may extend from the bottom of the smart security floodlight 102n to capture a wide area (e.g., greater than 180 degree field of view). In some embodiments, the PIR sensor 258 may enable IR for night vision.

The PIR sensor 258 may be implemented in a permanently fixed location. The PIR sensor 258 may comprise four separate sensors arranged to capture multiple angles to eliminate blind spots. The PIR sensor 258 may be configured to capture an area of interest without adjustment (e.g., the angle of the PIR sensor 258 may not be moved).

Speaker grilles 260a-260b are shown on the housing 250. The speaker grilles 260a-260b may provide openings to enable the speakers within the housing 250 to emit audio output. The smart security floodlight 102n may further comprise a microphone (not shown). The speaker grilles 260a-260b may enable the microphone implemented within the housing 250 to receive the audio input 144. A combination of the speaker and microphone may enable the smart security floodlight 102n to generate the output audio 142 to playback messages and accept the input audio 144. The security floodlight may further comprise a microphone and/or a speaker (e.g., enable two-way communication).

The housing 250 may comprise a lens hood (or duck visor) 262. The lens hood 262 may provide glare protection for the capture device 256. For example, stray light and/or incidental light may result in glare and/or washed out areas in video frames captured using the capture device 256. The lens hood 262 may prevent and/or partially block stray light and/or incidental light, which may prevent undesired effects in the captured video data. In one example, the lens hood 262 may have a length (e.g., extending from the housing 250) of approximately 67 mm, a base width (e.g., connected along the housing 250) of approximately 100 mm and/or a front width (e.g., over the capture device 256) of approximately 54 mm.

The lens hood 262 may enable sun glare protection for the capture device 256. In some embodiments, the lens hood 262 may provide housing for antennae. For example, antennae for Wi-Fi and/or Bluetooth may be implemented within the lens hood 262. Implementing antennae within the lens hood 262 may enable the housing 250 to implement heat dissipating materials that may interfere with wireless communication.

Hinges 264a-264b are shown on a side of the smart security floodlight 102n. The hinges 264a-264b may connect the back panel 252 to the housing 250. In some embodiments, the hinges 264a-264b may provide support for mounting the smart security floodlight 102n to a wall. The hinges 264a-264b may enable the back panel 252 to be opened to enable access to the wiring and/or power supply of the smart security floodlight 102n. For example, even after the smart security floodlight 102n is secured to a wall, the hinges 264a-264b may enable the back panel 252 to be opened.

A lens 266 is shown on the capture device 256. The lens 266 may receive light to enable the capture device 256 to capture images that may be used to generate video data. A position of the lens 266 may be movable to enable the capture device 256 to adjust a location of the field of view captured. The lens hood 262 may prevent the stray light and/or incident light from entering the lens 266 to prevent glare.

The lens 266 may comprise a wide angle lens. The wide angle lens 266 may enable the security floodlight 102n to capture a wide angle field of view (e.g., generate wide angle video frame). In some embodiments, the video frames generated from the light captured may have a barrel effect (e.g., a bulge distortion) caused by the wide angle lens 266.

The processor 114 implemented by the smart security floodlight 102n may be configured to correct (e.g., dewarp) the barrel distortion effect.

The front of the housing 250 may have an LED cover 268a-268b. The LED cover 268a-268b may comprise a left portion 268a and right portion 268b. The LED cover 268a-268b may have an upper portion and a lower portion. The capture device 256 may be at the middle of the upper portion of the LED cover 268a-268b. Generally, the upper portion of the LED cover 268a-268b may be slightly angled downwards (e.g., to provide the downwards field of view for the capture device 256). On the left side LED cover 268a, the upper portion may be angled slightly outwards to the left. On the right side LED cover 268b, the upper portion may be angled slightly outwards to the right. The PIR sensor 258 may be at the middle of the lower portion of the LED cover 268a-268b. Generally, the lower portion of the LED cover 268a-268b may be angled downwards at a greater angle than the upper portion of the LED cover 268a-268b. On the left side LED cover 268a, the lower portion may be angled slightly outwards to the left. On the right side LED cover 268b, the lower portion may be angled slightly outwards to the right.

Light panels 270a-270b are shown underneath the LED cover 268a-268b. In the example shown, the smart security floodlight 102n may comprise two light panels 270a-270b. In some embodiments, four light panels 270a-270d may be implemented (e.g., two implemented underneath the left LED cover portion 268a and two implemented underneath the right LED cover portion 268b). For example, the light panel 270a may be located adjacent to the capture device 256 on one side. The light panel 270a may be generally directed straight outwards from the smart security floodlight 102n and angled towards one side (e.g., angled to direct light to the right side of the smart security floodlight 102n). The light panel 270b may be located adjacent to the capture device 256 on an opposite side of the light panel 270a. The light panel 270b may be generally directed straight outwards from the smart security floodlight 102n and angled towards one side (e.g., angled to direct light to the left side of the smart security floodlight 102n). For example, the outwards and slightly downwards angle of the sides of the upper portion of the LED cover 268a-268b may direct the light panels 270a-270b to the left and to the right of the smart security floodlight 102n and out in front of the smart security floodlight 102n.

In embodiments with four light panels (e.g., light panels 270a-270d), the light panels 270c-270d may be located on the lower portion underneath the LED covers 268a-268b. The light panel 270c may be located below the light panel 270a and generally directed on a downwards angle. The light panel 270d may be located below the light panel 270b and generally directed on a downwards angle. For example, the outwards and downwards angle of the sides of the lower portion of the LED covers 268a-268b may direct the light panels 270c-270d to the left and to the right of the smart security floodlight 102n and below the smart security floodlight 102n.

A heatsink 272 is shown on the top of the smart security floodlight 102n. The heatsink 272 may comprise metallic fins. The metallic fins of the heatsink 272 may be configured to dissipate heat. For example, the light panels 270a-270b and/or other components of the smart security floodlight 102n may generate heat and the heatsink 272 may ensure a safe operating temperature for the smart security floodlight 102n. In an example, the heatsink 272 may be bare aluminum configured to reflect sunlight during the daytime and dissipate heat from a heatsink internal to the housing 250 when the light panels 270a-270b are powered on. In an example, by implementing the heatsink 272, the smart security floodlight 102n may operate at approximately 28 degrees Celsius above ambient temperature after 30 minutes of continuous operation.

Dotted lines 280a-280n are shown. The dotted lines 280a-280n may represent the light emitted by the light panels 270a-270b. The light 280a-280n generated by the light panels 270a-270b may be configured to illuminate an area below a level of the smart security floodlight 102n. The light 280a-280n generated by the light panels 270a-270b may be configured to illuminate an area in front of the smart security floodlight 102n. The light 280a-280n generated by the light panels 270a-270b may be configured to provide lighting to enable the lens 266 to receive light to enable the capture device 256 to generate pixel data that may be used to generate the video frames.

The light panels 270a-270b may comprise LED lighting elements. The light panels 270a-270b may be configured to generate white light. In an example, the smart security floodlight 102n may be configured to control a brightness of the white light (e.g., perform dimming and/or increasing an intensity of the white light). In another example, the smart security floodlight 102n may be configured to control a temperature of the white light (e.g., softer 'natural' white lighting to 'cool' white lighting). In an example, the white light generated by the light panels 270a-270b may be tunable from $3k$ to $5k$ Kelvin color temperature and generate up to 10000 lumens. The light panels 270a-270b may be configured to generate colored lights. In an example, the light panels 270a-270d may be configured to emit blue colored light and red colored light. In an example, the red and blue colored light may be approximately 920 lumens (e.g., brighter than 1000 lumens in red and blue light may be dangerously bright). For example, the flashing red and blue light may be similar to police lights. The intensity, hue, temperature and/or other characteristics of the light emitted by the light panels 270a-270b may be varied according to the design criteria of a particular implementation.

In some embodiments, each of the light panels 270a-270b may be configured to emit the white, red and blue colored lighting. In some embodiments, the tunable white light may be generated by all of the panels 270a-270b. In some embodiments, the red and blue colored lights may be generated by only the two light panels 270a-270b on the upper portion of the smart security floodlight 102n. For example, implementing the bottom light panels 270c-270d as white light may provide illumination while switching the top panels 270a-270b from white light to the red and blue light may provide a warning and/or deterrent effect. The arrangement of the light panels 270a-270d may be varied according to the design criteria of a particular implementation.

The LED panels 270a-270d may be configured to operate in various modes of operation. In one example, one mode of operation of the light panels 270a-270d may illuminate an area near the smart security floodlight 102n. For example, the light panels 270a-270d may each emit white light for illumination. In another example, one mode of operation of the light panels 270a-270d may focus a high intensity light beam on a target. For example, the smart security floodlight 102n may comprise a mechanism for adjusting the direction of the light panels 270a-270d. Video analysis may be implemented to detect an object (e.g., identify a target such as an intruder). The light panels 270a-270d may be directed to follow the movement of the target based on the location of the target detected by analyzing the video frames. In yet another example, one mode of operation of the light panels 270a-270d may strobe colored light. For example, the light panels 270a-270b (e.g., the panels on the upper portion of the LED cover 268a-268b) may generate the red and blue light with a strobe effect. In another example, the white light may provide a strobe effect. For example, the strobe effect of the light 280a-280n along with other deterrent measures (e.g., a siren) may be 99% effective at deterring intruders (e.g., causing potential intruders to leave before damage/theft occurs). The patterns of lighting, the lighting effect and/or the number of modes of operation of the light panels 270a-270d may be varied according to the design criteria of a particular implementation.

Figure 5:
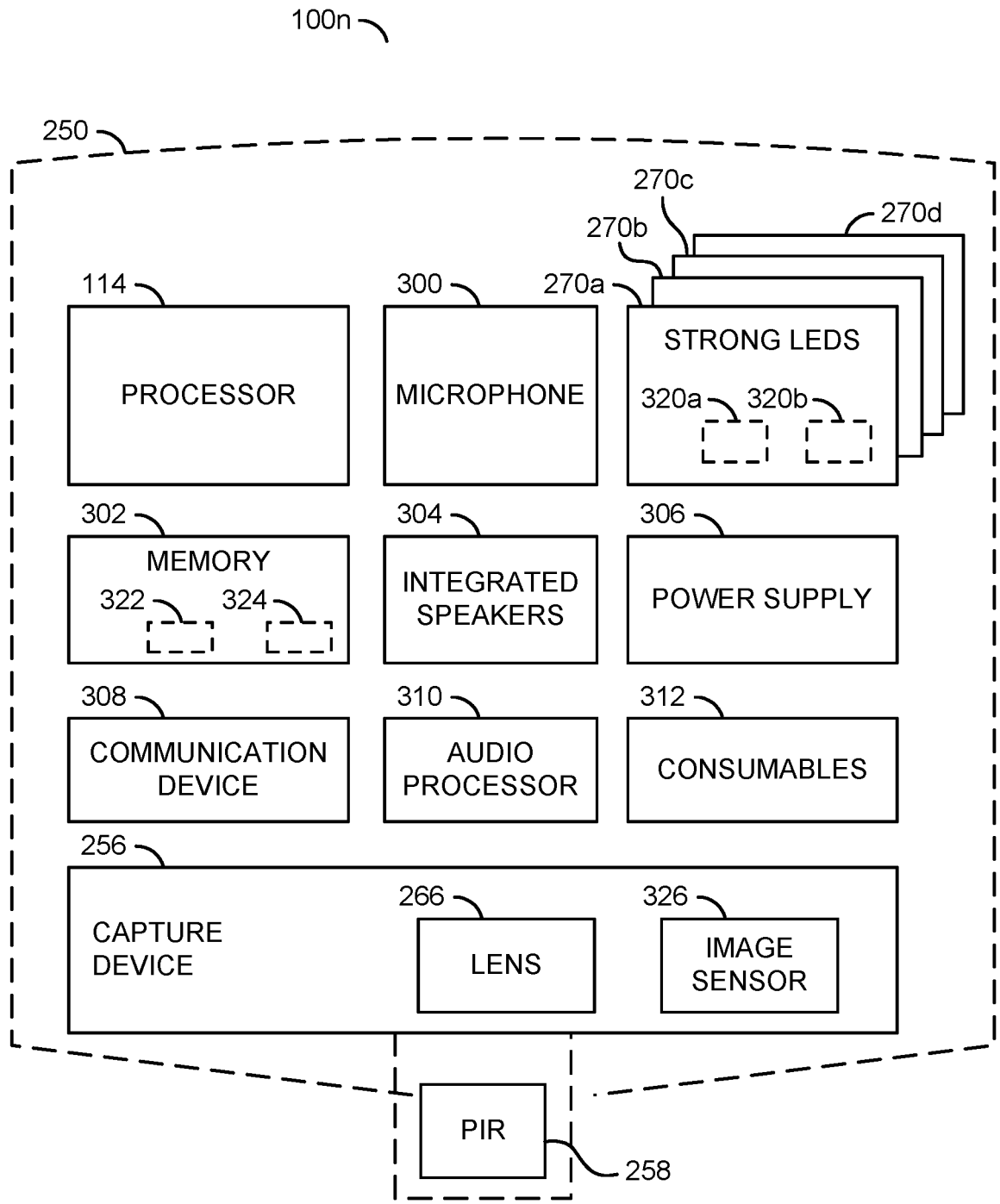
FIG. 5 is a diagram illustrating components of the security floodlight.

Referring to FIG. 5, a block diagram illustrating components of the security floodlight is shown. The housing 250 of the smart security floodlight 102n is shown. The housing 250 may be hollow to provide a protective and/or decorative enclosure for the components of the smart security floodlight 102n. The components of the smart security floodlight 102n may be contained within or partially contained within the housing 250. The housing 250 may have a limited amount of internal space. To provide functionality, the components of the smart security floodlight 102n may need to fit within the size and/or heat dissipation constraints of the hollow housing 250.

The housing 250 may comprise the capture device 256, the PIR sensor 258, the LED panels 270a-270d, the processor 114, a block (or circuit) 300, a block (or circuit) 302, a block (or circuit) 304, a block (or circuit) 306, a block (or circuit) 308, a block (or circuit) 310 and/or a block (or circuit) 312. The circuit 114 may implement the processor. In an example, the processor 114 may be a video processor. The circuit 300 may implement the microphone. The circuit 302 may implement a memory. The circuit 304 may implement the integrated speakers. The circuit 306 may implement the power supply. The circuit 308 may implement the communication device. The circuit 310 may implement an audio processor. The circuit 312 may implement a consumable actuator. The smart security floodlight 102n may implement other components (not shown). The number, type and/or arrangement of the components of the smart security floodlight 102n may be varied according to the design criteria of a particular implementation.

The video processor 114 may be configured to generate video data in response to pixel data received from the capture device 256. The video processor 114 may be configured to generate high bitrate video frames (e.g., video frames that have a high resolution and/or a high frame rate). The video processor 114 may be configured to generate low bitrate video frames (e.g., video frames that have a lower resolution and/or a lower frame rate than the high bitrate video frames). In some embodiments, the low bitrate video frames may be generated from the high bitrate video frames. In some embodiments, the low bitrate video frames and the high bitrate video frames may be generated in parallel from the same raw video content (e.g., pixel data) by the processor 114. In one example, the high bitrate video frames may be generated by the processor 114 for long term storage locally on the smart security camera light 102n, for edited footage and/or for sharing. In another example, the low bitrate video frames may be generated by the processor 114 for quick review and editing on the VMS implemented by the cloud computing service 104 and/or for cloud storage in the storage servers 120a-120n.

The video processor 114 may be configured to generate multiple parallel video streams. The parallel video streams may comprise the same video content (e.g., video data comprising a recording of the same area captured at the same time) captured but having different properties (e.g., format, frame rate, resolution, compression, etc.). In one example, three parallel video streams may be generated including the high bitrate video stream, the low bitrate video stream and a medium bitrate for live viewing (e.g., on the user devices 106a-106n) and editing (e.g., short term storage on the storage servers 120a-120n and long term storage on the smart security camera light 120n). The processor 114 may generate any number of parallel video streams (e.g., limited by the hardware capabilities). The number of parallel video streams generated by the video processor 114 may be varied according to the design criteria of a particular implementation.

The video processor 114 may be configured to perform the video operations (e.g., digital panning, zooming and tilting (e.g., PZT), digital cropping, video analysis, object detection, behavior detection, object location tracking over a sequence of video frames, etc.). The video analysis performed by the video processor 114 (e.g., the AI model 118) may be configured to detect and/or recognize objects. The video analysis performed by the processor 114 may track movement of an object temporally over a sequence of video frames.

The video processor 114 may be configured to encode and/or decode video frames into various formats (e.g., video formats and/or still image formats). The video processor 114 may be configured to compress and/or stream video data. The video processor 114 may be configured to re-size images and/or video frames for a fixed resolution (e.g., a fixed resolution used by a neural network).

In some embodiments, the video processor 114 may implement a neural network (e.g., the AI model 118). The neural network 118 may be configured to analyze the video data in real time. The video analysis performed by the neural network 118 may detect, recognize and/or classify objects. For example, the objects may comprise people (e.g., a visitor), animals, inanimate objects (e.g., a delivered package), etc. The video analysis may be configured to learn patterns, recognize objects and/or recognize faces. The processor 114 may be configured to de-warp the video captured (e.g., correct distortions caused by the lens 266).

The processor 114 may be configured to read information from the components of the smart security floodlight 102n, write information to the components of the smart security floodlight 102n and/or execute computer readable instructions. In one example, the processor 114 may be a video processor. The processor 114 may be configured to perform video processing operations to generate video frames. The processor 114 may be configured to select still images from the video frames to upload to a remote device (e.g., distributed servers). The processing capability of the processor 114 may be limited due to size constraints, power constraints, cost constraints, etc.

The processor 114 may be configured to detect one or more triggering events. The triggering events may occur when a particular input is determined to be above some pre-determined threshold value. The processor 114 may analyze input detected by one or more of the components of the smart security floodlight 102n to determine whether the detected input is above the pre-determined threshold. In one example, the triggering event may be when the processor 114 determines that the input from the PIR sensor 258 is above a threshold for motion. In another example, the triggering event may be when the processor 114 determines that the incoming audio detected by the microphone 300 is above a particular audio level and/or matches a particular frequency pattern. In an example, when the processor 114 determines that a triggering event has occurred, the processor 114 may adjust the mode of operation of the light panels 270a-270d (e.g., strobe the red/blue lights, track a movement of an identified object with a high intensity light beam, increase the brightness of the white light, etc.). The type of input and/or the threshold value for the particular type of input that results in a triggering event may be varied according to the design criteria of a particular implementation.

In one example, the processor 114 may be configured to analyze the video frames for a particular amount of motion and/or a change in the amount of light to detect a triggering event (e.g., an amount of motion above a threshold amount of motion). In another example, the processor 114 may implement the neural network artificial intelligence model 118 to determine whether the video frame has captured a particular type of object (e.g., a person, an animal, a vehicle, a package, etc.) to detect the triggering event. In an example, the processor 114 may implement a relatively simple neural network module that may be a modified and/or compressed version of the neural network module 132 implemented by the cloud computing service 104. The compressed simple neural network module 118 implemented by the processor 114 may have a reduced size and/or complexity to enable execution on the processor 114 and/or within the power and/or heat constraints of the smart security floodlight 102n.

The microphone 300 may receive audio signals (e.g., input audio). Audio signals detected by the microphone 300 may be used by the processor 114 to generate various control signals (e.g., a triggering event). In one example, audio signals generated by the visitor may be received by the microphone 300 to generate a control signal for the components of the smart security light 102n used to control the light panels 270a-270d, control a door (e.g., opening, closing, and/or locking a door) and/or generate audio from the integrated speakers 304. Audio signals detected by the microphone 300 may be used as an audio password. For example, voice recognition may be used to generate a password. The audio password may be needed to allow the smart security floodlight 102n to generate various control signals. In one example, the microphone 300 may capture the audio input 144 and present the audio input 144 to the communication device 308 for streaming to a smartphone, a remote server and/or a call center. In another example, the microphone 300 may capture the audio input 144 and present the audio input 144 to the audio processing component 310 for encoding (e.g., to be stored by the storage component 302).

The memory (or storage component) 302 may be configured to provide electronic storage for the captured video frames, audio files for playback, computer readable instructions, firmware, etc. The memory 302 may store computer readable data (e.g., images, audio, video, sensor readings and/or other data). In one example, the storage component 302 may be a non-volatile storage medium. In another example, the storage component 302 may be a combination of non-volatile and volatile memory. Data stored in the memory 302 may be compared to various signals from sensor modules implemented by smart security floodlight 102n. In one example, the data stored in the memory 302 may be a password. The processor 114 may compare the password with signals from the sensor modules. The comparison may determine whether a triggering event has occurred. The storage component 302 may store audio data (e.g., the pre-recorded audio for playback, the received audio), video data (e.g., the video streams, still images), computer readable instructions and/or other data.

The integrated speakers 304 may generate audio signals. The integrated speakers 304 may be configured to playback audio. The integrated speakers 304 may comprise multiple speakers that may be located near the speaker grilles 260a-260c shown in association with FIG. 4. The integrated speakers 304 may be implemented as more than one speaker. In one embodiment, the integrated speakers 304 may be configured to generate a loud volume sound (e.g., over 110 dB at approximately 10 feet). However, the particular volume generated may be varied to meet the design criteria of a particular implementation.

The power supply (or power adapter) 306 may receive electrical power from the premises. Electrical power from the premises may be presented via the back panel 252. The power adapter 306 may convert the electrical power (e.g., from AC to DC). The converted electrical power may provide a power supply to the various components within the housing 250. The power adapter 306 may perform voltage regulation. In one example, the power adapter 306 may be implemented as a 5V power adapter.

In one example, the power storage component 306 may be a battery (e.g., rechargeable) configured to supply power to the components of the smart security floodlight 102n. In another example, the power storage and/or adapter component 306 may be configured to convert an AC power supply to DC power usable by the components of the smart security floodlight 102n.

The communication device 308 may be configured to implement wireless communication. The communication device 308 may be configured to implement one or more wireless communications protocols (e.g., Wi-Fi, Bluetooth, ZigBee, ZWave, etc.). The communication device 308 may be configured to receive instructions from a remote (Internet) source. The communication device 308 may be configured to connect to a local network and/or a wide area network (e.g., the network 50). In some embodiments, the communication device 308 may be configured to implement one or more types of communications protocols. For example, the communication device 308 may support a Wi-Fi connection and/or a Bluetooth connection. In some embodiments, the communication device 308 may be distributed as multiple circuits (e.g., a processing chip for each communications protocol). Other types of communications protocols may be implemented according to the design criteria of a particular implementation. In some embodiments, the communication device 308 may implement the Bluetooth connection to connect to a remote device (e.g., a smartphone) to provide an interface for configuring the smart security floodlight 102n (e.g., to allow the user to input local network settings).

The communication device 308 may receive and/or transmit data signals. The communication device 308 may register electromagnetic signals, acoustic signals, and/or other signals. The communication device 308 may provide control signals (e.g., to turn on the LED panels 270a-270d, create sound from one or more of the integrated speakers 304, send alerts to users, send other wireless signals, etc.).

In some embodiments, the communication device 308 may implement the Wi-Fi connection to connect to the cloud service 104 via the internet 50. The communication device 308 may enable a stream of the video data and/or images generated by the processor 114 to the cloud service 104. In one example, the communication device 308 may find an available server and upload the video stream and/or images to the available server. In another example, the communication device 308 may implement an upload queue and the available server may pull the data from the upload queue. The communication device 308 may be configured to receive the signals from the remote device 104 as instructions to perform the various security feature reactions selected by the AI model 132.

The communication device 308 may enable the smart security floodlight 102n to communicate with other security floodlights to form a network of security floodlights. The network may provide multi-camera co-ordination (e.g., to cover a large area such as in a car dealer lot, buildings with electrical panels, retail malls, churches, schools, etc.) to create an effective deterrent. In some embodiments, the security floodlight may communicate with UAV drones to track intruders.

In some embodiment, the audio processing component 310 may be a separate processor from the video processor 114. In some embodiments, the audio processing component 310 may be implemented as a component, submodule and/or chiplet of the video processor 114. The audio processor 310 may be configured to encode, decode and/or play back audio. In an example, the audio processing component 310 may be configured to play back pre-recorded audio stored in the storage component 302 (e.g., pre-recorded greetings, alarms, music, etc.). In another example, the audio processing component 310 may be configured to play back audio received from a smartphone and/or from a remote call center in real-time.

In some embodiments, the audio processing component 310 may be configured to stream audio signals from a smartphone, and/or other devices within range of the smart security floodlight 102n. The communication module 308 (e.g., a Wi-Fi antenna) may be configured to communicate with the smartphone, and/or other devices to send and/or receive audio signals. In some embodiments, the communication module 308 may comprise a connection port that may be configured to communicate with various devices to send and/or receive audio signals (e.g., via USB). The audio signals may be stored in the memory 302. In one example, the integrated speakers 304 may generate audio signals to attract outdoor wildlife and/or chase away undesired wildlife. The smart security floodlight 102n may capture images of the wildlife. Images may be stored in the memory 302. An alert may be sent to the user via the companion application 160.

The consumable actuator 312 may be configured to release some type of consumable (e.g., pepper spray, tear gas, a foul smelling substance, etc.). Generally, the consumable may be re-fillable. Releasing the consumable may be one type of deterrent implemented by the smart security floodlight 102n. For example, the foul smelling substance may be released to encourage a loiterer to leave the area. In one example, the consumable actuator 312 may implement a spray for a liquid substance. The type of consumable actuator 312 implemented may be varied according to the design criteria of a particular implementation.

The light panels 270a-270d may comprise respective blocks (or circuits) 320a-320b. The circuits 320a may each implement a LED controller for a respective one of the light panels 270a-270d. The circuits 320b may each implement a pan/tilt (PZ) actuator for a respective one of the light panels 270a-270d. The light panels 270a-270d may comprise other components (not shown). The type and/or arrangement of the components of the light panels 270a-270d may be varied according to the design criteria of a particular implementation.

The LED controllers 320a may each be configured to adjust a timing, color, brightness, etc. of the LEDs 270a-270d. The LED controllers 320a may provide independent control of the LEDs 270a-270d. For example, the LED controllers 320a may adjust the color of the LEDs 270a-270d from a white light to red, white and blue (e.g., to provide a deterrence that is similar to a police light). The LED controllers 320a may adjust the LEDs 270a-270d to operate as a strobe light. In an example, control signals generated by the processor 114 may provide instructions for the LED controllers 320a. The LED controllers 320a may be configured to select the mode of operation of the light panels 270a-270d. The independent control of the LEDs 270a-270d performed by the LED controllers 320a may enable each of the LEDs 270a-270d to be turned on/off, dimmed/brightened and/or strobed independent from each other.

The PT actuators 320b may be configured to provide pan and/or tilt adjustments to the LEDs 270a-270d. The PT actuators 320b may be controlled by the LED controllers 320a-320d. The PT actuators 320b may enable the LEDs 270a-270d to provide general illumination. The PT actuators 320b may enable the LEDs 270a-270d to move in order to provide a focused light beam (e.g., place a spotlight on a target location). In one example, the LED panels 270a-270d may be reflected from a focusing mirror controlled by 2 step motors. In another example, a powerful light beam may be directed on an object of interest. In yet another example, a small group of LED elements may be selected from a large array of LED elements in the light panels 270a-270d to aim and focus on the object of interest. The PT actuators 320b may be configured to enable the light panels 270a-270d to be adjusted based on the mode of operation of the light panels 270a-270d.

The memory 302 may is shown comprising a block (or circuit) 322 and/or a block (or circuit) 324. The circuit 322 may comprise an onboard memory. The circuit 324 may comprise a storage device. The onboard memory 322 may comprise a random access memory (RAM), a cache memory, a firmware, etc. In an example, the onboard memory 322 may store the computer readable instructions that may be executed by the processor 114.

The storage device 324 may be configured for local mass storage. The storage device 324 may be configured to store the video frames generated by the processor 114. The storage device 324 may be configured to store high bitrate and/or low bitrate versions of the video data captured. The storage device 324 may be configured to store metadata associated with the video data generated by the processor 114. The storage device 324 may be configured to provide storage to enable 24/7 video recording for a particular length of time (e.g., a month, a week, a year, etc.). The storage device 324 may be configured to implement mass storage at the edge device.

In one example, the storage device 324 may be a SD card (or microSD card). In an example, an SD card with 1 TB capacity may store 90 days storage of HD video. In another example, the storage device 324 may be a solid state drive. In an example, a solid state drive may offer 1 TB to 4 TB of storage capacity. The housing 250 of the smart floodlight embodiment may comprise enough physical space to fit a solid state drive as the storage device 324. Embodiments of the smart devices 102a-102n that have size constraints (e.g., the wall plate adapter embodiment) may implement the SD card as the storage device 324. The storage device 324 may enable the high resolution and high frame rate video to be stored with indexing (to enable synchronization) to low resolution and low frame rate video. The type of storage technology and/or form factor for the storage device 324 may be varied according to the design criteria of a particular implementation.

The capture device 256 is shown comprising the lens 266 and/or a block (or circuit) 326. The circuit 326 may implement an image sensor. The capture device 256 may comprise other components (not shown). In an example, the capture device 256 may comprise a frame buffer and/or other logic. The number, type and/or arrangement of the components of the capture device 256 may be varied according to the design criteria of a particular implementation.

The video processor 114 may generate video frames (e.g., one or more video streams) in response to the pixel data received from the image sensor 326. The image sensor 326 may implement video and/or image capture devices. The image sensor 326 may be configured to receive the light that enters the capture device 256 through the lens 266. In an example, the image sensor 326 may be rectangular with a 16:9 aspect ratio.

The image sensor 326 may be configured to receive incoming light within a truncated rectangular pyramid field of view (e.g., truncated as a result of the glare reduction implemented by the lens hood 262). The image sensor 326 may be configured to convert received light into computer readable data (e.g., raw data and/or pixels that may be processed by the processor 114 to generate video frames). The image sensor 326 may be implemented to enable video data to be recorded.

The lens 266 shape and/or location may correspond with the image sensor 326. The lens 266 may be configured to focus incoming light onto the image sensor 326. The lens 266 may be a wide-angle lens. In an example, the lens 266, the image sensor 326 and/or other circuits may implement the capture device 256. The processor 114 may be configured to generate video frames by performing image signal processing in response to captured pixels transmitted from the image sensor 326. In some embodiments, the image sensor 326 may be configured to generate the video frames (e.g., perform image signal processing) from the captured pixels and present the video frames to the processor 114.

The image sensor 326 may enable the capture of video data using the processor 114. For example, the processor 114 may be configured to generate 720p HD, 1420p, 4K and/or 8K video data from the pixel data captured by the image sensor 326. The image data (e.g., pixels) may be used to generate high-resolution video frames along with audio data. The quality of the video frames may be varied according to the design criteria of a particular implementation. Generally, the quality (e.g., resolution, level of detail, color, etc.) of the video frames is enough to support object detection (e.g., facial recognition, motion detection, object identification, tagging, etc.).

In some embodiments, the video processor 114 may be configured to generate time-lapse videos at maximum resolution that may be stored locally in the memory 302 for transmission when there may be more bandwidth available (e.g., night transmission). The video processor 114 may be configured to provide instructions to the LED controllers 320a and/or the PT actuators 320b to focus the spotlight generated by one or more of the modes of operation of the light panels 270a-270d. The video processor 114 may provide artificial intelligent controls to move the LED panels 270a-270d (e.g., instructions to the PT actuators 320b) and/or control the LED panels 270a-270d (e.g., instructions to the LED controllers 320a to adjust brightness, frequency, color, etc.). The video processor 114 may select which audio to output through the speakers 304 (e.g., the 258 dB commercial siren, the conversational AI audio to engage intruders until help arrives, etc.). In some embodiments, the communication device 308 may be configured to scan for devices in the area of interest. The communication device 308 may detect mobile devices carried by the intruder. For example, mobile devices may transmit a MAC address that may be captured by the communication device 308. Based on the MAC address, the smart security floodlight 102n may be configured to generate a personalized voice down message. The personalized voice down message may comprise information determined based on the MAC address (e.g., the type of device, a network carrier used by the device, a name associated with the device, etc.). For example, the personalized voice message may be "We have detected your smartphone. We know that you are using a Samsung Galaxy S10e and are connected to a Verizon network".

The smart security floodlight 102n may further comprise various sensor modules (e.g., environmental sensors). In an example, the smart security floodlight 102n may comprise an electromagnetic field sensor, an acoustic field sensor, a voice recognition sensor, a facial recognition sensor, a gesture sensor, a weather sensor and/or other sensors. One or more of the sensor modules, or a combination of the sensors modules, may be implemented internally (e.g., within the housing 250) or, alternatively, may be implemented externally (e.g., as a separate sensing device coupled to the smart security floodlight 102n). Input received by the sensor modules may be used to generate control signals and/or detect triggering events.

In some embodiments, the smart security floodlight 102n may store the captured video frames (e.g., in the memory 302). In some embodiments, the video frames may be uploaded to storage servers (e.g., a remote device). Generally, the storage servers 120a-120n and/or the storage device 324 may have a limited storage capacity. In some embodiments, the smart security floodlight 102n may analyze the captured video frames (e.g., using the processor 114) and/or data from the IR sensor 258 to perform a particular type of detection (e.g., based on a triggering event). For example, the smart security floodlight 102n may detect objects, motion and/or visitors within 3 meters (e.g., 10 feet). Still images generated from the captured video frames may be uploaded to distributed servers 122a-122n. The neural network AI model 132 implemented by the distributed servers 122a-122n may determine whether objects are present in the images uploaded. Based on the feedback from the distributed servers 122a-122n, the smart security floodlight 102n may initiate storage of the video data in storage servers 120a-120n in response to the particular type of detection.

The processor 114 and/or the AI model 118 may implement machine learning techniques to improve detection accuracy of visitors and/or objects. For example, the user may be able to provide a correct and/or incorrect label to a detection performed by the processor 114. If the detection is incorrect, the incorrect label may be used by the smart security floodlight 102n to incorporate an incorrect result of the detection into the machine learning techniques. In some embodiments, the machine learning techniques may be implemented in the cloud service 104 (e.g., the analysis is performed using cloud computing resources) based on feedback about whether objects of interest were actually present. Video data and/or correct/incorrect labels may be uploaded and/or stored anonymously (e.g., without personal identification information). The smart security floodlight 102n may be configured to ignore (e.g., not respond to, not track and/or not send notifications in response to) small animals and/or shadows.

The components within and/or partially within the housing 250 may provide the functionality of the smart security floodlight 102n. In some embodiments, the components may implement the functionality for a smart security camera. In one example, the integrated speaker 304 and the audio processing device 310 may be configured to generate audio for communicating to a visitor and the microphone 300 may be configured to receive audio (e.g., to enable 2-way communication).

In some embodiments, the processor 114 and/or the audio processor 310 may be configured to perform audio analytics. The microphone 300 may capture audio input. In an example, the audio input 144 may be a response from a visitor. The processor 114 and/or the audio processor 310 may extract words and/or sounds from the audio input to determine the content of the audio input 144. The audio analytics may be configured to parse the content of the audio input 144 to determine a meaning of and/or understand the audio input 144. In some embodiments, the audio analytics may transcribe the content of the audio input 144 to provide training data for machine learning. Using the audio analytics to understand the audio input 144 may enable the processor 114 to determine the context and/or generate an appropriate reaction.

The smart security floodlight 102n may be configured to deter potential intruders. In some embodiments, the security features of the smart security floodlight 102n selected as a reaction to the detected intruder may be selected by the AI model 132. In an example, an effectiveness measurement of deterrence of intruders may be determined based on a metric of detecting that the potential intruder(s) has left a field-of-view of the capture device 256 within approximately 60 seconds and the intruders are not detected afterwards. One example deterrent method implemented by the smart security floodlight 102n may be the processor 114 providing a control signal to the LED controllers 320a-320d to cause the light panels 270a-270d to provide a very bright red/blue colored strobe effect along with the integrated speaker 304 generating sound of a police siren wailing at 110 dB.

In an example, the image sensor 326 may be configured to provide data for the processor 114 to generate 4k resolution video frames. The processor 114 may be configured to generate 4k resolution video frames at approximately 15 frames per second for recording (e.g., stored in the memory 302). The processor 114 may be also configured to generate lower resolution video frames simultaneously (e.g., video frames at 720P resolution for streaming via the communication device 308 and/or for storage in the memory 302). The processor 114 may be configured to provide digital pan/tilt/zoom features. In an example, the processor 114 may provide a 32× digital zoom to enable generating 480P lower resolution video frames from the high resolution 4k video frames.

The integrated speakers 304 may be implemented as multiple speakers. In an example, the integrated speakers 304 may comprise a center, left and right speaker (e.g., generally corresponding with the location of the speaker grills 260a-260b shown in association with FIG. 4). Each of the integrated speakers 304 may implement a 6 W speaker. The integrated speakers 304 may operate in conjunction with the microphone 300 and the communication device 308 to provide full duplex audio communication. The communication device 308 may provide an Ethernet connection, Wi-Fi communication (e.g., longer range wireless) and/or Bluetooth communication (e.g., shorter range wireless).

The processor 114 may be configured to generate control signals in response to video operations and/or analysis performed on the video data. In some embodiments, the control signals generated may be configured to generate audio from the speakers, control and/or adjust the lights and/or mechanically control the capture device 256 to pan, tilt and/or zoom the lens 266.

Video operations performed by the processor 114 may be configured to enable a digital pan, zoom and/or tilt (PZT) in real-time. The digital PZT may enable particular areas (e.g., areas that may be determined to be troubling areas) to be examined closely. The video operations may further comprise object detection. Objects may be identified in the video frames. For example, one object that may be detected is an intruder. The intruders may be tracked over a sequence of video frames to determine behavior and/or a location of the intruder. The high resolution video frames captured by the camera may be stored locally and/or transmitted wirelessly. To enable transmission of the video data wirelessly (e.g., over a Wi-Fi connection) the smart security floodlight 102n may be configured to perform video operations to crop portions of the high resolution video frames into one or more lower resolution video frames.

In some embodiments, the processor 114 may perform the computer vision analysis to detect events locally and upload the results of the computer vision analysis to the remote device 104 (e.g., as metadata along with the video data). In some embodiments, the processor 114 may generate and/or encode the video data and transmit the video data to the remote device 104 without performing analysis. For example, the AI model 132 may perform the video analysis on the video data generated by the processor 114. In some embodiments, the computer vision analysis performed by the processor 114 may be an initial threshold analysis (e.g., to flag any potential events at a basic level) and the AI model 132 in the remote device 104 may perform a more detailed computer vision analysis only on the video data that has been flagged by the processor 114. For example, the processor 114 may determine whether an object detected is a person and the AI model 132 may perform more detailed facial recognition analysis on the detected person to identify the person. Whether the computer vision operations are performed by the AI model 132 in the remote device 104 or by the AI model 118 of the processor 114 may be varied according to the design criteria of a particular implementation. Details of the components and/or functionality of the smart security floodlight 102n may be described in association with U.S. application Ser. No. 16/850,924, filed on Apr. 16, 2020, appropriate portions of which are hereby incorporated by reference.

The smart security camera lights 102a-102n may be configured to capture video and record the captured video to the local storage 324. The video captured may comprise 24/7 HD recordings. Storing the video data to the local storage 324 (e.g., on an SD card) may enable forensic analysis.

The smart security lights 102a-102n may be configured to be mounted on a wall and capture video of an area below. In an example, the smart security lights 102a-102n may be mounted with the capture device 256 approximately 7 feet high (e.g., near eye level or higher). The capture device 256 may enable approximately 40 degree rotation (e.g., left, right, and down). The capture device 256 may enable approximately a 30 foot viewing range with night vision.

The integrated speaker 304 may be a large and powerful speaker (e.g., audio range from 150 Hz-10 kHz at 110 dB). The communication device 308 may implement dual-band Wi-Fi. The housing 250 may be implemented with an enclosure rating of IP65 (e.g., water proofing). The local storage device 324 may be located within the housing 250.

In some embodiments, the local storage device 324 may be located outside the housing 250 and connected by a physical connection (e.g., a USB connection) or a wireless connection. The processor 114 may be configured to implement AI detection of various objects and/or events. The responses initiated by the processor 114 in response to the objects and/or events detected (e.g., a siren, automatic voice down audio generation, the consumables 312) may provide approximately 98% intruder deterrence.

In the example shown, the smart security camera light 102n is shown implemented as a smart security floodlight embodiment. The smart security floodlight embodiment 102n may comprise the housing 250 with a large amount of interior space. The large housing 250 of the smart security floodlight embodiment 102n may enable a larger device (e.g., large physical size) to be used for the local storage device 324. Larger device may provide a larger amounts of storage capacity (e.g., a portable hard drive and/or a portable SSD may offer 2 TB to 4 TB storage or more). Embodiments of the smart security camera light 102a-102n that implement the wall plate adapter may have limited physical space within the housing 250. A smaller device (e.g., smaller physical size) may be used for the local storage 324 (e.g., a SD card, a microSD card, etc.) to accommodate the smaller housing 250. While the processor 114, the capture device 256, the lights 270a-270d and/or the components 300-312 are described with respect to the smart security floodlight embodiment 102n, the functionality of the processor 114, the capture device 256, the lights 270a-270d and/or the components 300-312 may be the same or similar for other embodiments of the smart security camera lights 102a-102n (e.g., the wall plate adapter, an all-in-one exterior light design, etc.).

Figure 6:
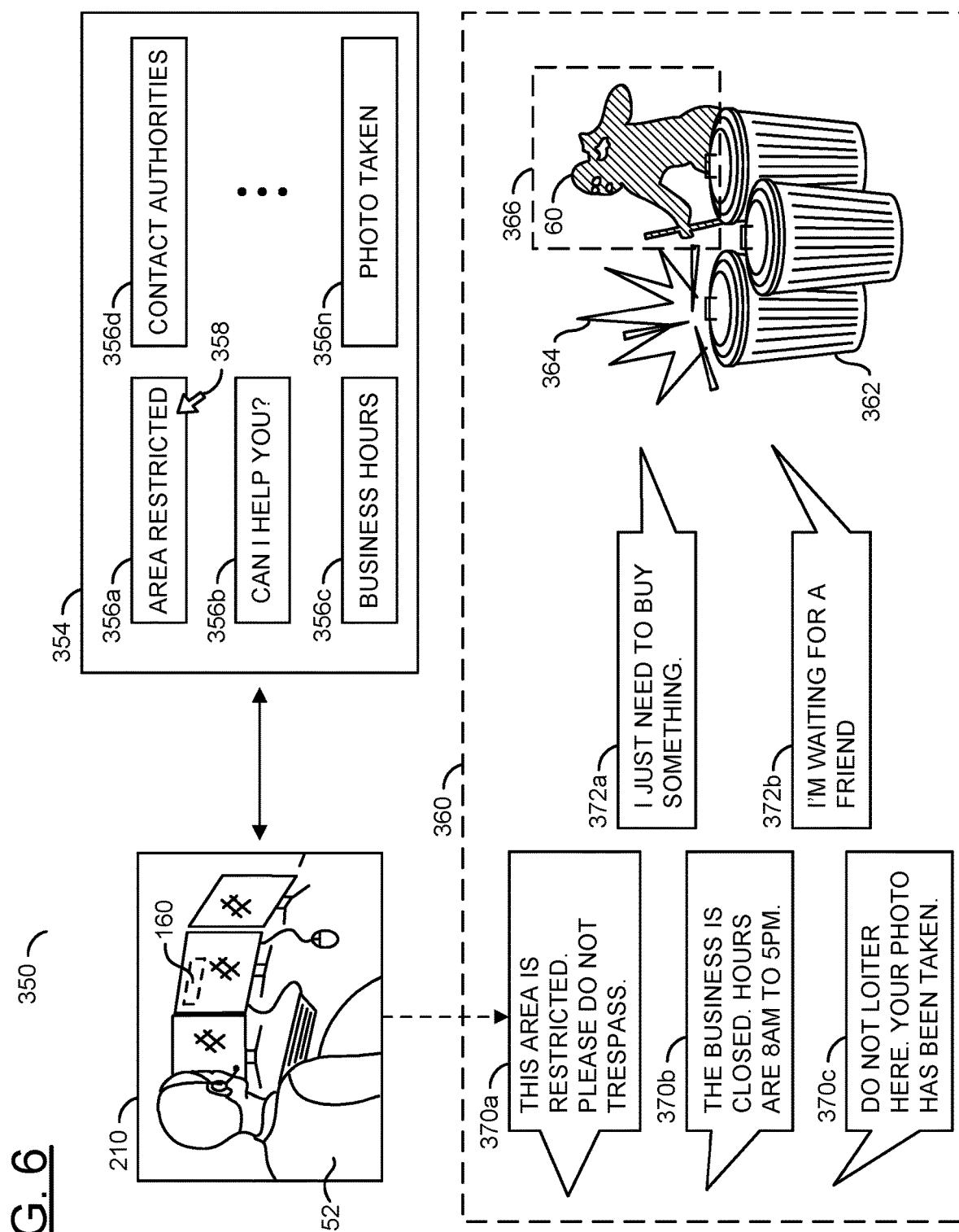
FIG. 6 is a diagram illustrating active engagement and third party service engagement of a visitor.

Referring to FIG. 6, a diagram illustrating active engagement and third party service engagement of a visitor is shown. An example scenario 350 is shown. The example scenario 350 may comprise the third party services 210 selecting reactions and/or tagging metadata for the smart devices 102a-102n. A security guard or security personnel (or receptionist) 352 is shown at the third party services 210. The security personnel 352 may be a remote user. The security guard or security personnel 352 may use the companion app 160 to monitor the video feeds 260a-260n from a location remote from the location of the smart security devices 102a-102n (e.g., remote from the detected events). In the example shown, the security guard or security personnel 352 may be the user of the companion app 160. In one example, the security guard or security personnel 352 may be at a remote location from the smart security devices 102a-102n (e.g., in a different city, in a different country, on a different property, etc.). In another example, the security guard or security personnel 352 may be on the same property as the smart security devices 102a-102n (e.g., an attendant in a lobby of an apartment building that uses the smart security devices 102a-102n to monitor the property of the apartment building).

The third party services 210 may select reactions for the smart devices 102a-102n using an interface 354. In an example, the interface 354 may enable the security guard or security personnel 352 to select the reactions and communicate the reactions to the remote device 104. The remote device 104 may forward the reactions selected to the smart security devices 102a-102n. For example, the interface 354 may enable remote manual control of the reactions as an alternate option to the AI model 132 selecting the reactions.

The interface 354 may comprise a list of buttons 356a-356n. The list of buttons 356a-356n may enable the receptionist 352 to select one or more of the available audio message reactions 370a-370n. For example, the interface 354 may implement a soundboard that enables the receptionist 352 to select the audio played back by the smart devices 102a-102n.

A mouse pointer 358 is shown on the interface 354. For example, the receptionist 352 may use the mouse pointer 358 to interact with one of the buttons 356a-356n. The buttons 356a-356n are shown having basic descriptive messages. In an example, the button 356a may correspond to one of the audio message reactions that provides audio indicating that the area is restricted. In another example, the button 356c may correspond to one of the audio message reactions that provides audio to indicate the business hours for the particular property.

The description of the buttons 356a-356n may be generic to provide a common interface for the third party services 210 regardless of the particular property where the smart devices 102a-102n are located. The audio played by the particular one of the smart devices 102a-102n may be customized. For example, the receptionist 352 may select the business hours 356c without having to know the detailed business schedule of a particular business. In response to the selection of the business hours 356c, the smart devices 102a-102n may playback the audio 142 associated with the business hours (e.g., one business may have business hours of 8 am-4 pm, while another business may have hours of 9 am-5 pm). The interface 354 may enable the third party services 210 to have a common interface for selecting context-appropriate reactions without needing to know the exact details of the reaction, in order to provide faster responses (e.g., without needing to look up details for a particular business such as the business hours).

An example video frame 360 is shown. The example video frame 360 may be an example video frame captured by one of the smart devices 102a-102n (e.g., the smart security floodlight 102n). The example video frame 360 may comprise a view of the visitor 60. The computer vision analysis 366 is shown being performed on the visitor 60. The computer vision analysis 366 may also be performed on inanimate objects 362. For example, the AI model 132 and/or the video processor 114 may detect and/or classify the visitor 60 as a burglar (e.g., wearing a ski mask, attempting to hide in the shadows, hiding behind the objects 362, etc.). In another example, the AI model 132 and/or the video processor 114 may detect and/or classify the objects 362 as garbage cans. A shape 364 is shown to represent a sound. For example, the sound 364 may be the burglar 60 bumping into the garbage cans 362. The sound 364 may be one example of the audio input 144 captured. The audio processor 310 may analyze the sound 364 to determine the behavior and/or characteristics of the visitor 60. The analysis of the video and/or the audio may be used to determine the characteristics 656a-656n of the visitor 60.

Audio messages 370a-370c are shown. The audio messages 370a-370c may represent the audio output 142 generated by one of the smart security devices 102a-102n. In one example, the audio messages 370a-370c may be generated automatically using the audio processor 310. In another example, the audio messages may be played in response to the selections 356a-356n performed by the third party services personnel 352. In the example shown, the audio messages 370a-370c may represent a conversation with the visitor 60. Audio responses 372a-372b are shown. The audio responses 372a-372b may represent vocal responses by the visitor 60. For example, the visitor 60 may response to the audio messages 370a-370c with the vocal responses 372a-372b. The vocal responses 372a-372b may be the audio input 144 that may be received by the smart devices 102a-102n. The smart devices 102a-102n may communicate the vocal responses 372a-372b to the third party services 210 to enable the personnel 352 to enable two-way communication.

The audio message 370a from the smart device 102n is shown. The audio message 370a may be selected by the AI model 132 and/or the processor 114 in response to the video analysis and/or audio analysis used to classify the visitor 60 and/or in response to the reaction selected by the receptionist 352. The smart security floodlight 102n may play the audio message 370a to attempt to deter the visitor 60. In the example shown, the audio message 370a selected may be "This area is restricted. Please leave".

The smart device 102n may detect the response 372a from the visitor 60. In the example shown, the response 372a may be "I just need to buy something". The smart device 102n may contact the third party services 210. The smart device 102n may provide a recording of the response 372a to the third party services 210. In some embodiments, if the third party services 210 are unavailable or take a long time to connect to the smart device 102n, the smart device 102n may continue the active engagement with the visitor 60 (e.g., generate the reactions 370a-370n) based on decisions from the AI model 132 until the third party services 210 connects.

Connecting to the third party services 210 may be optional and/or depend on settings of the user. Generally, switching between the processor 114 (or remote device 104) selecting the reactions 370a-370n and the third party services 210 selecting the reactions 370a-370n may be seamless and/or be unknown to the visitor 60. For example, the third party services 210 may be able to imitate the conversational AI of the AI model 132 and the conversational AI of the AI model 132 may imitate human responses that would be selected by the third party services 210. For example, the smart devices 102a-102n may perform the conversational AI to provide an automated doorman service. If the third party services 210 are contacted, then the smart devices 102a-102n may operate in a different mode where the off-site agent 382 selects the reactions 370a-370n. The off-site agent 210 may enhance the capabilities of the automated doorman service. In one example, the off-site agent 210 may enhance the automated doorman service by enabling a person to speak to the visitor 60 remotely (e.g., provide more complex human interaction than the conversational AI is capable of providing). In another example, off-site agent 352 may enhance the automated doorman service by receiving instructions uploaded by the user. The user may upload specific instructions for the off-site agent 352 via the companion app 160. For example, when a package is expected, the user may upload instructions to allow the off-site agent 352 to sign for the package remotely, and make sure that the delivery person hides the package from view.

When the third party services 210 connects to the smart device 102n, the third party services 210 may receive the recording of the response 372a from the visitor 60. The third party services 210 may use the interface 354 to select the response 370a. In the example shown, the receptionist 352 may select the button 356c to playback the business hours. The response 370a is shown as "The business is closed. Hours are between 8 am and 5 pm.". The smart device 102n may continue to stream the video and/or audio data to the third party services 210 and/or the remote device 104.

The smart device 102n may stream audio of the response 372b of the visitor 60 (e.g., "I'm waiting for a friend") to the third party services 210. For example, the receptionist 352 may decide that the visitor 60 looks suspicious (e.g., wearing a ski mask) and is providing inconsistent answers (e.g., wants to buy something and then says waiting for a friend). The receptionist 352 may select the button 356n that may cause the smart device 102n to generate audio that states that the photo of the visitor 60 has been taken (e.g., "Do not loiter here. Your photo has been taken").

The reactions 370a-370n selected by the receptionist 352 may be uploaded to the cloud service 104. The cloud service 104 may use the reactions 370a-370n, and the audio and video captured by the smart device 102n to train an artificial intelligence model 132. The artificial intelligence model 132 may be used by the smart devices 102a-102n (or the remote device 104) to actively engage with the visitor 60 (e.g., implement conversational AI).

In addition to raising alerts and/or manual reactions selected by the receptionist 352, when the AI model 132 detects possible incidents, a reaction may be communicated to automatically play a series of customized warning messages of increasing severity. For example, the reactions may comprise security features such as increasing loudness of warning messages, sirens, flashing strobe lights, etc. Generally, automated responses may be selected first, before the receptionist 352 intervenes.

As the detected event continues (e.g., the visitor 60 does not leave the area in the video frame 360 in response to the automated responses), the AI model 132 may decide the next reaction should be real-time communication. The real-time communication may be between the receptionist 352 and the visitor 60. The real-time communication with the visitor 60 may streaming audio from the receptionist 352 (or the audio selected using the buttons 356a-356n) via the speaker 304, and receiving the audio responses 372a-372b using the microphone 300. The real-time communication may enable continual engagement until a patrol reaches the site of the event (e.g., one of the patrol vehicles 460a-460b).

Enabling the receptionist 352 to have manual control over various security features of the smart security floodlight 102n may enable the third party services 210 to be located anywhere. For example, the live audio reactions 370a-370c may enable monitoring from patrol cars, from a centralized location (e.g., a call center, from a command center, etc.) and/or by a property owner from anywhere (e.g., from home, from a small office, while on vacation, etc.). The location of the receptionist 352 may be varied according to the design criteria of a particular implementation. Details of the reactions that may be performed and/or the live interventions that may be performed may be described in association with U.S. application Ser. No. 16/792,642, filed on Feb. 17, 2020, appropriate portions of which are hereby incorporated by reference.

In some embodiments, the companion app 160 may enable the monitoring personnel 352 to manually tag events, objects and/or characteristics of the video frame 360. The manual tagging of events, objects and/or characteristics may be implemented in addition to and/or instead of the metadata generated by the processor 114 and/or the AI model 132. The monitoring personnel 352 may flag the event (e.g., the detection of the visitor 60). The event may be included as part of the metadata of the video frames (e.g., the manual tagging may be communicated back to the smart devices 102a-102n and stored with the video data by the storage device 324). In an example, the monitoring personnel 352 may provide a tag input that the visitor 60 has been detected. The monitoring personnel 352 may further provide tag inputs about the characteristics of the visitor 60 (e.g., wearing a ski mask, select the color of the clothes, indicate a male voice was heard in the audio responses 372a-372b, etc.). The monitoring personnel 352 may classify the event (e.g., a burglar was detected, a loiterer was detected, a false alarm was detected, etc.). The monitoring personnel 352 may manually tag the video frame 360 with a transcript of the audio messages 370a-370c, the audio responses 372a-372b and/or other audio heard. The types of tags that may be manually applied by the monitoring personnel 352 that may be included with the metadata may be varied according to the design criteria of a particular implementation.

Figure 7:
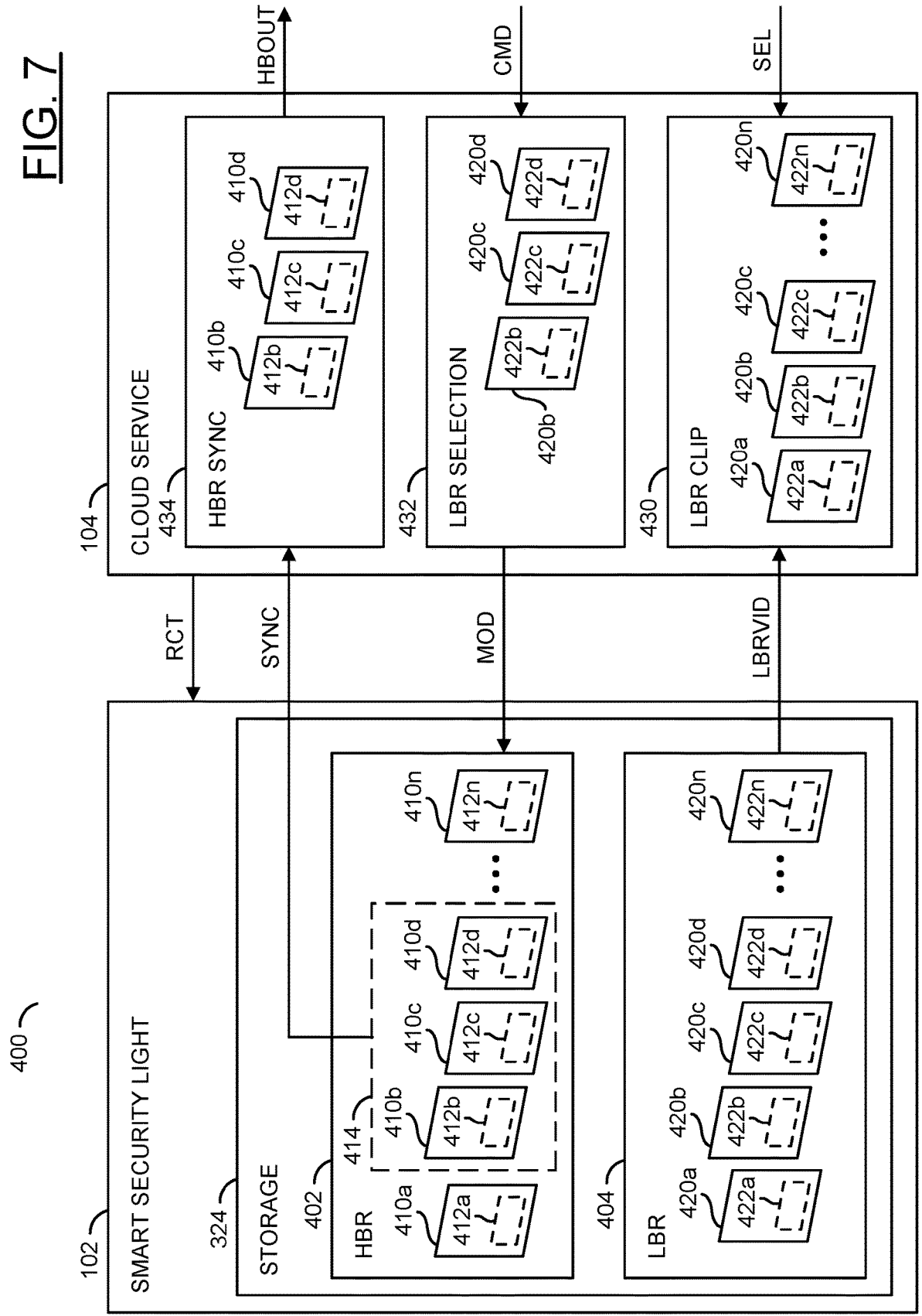
FIG. 7 is a diagram illustrating a video management system.

Referring to FIG. 7, a diagram illustrating a video management system is shown. A system 400 is shown. The system 400 may implement a video management system. The video management system 400 may comprise one or more of the smart security camera lights 102a-102n and the cloud computing service 104. In the example shown, one smart security camera light 102 is shown as a representative example of any one of the smart security camera lights 102a-102n.

The smart security camera light 102 is shown generating a signal (e.g., SYNC) and a signal (e.g., LBRVID). The signal SYNC and the signal LBRVID may each be presented to the cloud computing service 104. The cloud computing service 104 is shown generating a signal (e.g., HBOUT), a signal (e.g., MOD) and a signal (e.g., RCT). The signal HBOUT may be presented to the user devices 106a-106n (e.g., a remote user). The signal MOD and the signal RCT may be presented to the smart security light 102. The cloud computing service 104 is shown receiving a signal (e.g., SEL) and a signal (e.g., CMD). The signal SEL and the signal CMD may be presented by one or more of the user devices 106a-106n. The smart security camera 102 and/or the cloud computing service 104 may be configured to generate and/or receive other signals (not shown). The number, type and/or format of the signals communicating to/from the smart security camera 102 and/or the cloud computing service 104 may be varied according to the design criteria of a particular implementation.

The smart security camera light 102 is shown comprising the local storage 324. The local storage 324 may comprise a block (or circuit or module) 402 and/or a block (or circuit or module) 404. The block 402 may comprise high bitrate video storage. The block 404 may comprise low bitrate video storage. The local storage 324 may comprise other components (not shown). In an example, the local storage 324 may be configured to store other of the multiple parallel video streams generated by the processor 114. The high bitrate video storage 402 and the low bitrate video storage 404 are shown as separate components for illustrative purposes. The arrangement of data stored in the local storage 324 may be varied according to the design criteria of a particular implementation.

The high bitrate video storage 402 may comprise video frames 410a-410n. The video frames 410a-410n may be high bitrate video frames. The high bitrate video frames 410a-410n are shown comprising blocks 412a-412n. The blocks 412a-412n may comprise metadata and/or indexed data. A block 414 is shown. The block 414 may illustrate a subset of the high bitrate bitrate video frames 410a-410n. The subset of the high bitrate video frames 414 may comprise less than all of the high bitrate video frames 410a-410n. In the example shown, the subset of the high bitrate video frames 414 may comprise the high bitrate video frames 410b-410d, but not the high bitrate video frame 410a or the high bitrate video frames 410e-410n.

The low bitrate video storage 404 may comprise video frames 420a-420n. The video frames 420a-420n may be low bitrate video frames. The low bitrate video frames 410a-410n are shown comprising blocks 422a-422n. The blocks 422a-422n may comprise metadata and/or indexed data.

The processor 114 may be configured to generate the high bitrate video frames 410a-410n and the low bitrate video frames 420a-420n. In one example, the image sensor 326 of the capture device 256 may capture pixel data of the area near the smart security camera light 102. The pixel data may be processed by the processor 114 to convert the pixel data into video frames. The processor 114 may be configured to transcode, encode and/or compress the pixel data to arrange the pixel data as the high bitrate video frames 410a-410n and/or the low bitrate video frames 420a-420n. While only the high bitrate video frames 410a-410n and the low bitrate video frames 420a-420n are shown, the processor 114 may be capable of generating more than two types of video frames. The number, type, bitrate, encoding format, etc. for the video frames generated by the processor 114 may be varied according to the design criteria of a particular implementation.

The high bitrate video frames 410a-410n may comprise video frames that are high resolution and/or high frame rate. In one example, the high bitrate video frames 410a-410n may comprise video data in a 4K resolution at 60 frames per second. In another example, the high bitrate video frames 410a-410n may comprise video data in a 1080p resolution at 30 frames per second. The low bitrate video frames 420a-420n may comprise video frames that are at a low resolution and/or a low frame rate. In one example, the low bitrate video frames 420a-420n may comprise video data in a 640×480 resolution at 5 frames per second. In another example, the low bitrate video frames 420a-420n may comprise video data stored at one video frame for every five seconds.

Generally, the high bitrate video frames 410a-410n may have a higher bitrate compared to the low bitrate video frames 420a-420n. The particular resolution and/or frame rate of the high bitrate video frames 410a-410n and/or the low bitrate video frames 420a-420n may be varied. In one example, the high bitrate video frames 410a-410n may have a bitrate of approximately 3 Mbps while the low bitrate video frames 420a-420n may have a bitrate of approximately 50 kbps (e.g., approximately 100 times difference). The low bitrate video frames 420a-420n may comprise sufficient video data to enable the computer vision operations to be performed (e.g., either by the edge neural network 118 and/or the cloud neural network 132). The low bitrate video data 420a-420n may comprise a sufficient amount of video data to enable a person to view the video to apply modifications. For example, for security purposes, 1 video frame per 5 seconds may be sufficient for review and editing. The high bitrate video frames 410a-410n and the low bitrate video frames 420a-420n may comprise the same video content (e.g., pixel data of the same area recorded at the same time), but may comprise a different format, bitrate and/or other characteristics.

In some embodiments, the metadata 412a-412n and the metadata 422a-422n may be generated by the processor 114. In an example, the processor 114 may apply the timestamp and/or information about objects detected (e.g., classifications, characteristics, people detected, etc.) as the metadata. In some embodiments, the metadata 412a-412n and/or the metadata 422a-422n may comprise tag inputs manually selected by the remote personnel 352. In an example, the communication device 308 may upload the high bitrate video data 410a-410n or the low bitrate video data 420a-420n (or another one of the parallel video streams generated by the processor 114) to the monitoring service 210, the remote personnel 352 may apply tags based on what is seen or heard when reviewing the video content, the tags may be communicated back to the communication device 308, and the processor 114 may apply the tags as the metadata 412a-412n to the high bitrate video frames 410a-410n and as the metadata 422a-422n to the low bitrate video frames 420a-420n. The metadata 412a-412n and/or the metadata 422a-422n may comprise indexing information based on analysis of the video and/or analysis of the audio in the high bitrate video frames 410a-410n and/or the low bitrate video frames 420a-420n.

The metadata 412a-412n and the metadata 422a-422n may be synchronized. In the example shown, there may be the same number of the high bitrate video frames 410a-410n as the low bitrate video frames 420a-420n and the metadata 412a-412n may be the same as the metadata 422a-422n. For example, the processor 114 may generate the high bitrate video frames 410a-410n and apply the metadata 412a-412n to the high bitrate video frames 410a-410n. Then the processor 114 may generate the low bitrate video frames 420a-420n and use the same indexing data from the metadata 412a-412n to apply the metadata 422a-422n to the low bitrate video frames 420a-420n (e.g., the metadata 412a-412n and the metadata 422a-422n may be a copy of the same data and may be applied to the corresponding video frames of the high bitrate video frames 410a-410n and the low bitrate video frames 420a-420n).

In some embodiments (e.g., when the low bitrate video frames 420a-420n have a lower frame rate than the high bitrate video frames 410a-410n), there may be more high bitrate video frames 410a-410n than the low bitrate video frames 420a-420n. When there are more high bitrate video frames 410a-410n than the low bitrate video frames 420a-420n, the metadata 412a-412n and the metadata 422a-422n may not be an exact copy. For example, the metadata 422a-422n that corresponds to one of the low bitrate video frames 420a-420n may comprise the metadata 412a-412n that corresponds to more than one of the high bitrate video frames 410a-410n. The metadata 422a-422n may comprise all the data from the metadata 412a-412n, but may be applied to the low bitrate video frames 420a-420n in a different arrangement than the metadata 412a-412n is applied to the high bitrate video frames 410a-410n.

The metadata 422a-422n may comprise indexes (e.g., time-stamp, event ID, object IDs, people IDs, vehicle IDs, etc.) that may enable the processor 114 to match video frames from the low bitrate video frames 420a-420n to the corresponding video frames from the high bitrate video frames 410a-410n (e.g., match the video frames that have recorded the same video content). The high bitrate video frames 410a-410n and the low bitrate video frames 420a-420n may both comprise the same recording captured by the smart security camera light 102, but at a different quality (e.g., the same content/events may be captured but encoded using different parameters so the perception of the events when viewing may be different). In an example, the metadata 422a-422n may enable the processor 114 to determine which of the low bitrate video frames 420a-420n and the high bitrate video frames 410a-410a comprise the same video and/or audio content captured at a particular time and date (e.g., the video frames that were captured at 5:45 pm-6 pm on Friday). In another example, the metadata 422a-422n may enable the processor 114 to determine which of the low bitrate video frames 420a-420n and the high bitrate video frames 410a-410n comprise the same video data of a particular event (e.g., when a loiterer was detected, when the visitor 60 arrived, when an alarm was triggered, when a vehicle was detected, when a package was delivered, etc.). The metadata 422a-422n and the metadata 412a-412n may temporally relate the low bitrate video frames 420a-420n with the high bitrate video frames 410a-410n.

The cloud computing service 104 may comprise a block (or circuit or module) 430, a block (or circuit or module) 432 and/or a block (or circuit or module) 434. The block 430 may comprise low bitrate clip storage. The block 432 may comprise a low bitrate selection. The block 434 may comprise a high bitrate synchronization storage. In an example, the blocks 430-434 may illustrate various types of data stored by the storage servers 120a-120n. The cloud computing service 104 may store other data (not shown). The type, arrangement and/or format of data stored by the cloud computing service 104 may be varied according to the design criteria of a particular implementation.

The communication device 308 may transmit the signal LBRVID from the smart security camera light 102 to the cloud computing service 104. The signal LBRVID may comprise the low bitrate video frames 420a-420n with the metadata 422a-422n. In the example shown, all of the low bitrate video frames 420a-420n may be uploaded from the smart security camera light 102 to the cloud computing service 104. In some embodiments, less than all of the low bitrate video frames 420a-420n may be uploaded to the cloud computing service 104. In an example, the low bitrate video frames 420a-420n stored on the local storage 324 may comprise video data captured over a full month and the signal LBRVID may comprise the low bitrate video frames 420a-420n captured from the last 24 hours (or the past week, or the past hour, etc.). Communicating less than all of the low bitrate video frames 420a-420n may further reduce bandwidth and/or the amount of data stored in the storage servers 120a-120n (e.g., further reducing costs). In an example, by default, the smart security camera light 102 may upload the low bitrate video frames 420a-420n for the past week, and if the end user requests additional video (e.g., the end user wants video from the past month), then the smart security camera light 102 may upload more of the low bitrate video frames 420a-420n stored on the local storage 324.

The low bitrate video frames 420a-420n may comprise sufficient video data to enable the cloud neural network 132 to perform computer vision operations. In one example, the cloud neural network 132 may be configured to perform computer vision and/or audio analysis of the low bitrate video frames 420a-420n. For example, the cloud neural network 132 may be configured to detect the visitor 60, determine the behavior of the visitor 60 and select a reaction. In an example, the reaction may be one of the audio messages 370a-370c shown in association with FIG. 6. In another example, the reaction may comprise sending a notification to the user devices 106a-106n (e.g., a notification indicating that the visitor 60 has been detected). In yet another example, the reaction may comprise alerting the authorities 212 (e.g., calling the police if a burglar is detected, contacting the fire department if a fire is detected, calling an ambulance if a medical emergency is detected, etc.). In still another example, the reaction may comprise using one of the consumables 312. The particular reaction selected by the cloud neural network 132 may be varied based on the available features of the smart security camera lights 102a-102n and/or the event determined by the cloud neural network 132. The reaction selected by the cloud neural network 132 may be communicated to the smart security camera light 102 via the signal RCT. The distributed servers 122*a*-122*n* may determine which of the smart security camera lights 102*a*-102*n* to communicate the signal RCT to based on the metadata 422*a*-422*n* (e.g., the metadata 422*a*-422*n* may comprise an indication of which of the smart security camera lights 102*a*-102*n* captured the low bitrate video frames 420*a*-420*n*). The smart security camera light 102 may be configured to perform the reaction in response signal RCT.

The cloud computing service 104 may provide the companion app 160 to enable a user interface. The user interface may enable the end users to select and/or modify the low bitrate video frames 420*a*-420*n*. The user interface provided by the companion app 160 may enable the end user to search, view (e.g., playback) and/or edit the low bitrate video frames 420*a*-420*n*. The signal SEL may comprise input from the end user. The signal SEL may comprise a video selection. The signal CMD may comprise input from the end user. The signal CMD may comprise an input command and/or a modification to the low bitrate video frames 420*a*-420*n*.

The low bitrate selection 432 may comprise a subset of the low bitrate video frames 420*b*-420*d*. The subset of the low bitrate video frames 420*b*-420*d* may be selected in response to the signal SEL. In the example shown, the subset of the low bitrate video frames 420*b*-420*d* may comprise the low bitrate video frames 420*b*-420*d*. However, the subset of the low bitrate video frames 420*b*-420*d* may comprise more or fewer of the low bitrate video frames 420*a*-420*n*. In some embodiments, the subset of the low bitrate video frames 420*b*-420*d* may comprise all of the low bitrate video frames 420*a*-420*n* (e.g., when the end user decides to select all of the video frames stored).

The metadata 422*a*-422*n* may enable the processing capabilities of the distributed servers 122*a*-122*n* to search the low bitrate video frames 420*a*-420*n*. In one example, the signal SEL may comprise time information. The distributed servers 122*a*-122*n* may search the metadata 422*a*-422*n* to determine if there is a match to the time information provided by the end user. If there is a match, the user interface may select the low bitrate video frames 420*a*-420*n* that correspond to the match (e.g., the subset of the low bitrate video frames 420*b*-420*d*). In another example, the signal SEL may comprise a search for a particular event ID. The distributed servers 122*a*-122*n* may search the metadata 422*a*-422*n* to determine if there is a match to the event ID provided by the end user. If there is a match, the user interface may select the low bitrate video frames 420*a*-420*n* that correspond to the match (e.g., the subset of the low bitrate video frames 420*b*-420*d*). The end user may playback the subset of low bitrate video frames 420*b*-420*d* and/or select modifications to the subset of the low bitrate video frames 420*b*-420*d* (e.g., via the signal CMD).

The low bitrate video selection 432 may be an illustrative example of operations performed by the cloud computing service 104. For example, the cloud computing service 104 may not necessarily create a copy of the subset of the low bitrate video frames 420*b*-420*d* from the low bitrate video frames 420*a*-420*n*. The subset of the low bitrate video frames 420*b*-420*d* may comprise instructions. The instructions may comprise which of the low bitrate video frames 420*a*-420*n* that the user has selected. The instructions may comprise the modifications to perform to the low bitrate video frames 420*a*-420*n*. The instructions may be communicated to the smart security camera light 102 as the signal MOD. The instructions for the signal MOD may be generated in response to the input command provided by the end user via the signal CMD.

The instructions provided by the end user may comprise a selection of the low bitrate video frames 420*a*-420*n* (e.g., the signal SEL) and/or modifications to the low bitrate video frames 420*a*-420*n* (e.g., the signal CMD). In one example, the instructions in the signal CMD may comprise a start frame and end frame. The start frame and the end frame may indicate the length of the video frames to select (e.g., select from video frame M to video frame X). In another example, the instructions in the signal CMD may comprise a start frame and a time. The start frame may be used to determine the start of a video clip and the time may indicate an amount of time from the start frame to include as part of the video clip (e.g., select video frame M and all the video frames for the next hour). In yet another example, the instructions in the signal CMD may comprise cropping information (e.g., to crop a particular region from the video frames such as a top right corner, or a location where a particular object was detected). In still another example, the instructions in the signal CMD may comprise post-processing effects (e.g., applying a black and white filter, applying a sepia filter, applying a mirror filter, applying an obscuring effect to a face, applying a graphic, etc.). In another example, the instructions in the signal CMD may comprise a number of video frames to add or delete. In some embodiments, the instructions available may be determined based on the toolkits made available by the cloud computing service 104. The types of instructions may be varied according to the design criteria of a particular implementation.

The processor 114 may be configured to read the instructions provided by the signal MOD. The processor 114 may be configured to interpret the instructions based on the metadata 422*a*-422*n* and the metadata 412*a*-412*n*. Based on the relationship between metadata 422*a*-422*n* and the metadata 412*a*-412*n* (e.g., the indexing information), the processor 114 may determine which of the video frames 410*a*-410*n*, that he instructions in the signal MOD may apply to. The relationship between the metadata 422*a*-422*n* and the metadata 412*a*-412*n* may enable the end user to perform operations on the low bitrate video frames 420*a*-420*n* stored in the cloud computing service 104 and have those changes made reflected in (or synchronized with) the high bitrate video frames 410*a*-410*n* stored by the smart security camera light 102.

The subset of the high bitrate video frames 414 may comprise the high bitrate video frames 410*b*-410*d*. In the example shown, the low bitrate video selection 432 may comprise the subset of the low bitrate video frames 420*b*-420*d*. The signal MOD may comprise the instructions to select the subset of the high bitrate video frames 414 stored in the local storage 324 that correspond with the subset of the low bitrate video frames 420*b*-420*d* selected by the end user. The processor 114 may read the instructions from the signal MOD, determine which of the high bitrate video frames 410*a*-410*n* correspond to the instructions and select the subset of the high bitrate video frames 410*b*-410*d*. The communication device 308 may communicate the signal SYNC. The signal SYNC may comprise the subset of the high bitrate video frames 410*b*-410*d*.

The processor 114 may be configured to perform edge processing. The edge processing may comprise operations performed locally on the edge device (e.g., the smart security camera light 102). The processor 114 may be configured to edit the high bitrate video frames 410*a*-410*n* stored locally on the local storage device 324 according to the instructions in the signal MOD. The operations performed by the processor 114 may be configured to cut/add video frames, apply the post-processing effects, perform cropping operations, etc. The operations performed by the processor 114 based on the signal MOD may be varied according to the design criteria of a particular implementation.

The operations performed by the processor 114 in response to the signal MOD may not overwrite the high bitrate video frames 410a-410n stored on the local storage device 324. The subset of the high bitrate video frames 414 may be modified by the processor 114 and the modified video frames may be communicated via the signal SYNC. The local storage device 324 may retain the 24/7 recording in the high bitrate video storage 402 (e.g., more of the high bitrate video frames 410a-410n may be stored by the local storage 324 than may be communicated to the cloud service 104 via the signal SYNC).

The cloud service 104 may receive the signal SYNC. The high bitrate synchronization storage 434 may store the subset of the high bitrate video frames 414. In the example shown, the high bitrate synchronization storage 434 may comprise the subset of the high bitrate video frames 410b-410d. In the example shown, the subset of the high bitrate video frames 410b-410d may match the subset of the low bitrate video frames 420b-420d selected by the end user using the companion app 160.

The subset of the high bitrate video frames 410b-410d stored by the high bitrate synchronization storage 434 may be accessed by the end users (e.g., a remote user). The signal HBOUT may comprise the subset of the high bitrate video frames 410a-410d stored by the high bitrate synchronization storage 434. The signal HBOUT may be communicated by the cloud computing service 104 to one or more of the user devices 106a-106n. For example, the cloud computing service 104 may communicate the subset of the high bitrate video frames 410b-410d to the user devices 106a-106n. The end users may enjoy the high quality version (e.g., the subset of the high bitrate video frames 410b-410d) of the video selected based on the modifications performed to the subset of the low bitrate video frames 420b-420d.

The video management system 400 may enable the high bitrate video frames 410a-410n to be accessible and stored locally on the smart security camera light 102 (along with the other video streams generated in parallel by the processor 114), while the low bitrate video frames 420a-420n may be stored, accessible, and processed on the cloud computing service 104. The video management system 400 may be configured to balance the cost associated with using the cloud computing service 104 (e.g., storage, bandwidth and processing costs) with convenience (e.g., the quick access availability of data provided by the cloud computing service 104 using the user devices 106a-106n from any location). For example, the end users may have quick and convenient access to 24/7 video footage by using the low bitrate video frames 420a-420n in the cloud computing service 104, but may still have access to the high bitrate video frames 410a-410n stored locally by the smart security camera light 102 upon request (e.g., available on an as-needed basis).

Generally, there may be higher expenses associated with uploading 24/7 footage of the high bitrate video frames 410a-410n compared with uploading 24/7 footage of the low bitrate video frames 420a-420n. Comparatively, the cost of the local storage 324 per year is low (e.g., a one-time purchase of the local storage device 324 and approximately 30 days of recording may be kept locally, which may be loop recorded). Storage of all of the high bitrate video frames 410a-410n on the local storage 324 may be low cost compared to storing all of the high bitrate video frames 410a-410n on the storage servers 120a-120n. For applications such as forensic analysis, the end user may only desire access to the high bitrate video frames 410a-410n a few times per year (e.g., usually for insurance purposes), which may make the high cost of storage with the cloud computing service 104 not cost effective.

For costs associated with the cloud computing service 104, the most important parameter may be the bitrate. Bitrate indicates the cost of transmission and storage. The video management system 400 may be configured to save costs by using the low bitrate video frames 420a-420n in the cloud computing service 104 as much as possible instead of uploading and storing the high bitrate video frames 410a-410n.

The indexing performed by the processor 114 using the metadata 412a-412n and the metadata 422a-422n may enable the cloud based editing. Matching the low bitrate video frames 420a-420n to the high bitrate video frames 410a-410n using the indexing (e.g., the metadata 412a-412n and the metadata 422a-422n) enables the video data to be synchronized. The signal CMD may enable the end user to issue a simple command (e.g., start from frame X and get the following 1 minute of video in 4K). The signal MOD may forward the command to the smart security camera light 102 where the high bitrate video frames 410a-410n are stored. The edge processor 114 may be configured to perform the edits of the signal MOD and synchronize the edits made by the end user to the low bitrate video frames 420a-420n using the companion app 160 with the high bitrate video frames 410a-410n stored in the local storage 324 and upload the subset of the high bitrate video frames 414. Uploading the subset of the high bitrate video frames 414 and only uploading on demand, may reduce the amount of data uploaded to and stored by the cloud computing service 104 compared to uploading all of the high bitrate video frames 410a-410n. For example, even though the subset of the high bitrate video frames 414 uploaded by the signal SYNC may comprise some of the same video content already uploaded in the signal LBRVID, since the bitrate of the low bitrate video frames 420a-420n is lower than the bitrate of the high bitrate video frames 410a-410n, the overall amount of data uploaded to and stored by the cloud computing service 104 (e.g., the combination of the signal SYNC and the signal LBRVID) may still be lower than uploading all of the high bitrate video frames 410a-410n.

The processor 114 may be configured to index the recorded video by timestamp and/or frame number. The processor 114 may be configured to transcode the video data into the high bitrate video frames 410a-410n and the low bitrate video frames 420a-420n. The processor 114 may be configured to perform the modification to the high bitrate video frames 410a-410n based on the edits may to the low bitrate video frames 420a-420n in the cloud computing service 104 (e.g., transcode the high bitrate video frames 410a-410n). The communication device 308 may then upload the subset of the high bitrate video frames 414 to the cloud computing service 104.

The amount of capacity of the local storage device 324 may be varied according to costs. Communication between the processor 114 and the local storage device 324 may be free. A 1 TB storage device may store 90 days of 1080p video. Less expensive options, such as a 64 GB capacity storage device may provide one week of storage of 1080p video. The local storage device 324 may introduce one more layer to the hierarchy of video storage in the video management system 400 at the edge to save cost. The video management system 400 may be configured to store as little as possible with the cloud computing service 104. In an example, to save cost, instead of uploading all of the low bitrate video frames 420a-420n to the cloud computing service 104 (e.g., 24/7 video), only a portion of the low bitrate video frames 420a-420n may be uploaded (e.g., 2-3 days of video). If more video data is needed (e.g., for forensic analysis) then more of the low bitrate video frames 420a-420n may be uploaded.

Figure 8:
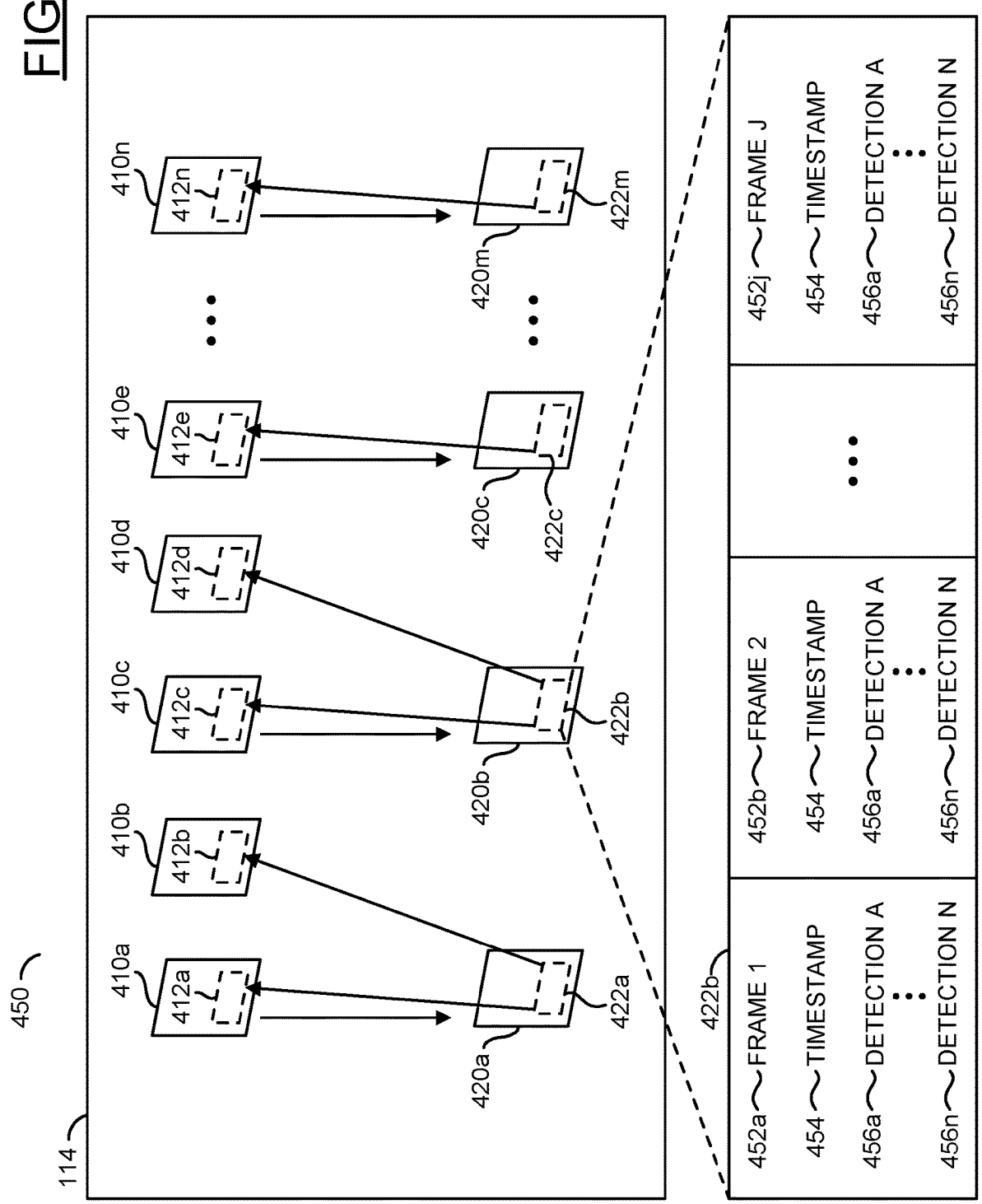
FIG. 8 is a diagram illustrating indexing high bitrate video frames and low bitrate video frames.

Referring to FIG. 8, a diagram illustrating indexing high bitrate video frames and low bitrate video frames is shown. An indexing example 450 is shown. The indexing example 450 may comprise a representative example of the high bitrate video frames 410a-410n and the low bitrate video frames 420a-420m within the processor 114. In the indexing example 450, the high bitrate video frames 410a-410n and the low bitrate video frames 420a-420m may be processed, analyzed and/or indexed by the processor 114. After being processed, analyzed and/or indexed, the high bitrate video frames 410a-410n and the low bitrate video frames 420a-420m may be stored to the local storage 324.

The processor 114 may be configured to generate the metadata 412a-412n for the high bitrate video frames 410a-410n. The metadata 412a-412n may comprise a timestamp. The timestamp may be used to indicate when the high bitrate video frames 410a-410n were captured. For example, if the high bitrate video frame 410a was captured at 10:54:35 PM on Apr. 15, 2021, then the corresponding metadata 412a may comprise the timestamp 10:54:35 PM, Apr. 15, 2021 (e.g., the date and time may be stored in various formats). The metadata 412a-412n may comprise a frame number. The frame number may provide an indication of the sequence that the high bitrate video frames 410a-410n were captured in. For example, the metadata 412a may comprise the frame number 0 indicating that the high bitrate video frame 410a is the first video frame. The metadata 412a-412n may comprise a serial number and/or other unique identifier of the particular smart security camera light 102a-102n and/or the capture device 256 that captured the video frames. The metadata 412a-412n may comprise a location identifier. For example, the end-user may apply a location to each of the smart security camera lights 102a-102n (e.g., front porch, back door, garage, pool, etc.). The type of information stored as the metadata 412a-412n may be varied according to the design criteria of a particular implementation.

In some embodiments, the processor 114 may perform the computer vision operations on the high bitrate video frames 410a-410n and apply the metadata 412a-412n in response to objects, characteristics, classifications and/or behavior detected using the computer vision operations. For example, if a person is identified as a loiterer by the processor 114, starting at the high bitrate video frame 410c, the processor 114 may apply the metadata tag 412c to the high bitrate video frame 410c with information indicating that the loiterer has been detected. If the loiterer detected remains in the subsequent video frames (e.g., the high bitrate video frames 410d-410n), then the metadata 412d-412n may comprise the indication that the loiterer has been detected. If the loiterer detected leaves the area at the high bitrate video frame 410g, then the metadata 410d-410g may comprise an indication of the loiterer, and the metadata 410h-410n may not comprise an indication of the loiterer. If an animal is detected in the high bitrate video frame 410f while the loiterer is also present, the metadata 410f may comprise an indication of the loiterer and an indication of the animal. In some embodiments, the processor 114 may determine how long each object was detected in the high bitrate video frames 410a-410n and the metadata 412a-412n may further comprise an indication of when the object was first detected and for how long the object remains in the high bitrate video frames 410a-410n.

In some embodiments, the high bitrate video frames 410a-410n or the low bitrate video frames 420a-420n (or one of the other parallel video streams generated by the processor 114) may be communicated to the monitoring service 210 and the third-party personnel 352 may view the video frames. The third-party personnel 352 may manually provide tags to the video frames. For example, when the third-party personnel 352 sees a person in the video frames, the third-party personnel 352 may manually apply a tag indicating a person has been detected. In another example, the third-party personnel 352 may interact with a visitor (e.g., greet the visitor, tell the visitor to leave, etc.). The third-party personnel 352 may tag the video frames with a note indicating the content of the interaction (e.g., 'visitor asked for the hours of operation of a location and left', 'visitor would not leave, authorities contacted', 'homeowner arrived home', etc.). The tags may be associated with a time stamp of the video frames. The tags may be communicated to the smart security camera lights 102a-102n. The processor 114 may apply the tags from the third-party personnel 352 to the metadata 412a-412n in a similar manner to applying the information detected using the computer vision operations.

Generally, the metadata 412a-412n may comprise information that may enable the end-user to search the high bitrate video frames 410a-410n (e.g., facilitate indexing and/or searching of the video data). For example, the high bitrate video frames 410a-410n may comprise 90 days of 24 hours of video and the end user may remember something from a particular day, or date but not remember the event, or the end-user may remember an event occurring but not remember when it happened, or the end user may remember a face of a person detected. The metadata 412a-412n may comprise searchable data that may enable the end-user to find events, times and/or objects that may be captured by the high bitrate video frames 410a-410n. The format of the metadata 412a-412n and/or the content of the metadata 412a-412n may be varied according to the design criteria of a particular implementation.

The processor 114 may be configured to generate the metadata 422a-422m for the low bitrate video frames 420a-420m based on the metadata 412a-412n from the high bitrate video frames 410a-410n. The low bitrate video frames 420a-420m may be generated from the high bitrate video frames 410a-410n and/or the same raw video data captured by the capture device 256 (e.g., the parallel bitstreams may generally comprise similar video content captured at the same time, but at different resolutions and/or frame rates). In an example, the timestamp for the high bitrate video frames 410a-410n may be the same as the timestamp for the corresponding low bitrate video frames 420a-420m. The metadata 412a-412n and the metadata 422a-422m may comprise similar data (or the same information). In an example, when the high bitrate video frames 410a-410n and the low bitrate video frames 420a-420m comprise the same number of video frames (e.g., have equal frame rates), the metadata 422a-422m may be a copy of the metadata 412a-412n. The metadata 422a-422m may enable the processor 114 to associate the low bitrate video frames 420a-420m with the corresponding (e.g., video frames that comprise the same video content and/or video content captured at the same times) high bitrate video frames 410a-410n.

In some embodiments, the processor 114 may perform the computer vision operations on the high bitrate video frames 410a-410n to generate the metadata 412a-412n, and the metadata 422a-422m may comprise a copy of the objects from the metadata 412a-412n. In some embodiments, the processor 114 may generate the metadata 412a-412n comprising the timestamps to correlate the metadata 412a-412n with the metadata 422a-422m. Then the processor 114 may perform the computer vision operations on the low bitrate video frames 420a-420m (e.g., less processing power may be used to analyze the low bitrate video frames 420a-420m while still providing sufficient video data to detect objects and/or events). The processor 114 may then copy the object detection information of the metadata 422a-422m to the associated metadata 412a-412n. The method of correlating the metadata 412a-412n with the metadata 422a-422m may be varied according to the design criteria of a particular implementation.

In the example shown, the high bitrate video frames 410a-410n may comprise a greater number of video frames than the low bitrate video frames 420a-420m. For example, the low bitrate video frames 420a-420m may comprise a lower frame rate than the high bitrate video frames 410a-410n (e.g., if the high bitrate video frames 410a-410n have a frame rate of 30 fps, and the low bitrate video frames 420a-420m have a frame rate of 15 fps, then there may be half as many of the low bitrate video frames 420a-420m as the high bitrate video frames 410a-410n). When the frame rate of the low bitrate video frames 420a-420m is different (e.g., lower) than the frame rate of the high bitrate video frames 410a-410n, the metadata 422a-422m may not be able to be a direct copy of the metadata 412a-412n. Since the one video frame of the low bitrate video frames 420a-420m may correspond to more than one of the high bitrate video frames 410a-410n, then the metadata 422a-422m may comprise the indexing information corresponding to more than one of the metadata 412a-412n. In an example, if the frame rate of the high bitrate video frames 410a-410n is twice the frame rate of the low bitrate video frames 420a-420n then each one of the low bitrate video frames 420a-420m may correspond to two of the high bitrate video frames. To accommodate the low bitrate video frames 420a-420m corresponding to more than one of the high bitrate video frames 410a-410n, the associated metadata 422a-422m may comprise the metadata 412a-412n corresponding to more than one of the high bitrate video frames 410a-410n. Similarly, in embodiments, where the high bitrate video frames 410a-410n comprise fewer video frames than the low bitrate video frames 420a-420m (e.g., the high bitrate video frames 410a-410n comprise 4K video at 30 fps and the low bitrate video frames 420a-420m comprise 720p video at 60 fps), the high bitrate video frames 410a-410n may correspond to more than one of the low bitrate video frames 420a-420m and the metadata 412a-412n may comprise the metadata 422a-422m from more than one video frame.

In the example shown, the low bitrate video frame 420a may be generated as a parallel bitstream with the high bitrate video frame 410a from the same pixel data captured. The low bitrate video frame 420a may be representative of the two high bitrate video frames 410a-410b (e.g., at a lower frame rate). The metadata 422a for the low bitrate video frame 420a may comprise the indexing information from the metadata 412a-412b from the two associated high bitrate video frames 410a-410b. Similarly, the low bitrate video frame 420b may be generated as a parallel video stream with the high bitrate video frame 410c (e.g., representing the same video content) and be representative of the high bitrate video frames 410c-410d. The metadata 422b for the low bitrate video frame 420b may comprise the indexing information from the metadata 412c-412d from the two associated high bitrate video frames 410c-410d.

Associating the metadata 422a-422m with more than one of the high bitrate video frames 410a-410n may enable a search and/or modifications performed by the end user to be at the higher granularity of the high bitrate video frames 410a-410n while working with the lower granularity of the low bitrate video frames 420a-420m. In an example, the end user may search for the video data that corresponds to when an intruder arrives and leaves. If the intruder arrives at the high bitrate video frame 410a and leaves at the high bitrate video frame 410d, the end user may not be able to see exactly when the intruder left when viewing the low bitrate video frame 420b. However, the metadata 422a-422m may indicate that the intruder left in between the low bitrate video frame 420b and the low bitrate video frame 420c. Since the high bitrate video frames 410a-410n comprise more video frames, the modifications made to the high bitrate video frames 410a-410n may be performed with greater precision.

Example metadata 422b is shown. The example metadata 422b may be an illustrative example of the metadata 422a-422m that may be applied to the low bitrate video frames 420a-420m. The low bitrate video frame 420b and the metadata 422b may correspond to more than one of the high bitrate video frames 410a-410n. The metadata 422b may comprise frame numbers 452a-452j. The frame numbers 452a-452j may indicate which of the of the high bitrate video frames 410a-410n that the metadata 422b is associated with. In an example where the high bitrate video frames 410a-410n have twice the frame rate of the low bitrate video frames 420a-420m, there may be two of the frame numbers 452a-452b. However, the low bitrate video frames 420a-420m may be associated with more than two of the high bitrate video frames 410a-410n.

The frame numbers 452a-452j may comprise the indexing information associated with each of the high bitrate video frames. In an example, the frame number 452a may comprise the indexing information from the metadata 412c and the frame number 452b may comprise the indexing information from the metadata 412d. Each of the frame numbers 452a-452j are shown comprising a corresponding timestamp 454 and/or detection information 456a-456n. While the timestamp 454 and the detection information 456a-456n is shown, the type of information stored may be varied according to the type of indexing information applied to the metadata 410a-410n.

The timestamp 454 may correspond to the timestamp of the associated high bitrate video frames 410a-410n. In an example, the timestamp 454 of the frame number 452a may be the timestamp of the metadata 412c of the high bitrate video frame 410c and the timestamp 454 of the frame number 452b may be the timestamp of the metadata 412d of the high bitrate video frame 410d. The detection information 456a-456n may comprise objects/events detected (e.g., from the computer vision operations and/or the manually tagging). In an example, if a loiterer was detected with in the high bitrate video frames 410c, then the detection information 456a may comprise a loiterer object, and the detection information 456a may comprise a loiterer arriving event. In the example, if the loiter is still in the video frames and an animal also appears, the detection information 456a may comprise a loiterer object, the detection information 456b may comprise an animal object and the detection information 456c may comprise an animal arriving event.

The low bitrate video frames 420a-420m and the metadata 422a-422m may be uploaded to the cloud computing service 104 to enable the end user to search and/or modify the captured video frames using cloud access. In some embodiments, less than all of the low bitrate video frames 420a-420m may be uploaded. For example, the local storage 324 may store 24 hour video recordings for a month, but to limit the amount of data transferred to the cloud computing service 104, the communication device 308 may communicate 2-3 days of video for searching. More of the low bitrate video frames 420a-420m may be uploaded as requested (e.g., on demand). Waiting to upload the low bitrate video frames 420a-420m instead of uploading all of the low bitrate video frames 420a-420m may enable savings on bandwidth costs, costs associated with storage using the storage servers 120a-120n and/or costs associated with searching the video using the distributed servers 122a-122n.

Figure 9:
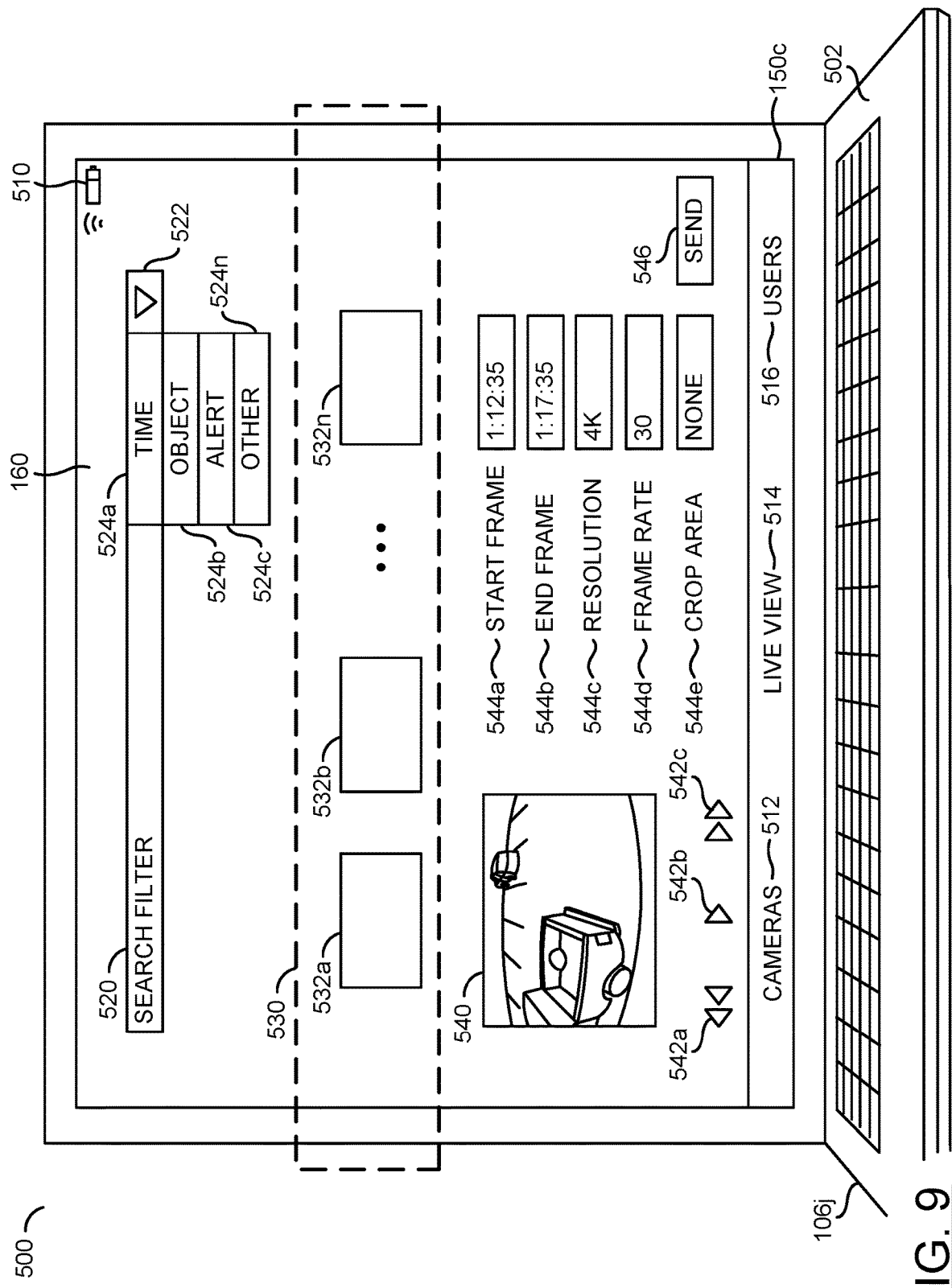
FIG. 9 is a diagram illustrating a cloud-based video editing interface.

Referring to FIG. 9, a diagram illustrating a cloud-based video editing interface is shown. An editing example 500 is shown. In the editing example 500, the mobile device 106j is shown as a representative example of any of the mobile devices 106a-106n. The mobile device 106j is shown as a laptop and/or netbook computing device. The I/O interface 150c of the mobile device 106j is shown as a monitor. The I/O interface 150c may comprise a keyboard and/or touchpad 502 configured to receive input requests from the end user. The monitor interface 150c is shown displaying and/or updating visual content for the companion app 160. The companion app 160 is shown displaying the time and date OS icons 510, a cameras button 512, a live view button 514 and a users button 516, which may provide additional functionality to the companion app 160. Details of the additional functionality may be described in association with U.S. application Ser. No. 16/850,924, filed on Apr. 16, 2020, appropriate portions of which are hereby incorporated by reference. While the companion app 160 is shown formatted for the monitor display of the I/O interface 150c designed for a desktop/laptop computer, the companion app 160 may offer similar functionality when implemented on a smartphone (e.g., the companion app 160 may have a different interface to accommodate a different screen size, but still offer the same or similar functionality).

The companion app 160 may comprise a search field 520. The search field 520 may provide a search filter for searching the low bitrate video frames 420a-420n. In an example, the end user may type in search parameters in the search field 520 and the distributed servers 122a-122n may search the metadata 422a-422n for data that matches the search parameters. Data input by the end user into the search field 520 may be an example of the signal SEL.

A dropdown menu 522 is shown. The dropdown menu 522 may provide categories 524a-524n. The categories 524a-524n may provide additional filters for the search field 520. In the example shown, the categories 524a-524n may comprise a time, an object, alerts, etc. The categories 524a-524n may enable the distributed servers 122a-122n to search the metadata 422a-422n for particular types of data. For example, the time category 524a may search the metadata 422a-422n for timestamps (e.g., a time selection). Data input by the end user into the categories 524a-524n may be an example of the signal SEL.

The companion app 160 may comprise search results 530. The search results 530 may comprise filtered video frames 532a-532n. The filtered video frames 532a-532n may comprise a portion of the low bitrate video frames 420a-420n that match the input to the search filter 520. In an example, when no input is entered in the search field 520, the companion app 160 may be configured to display all of the low bitrate video frames 420a-420n (e.g., or thumbnail versions of video clips of the low bitrate video frames 420a-420n). As the end users inputs a search query into the search filter 520, the distributed servers 122a-122n may search for matches in the metadata 422a-422n. The low bitrate video frames 420a-420n that have the metadata 422a-422n that matches the search query may be displayed as the filtered video frames 532a-532n. The end user may select one of the filtered video frames 532a-532n for editing. The selection of one of the filtered video frames 532a-532n may be the input signal SEL.

In one example, the end user may enter the search query in the search filter 520 using the object category 522b and search for a blue car. The distributed servers 122a-122n may search the metadata 422a-422n to determine the video frames that correspond to an object detection for a blue car. All of the low bitrate video frames 410a-410n that correspond to the metadata 422a-422n that matches a blue car may be displayed as the filtered video frames 532a-532n. The end user may select one of the filtered video frames 532a-532n for editing. Similarly, the end user may search by recorded online video clips for events detected within a time frame such as a first alert intrusion, a loiterer alert intrusion, an undeterred intrusion, a detection of a vehicle, a detection of a specific person, etc. The end user may search by a person and/or object within a time frame (e.g., a person tagged by the computer vision operations performed by the edge neural network 118 and/or the cloud neural network 132, a person tagged by the monitoring personnel 352, etc.).

The companion app 160 may comprise a selected video frame 540 and video controls 542a-542c. The selected video frame may comprise the one of the filtered video frames 532a-532n selected by the end user. The video controls 542a-542c may enable the end user to playback the low bitrate video frames 420a-420n with respect to the selected video frame 540. In the example shown, the video control 542a may comprise a rewind function, the video control 542b may comprise a play/pause function, and the video control 542c may comprise a fast forward function. The video controls 542a-542c may enable the end user to view the low bitrate video frames 420a-420n and/or preview the modifications made via the signal CMD to the low bitrate video frames 420a-420n (e.g., before sending the command to synchronize with the high bitrate video frames 410a-410n).

Editing options 544a-544e are shown. The editing options 544a-544e may comprise examples of data that may be provided with the command in the signal MOD. In the example shown, the editing options 544a-544e may comprise a start frame/time 544a, an end frame/time 544b, a resolution 544c, a frame rate 544d and/or a crop area 544e. Other editing options may be available (e.g., post-processing effects, a number of video frames from a start position, a number of video frames to delete, etc.). The types of editing options 544a-544e available on the interface for the companion app 160 may be varied according to the design criteria of a particular implementation. The input by the end user for the editing options 544a-544e may comprise the input signal CMD.

The start frame/time 544a may comprise a first video frame to select (e.g., the earliest captured video frame in the clip) from the low bitrate video frames 420a-420n. The end frame/time 544b may comprise a last video frame to select (e.g., the latest captured video frame in the clip) from the low bitrate video frames 420a-420n. The start frame/time 544a and the end frame/time 544b may be used to determine the length of the video clip selected. In an example, the number of the high bitrate video frames 410a-410n selected as the subset of the high bitrate video frames 414 may be determined by the start frame/time 544a and the end frame/time 544b.

The resolution 544c may comprise an output resolution for the subset of the high bitrate video frames 414. In some embodiments, the resolution 544c may be the same as the resolution of the high bitrate video frames 410a-410n. In some embodiments, the user may select an alternate resolution. If the end user selects an alternate resolution, then the processor 114 may transcode the high bitrate video frames 410a-410n to a different resolution in response to the signal MOD. In an example, the resolution 544c may comprise 8K, 4K, 1080p, 720p, etc.

The frame rate 544d may comprise an output frame rate for the subset of the high bitrate video frames 414. In some embodiments, the frame rate 544d may be the same as the frame rate of the high bitrate video frames 410a-410n. In some embodiments, the user may select an alternate frame rate. If the end user selects an alternate resolution, then the processor 114 may transcode the high bitrate video frames 410a-410n to a different frame rate in response to the signal MOD. In an example, the frame rate 544d may comprise 60 fps, 30 fps, 15 fps, etc.

The crop area 544e may comprise a region of the captured video data to include in the subset of the high bitrate video frames 414. The crop area 544e may enable the end user to select a specific area in the low bitrate video frames 420a-420n (e.g., an area where an object of interest is located). Cropping the subset of the high bitrate video frames 414 may enable the total resolution of the subset of the high bitrate video frames 414 to be reduced (e.g., crop a 1920× 1080 area from a 4K video frame) to reduce the bitrate the data uploaded in the signal SYNC, while retaining the video quality (e.g., provide a high detailed portion of the video frame instead of the entire video frame or instead of a lower resolution version of the full video frame).

The companion app 160 may comprise a send button 546. The send button 546 may finalize the modifications made by the user to the low bitrate video frames 420a-420n. The cloud computing service 104 may generate the signal MOD in response to the end user pressing the send button 546. In response to the end user pressing the send button 546, the cloud computing service 104 may determine the metadata 422a-422n that corresponds to the edits made to the low bitrate video frames 410a-410n, generate the instruction for the processor 114 to perform the same modifications to the high bitrate video frames 410a-410n and communicate the signal MOD with the instructions. The smart security camera light 102 may perform the modifications to the high bitrate video frames 410a-410n based on the instructions in the signal MOD and upload the subset of the high bitrate video frames 414 to the cloud computing service 104. When the subset of the high bitrate video frames 414 have been uploaded, the end user may use the companion app 160 to view the subset of the high bitrate video frames 414 (e.g., the signal HBOUT).

In an example, the end user may claim that the edge neural network 118 and/or the cloud neural network 132 failed to detect an event at a particular time. The end user may search the low bitrate video frames 420a-420n at the particular time and request the high bitrate video frames 410a-410n of the particular time by performing the edits. The end user may view the subset of the high bitrate video frames 414 to determine whether or not the event actually happened. Similarly, the end user may check whether a detection was a false alarm (e.g., a detection occurred, but no event actually happened).

The companion app 160 may enable forensic analysis. Generally, little bit of video of a potential event may not be sufficient to determine what actually occurred. For example, the computer vision operations may detect that a window has been broken. However, the video of the window that has already been broken may not be useful to determine the cause. The forensic analysis may enable the end user to retrieve video frames from before the window was broken for context. For example, the video frames from before the window has been broken may show a criminal smashing the window.

Uploading the subset of the high bitrate video frames 414 to the cloud computing service 104 may comprise a cost (e.g., bandwidth and storage). However, uploading video data to the cloud computing service 104 may provide some level of convenience. For example, the cloud computing service 104 may have a latency advantage over communicating directly with the smart security camera light 102. The latency advantage, security and/or widespread availability of connection to the cloud computing service 104 may be a worthwhile convenience cost.

Figure 10:
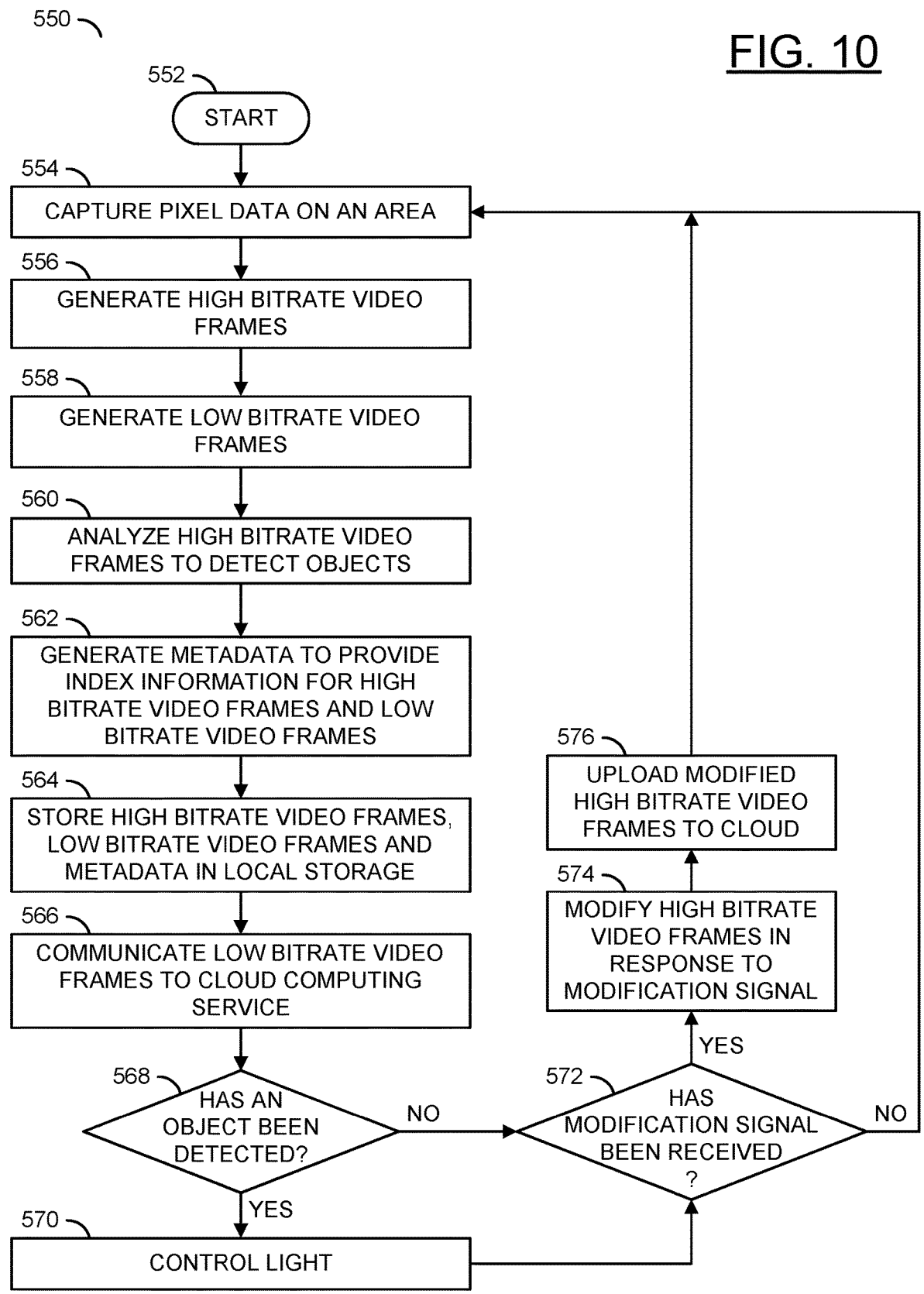
FIG. 10 is a flow diagram illustrating a method for synchronizing modifications made to low bitrate video stored in a cloud computing service with high bitrate video stored locally.

Referring to FIG. 10, a method (or process) 550 is shown. The method 550 may synchronize modifications made to low bitrate video stored in a cloud computing service with high bitrate video stored locally. The method 550 generally comprises a step (or state) 552, a step (or state) 554, a step (or state) 556, a step (or state) 558, a step (or state) 560, a step (or state) 562, a step (or state) 564, a step (or state) 566, a decision step (or state) 568, a step (or state) 570, a decision step (or state) 572, a step (or state) 574, and a step (or state) 576.

The step 552 may start the method 550. In the step 554, the capture device 256 may capture pixel data of an area. Next, in the step 556, the processor 114 may generate the high bitrate video frames 410a-410n from the pixel data. In the step 558, the processor 114 may generate the low bitrate video frames 420a-420n. In one example, the processor 114 may generate the high bitrate video frames 410a-410n and the low bitrate video frames 420a-420n in parallel (along with other parallel bitstreams) based on the same raw video data captured (e.g., generate multiple bitstreams in parallel in response to the pixel data captured). In another example, the processor 114 may transcode the high bitrate video frames 410a-410n to a lower resolution and/or a lower frame rate. Next, the method 550 may move to the step 560.

In the step 560, the processor 114 may analyze the high bitrate video frames 410a-410n (or the low bitrate video frames 420a-420n) to detect objects. In an example, the processor 114 may perform computer vision operations on the high bitrate video frames 410a-410n. Next, in the step 562, the processor 114 may generate the metadata 412a-412n and/or the metadata 422a-422n to provide index information that may associate the high bitrate video frames 410a-410n with the low bitrate video frames 420a-420n. In the step 564, the processor 114 may store the high bitrate video frames 410a-410n with the metadata 412a-412n and the low bitrate video frames 420a-420n with the metadata 422a-422n in the local storage 324 (e.g., stored locally on the edge device). Next, in the step 566, the communication device 308 may communicate the low bitrate video frames 420a-420n and the associated metadata 422a-422n (e.g., the signal LBRVID) to the cloud computing service 104. The high bitrate video frames 410a-410n and/or the low bitrate video frames 420a-420n may remain stored locally on the local storage device 324. Next, the method 550 may move to the decision step 568.

In the decision step 568, the processor 114 may determine whether an object and/or an event has been detected. In an example, the object and/or event may comprise detecting a visitor, an animal, a loiterer, a burglar, a vehicle, a package delivery, etc. If an object has been detected, then the method 550 may move to the step 570. In the step 570, the processor 114 may control the lights 270a-270d in response to the objects detected. In an example, the lights 270a-270d may be controlled manually (e.g., using a physical switch at the premises 202a-202n, using an option on the companion app 160, etc.). In another example, the lights 270a-270d may be turned on/off in response to objects and/or events being detected (e.g., turning on the lights 270a-270d to deter a potential intruder). In yet another example, the lights 270a-270d may be controlled to output blue and red light. In still another example, the lights 270a-270d may be controlled to provide a strobe output. Next, the method 550 may move to the decision step 572. In the decision step 568, if no object has been detected, then the method 550 may move to the decision step 572.

In the decision step 572, the communication device 308 may determine whether the modification signal MOD has been received. The modification MOD may be generated by the cloud computing service 104 in response to user input provided using the companion app 160 (e.g., the user may edit the low bitrate video frames 420a-420n in the cloud). If the modification signal MOD has not been received, then the method 550 may return to the step 554. If the modification signal MOD has been received, then the method 550 may move to the step 574. In the step 574, the processor 114 may modify the stored high bitrate video frames 410a-410n in response to the modification signal MOD. The modification signal MOD may indicate which of the high bitrate video frames 410a-410n to edit based on the metadata 412a-412n. Next, in the step 576, the communication device 308 may upload the modified high bitrate video frames 414 to the cloud computing service 104. The communication device 308 may send the signal SYNC comprising the subset of the high bitrate video frames 414. Next, the method 550 may return to the step 554.

Figure 11:
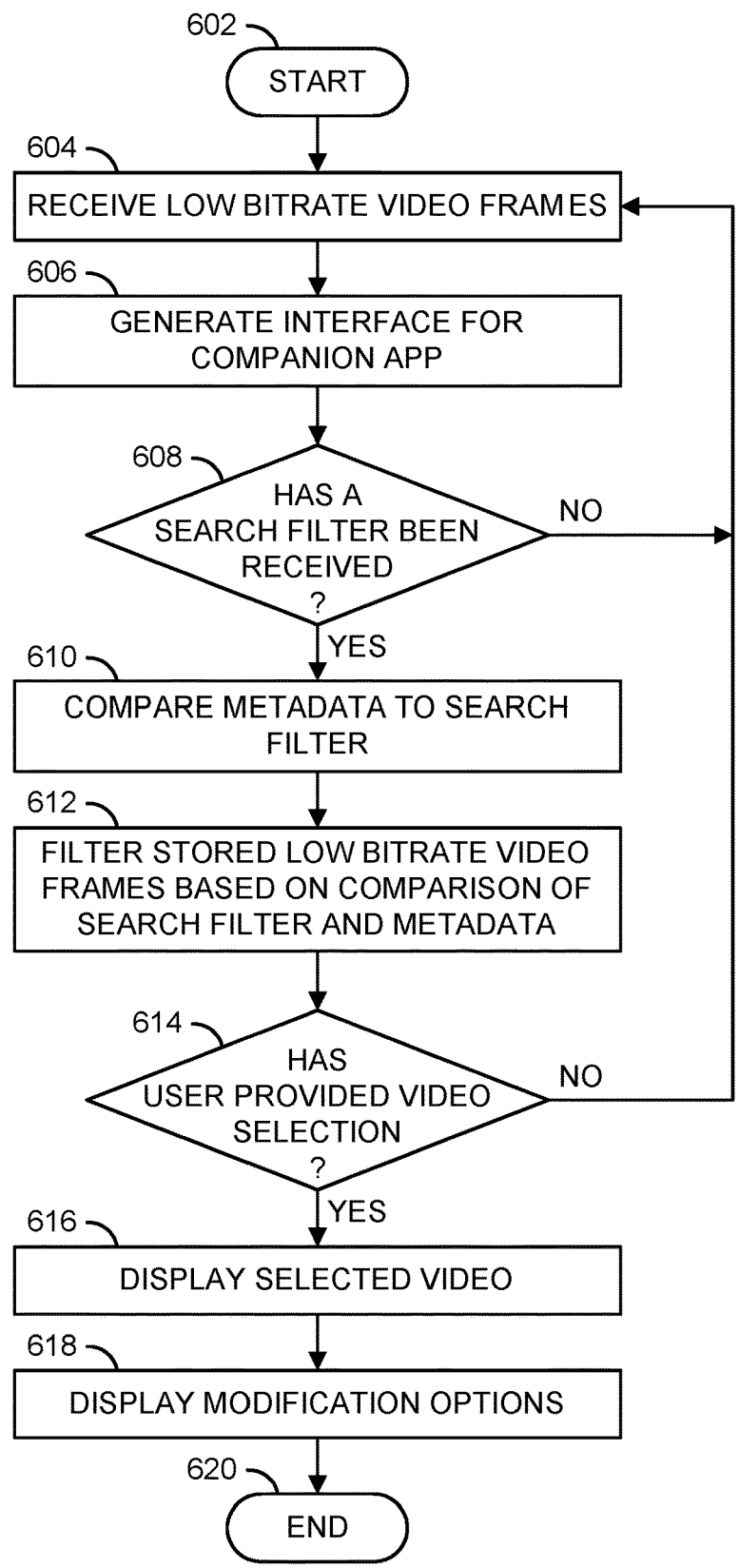
FIG. 11 is a flow diagram illustrating a method for filtering a video selection in response to a user selection and metadata associated with low bitrate video.

Referring to FIG. 11, a method (or process) 600 is shown. The method 600 may filter a video selection in response to a user selection and metadata associated with low bitrate video. The method 600 generally comprises a step (or state) 602, a step (or state) 604, a step (or state) 606, a decision step (or state) 608, a step (or state) 610, a step (or state) 612, a decision step (or state) 614, a step (or state) 616, a step (or state) 618, and a step (or state) 620.

The step 602 may start the method 600. In the step 604, the cloud computing service 104 may receive the low bitrate video frames 420a-420n along with the metadata 422a-422n (e.g., the signal LBRVID). The low bitrate video frames 420a-420n and the metadata 422a-422n may be stored as the low bitrate video clip 430 in the storage servers 120a-120n. Next, in the step 606, the distributed servers 122a-122n may generate the interface for the companion app 160 (e.g., shown in association with FIG. 9). Next, the method 600 may move to the decision step 608.

In the decision step 608, the distributed servers 122a-122n may determine whether an input has been provided to the search filter 520. For example, the user may enter an object, an event ID, a time, a date, etc. as the input signal SEL to the search filter 520 using the companion app 160. If no search filter has been received, then the method 600 may return to the step 604. If a search filter has been received, then the method 600 may move to the step 610. In the step 610, the distributed servers 122a-122n (e.g., using processors and/or the GPU 130) may compare the metadata 422a-422n to the input to the search filter 520. Next, in the step 612, the distributed servers 122a-122n may filter the stored low bitrate video frames 420a-420n based on the comparison of the search filter 520 input and the metadata 422a-422n. The filtered video frames 532a-532n may be displayed on the companion app 160. Next, the method 600 may move to the decision step 614.

In the decision step 614, the distributed servers 122a-122n and/or the companion app 160 may determine whether the end user has provided a video selection. For example, the end user may provide the input signal SEL to select one of the filtered video frames 532a-532n. If the end user has not provided a selection, then the method 600 may return to the step 604. If the user has provided a selection, then method 600 may move to the step 616. In the step 616, the companion app 160 may display the selected video 540. Next, in the step 618, the companion app 160 may display the modification options 544a-544e. The modification options 544a-544e available may be determined based on a tool set provided by the distributed servers 122a-122n. Next, the method 600 may move to the step 620. The step 620 may end the method 600.

Figure 12:
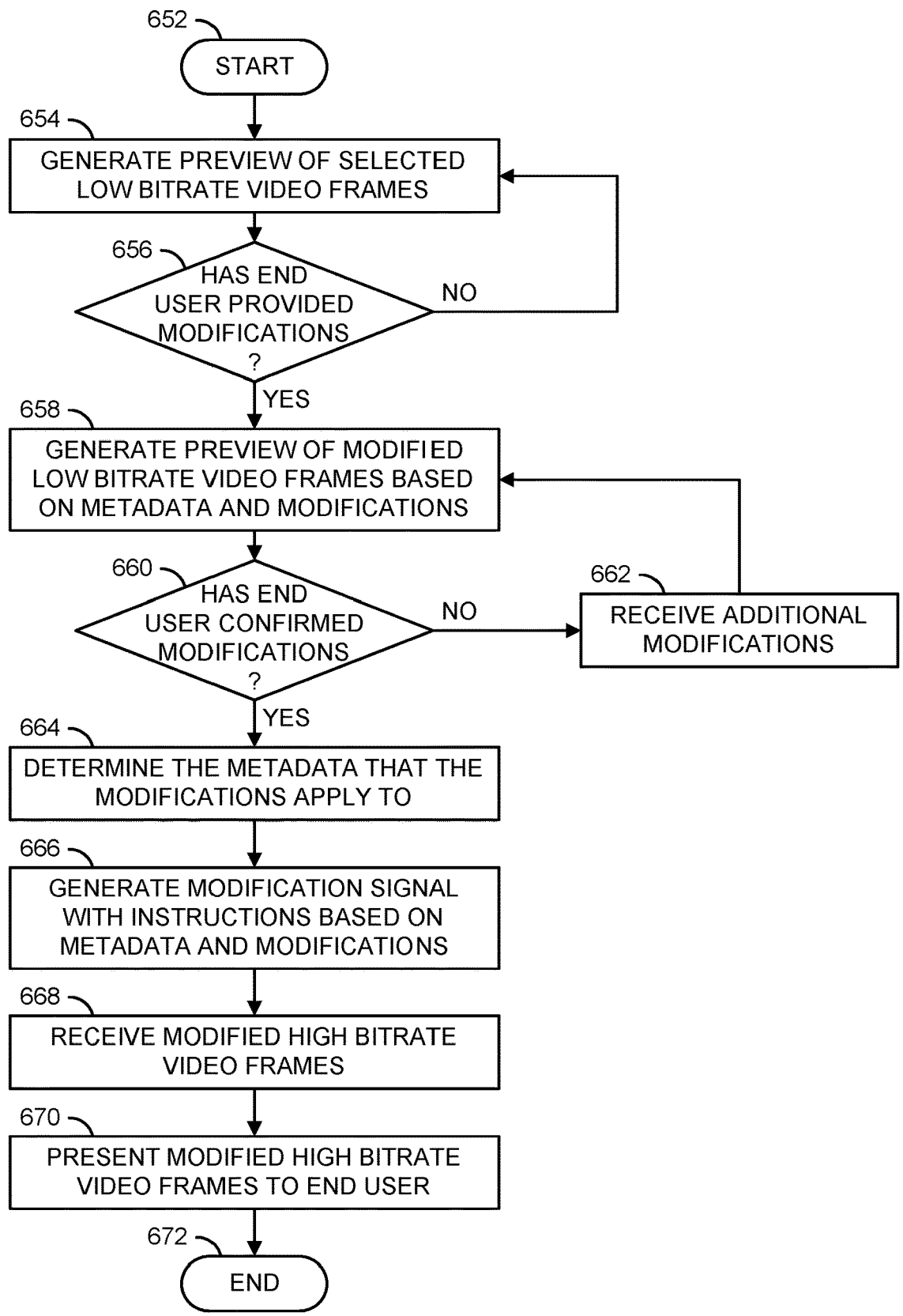
FIG. 12 is a flow diagram illustrating a method for receiving modification to a selected low bitrate video and generating a modification signal for synchronizing modifications to high bitrate video.

Referring to FIG. 12, a method (or process) 650 is shown. The method 650 may receive modification to a selected low bitrate video and generate a modification signal for synchronizing modifications to high bitrate video. The method 650 generally comprises a step (or state) 652, a step (or state) 654, a decision step (or state) 656, a step (or state) 658, a decision step (or state) 660, a step (or state) 662, a step (or state) 664, a step (or state) 666, a step (or state) 668, a step (or state) 670, and a step (or state) 672.

The step 652 may start the method 650. In the step 654, the distributed servers 122a-122n may generate a preview of the selected low bitrate video frames 420a-420n. The preview may comprise the selected video frames 540 displayed on the companion app 160. Next, the method 650 may move to the decision step 656.

In the decision step 656, the companion app 160 may determine whether the end user has provided modifications (e.g., the input signal CMD for the modification options 544a-544e). If no modifications have been provided, then the method 650 may return to the step 654. If modifications have been provided, then the method 650 may move to the step 658. In the step 658, the distributed servers 122a-122n may generate a preview of the modified bitrate video frames (e.g., the low bitrate selection 432) for display by the companion app 160. The preview may be generated based on the metadata 422a-422n and the modifications provided as the input signal CMD. Next, the method 650 may move to the decision step 660.

In the decision step 660, the distributed servers 122a-122n may determine whether the end user has confirmed the modifications. For example, the user may select the send button 546 on the companion app 160 to confirm the modifications. If the end user has not confirmed the modifications, then the method 650 may move to the step 662. In the step 662, the companion app 160 may receive additional modifications. Next, the method 650 may return to the step 658. In the decision step 660, if the end user has confirmed the modifications, then the method 650 may move to the step 664.

In the step 664, the distributed servers 122a-122n may determine the metadata 422a-422n that the modifications in the signal CMD apply to (e.g., based on timestamps and/or other indexing information). Next, in the step 666, the distributed servers 122a-122n may generate the modification signal MOD comprising instructions based on the metadata 422a-422n and the modifications in the signal CMD. The modification signal MOD may be presented by the cloud computing server 104 to the appropriate smart security camera lights 102a-102n (e.g., the metadata 422a-422n may indicate which of the smart security lights 102a-102n sent the low bitrate video frames 420a-420n). In the step 668, the cloud computing servers 104 may receive the modified high bitrate video frames 414. One of the smart security camera lights 102a-102n may communicate the signal SYNC to the cloud computing service 104. The modified high bitrate video frames 414 may be stored by the storage servers 120a-120n as the synchronized high bitrate video frames 434. Next, in the step 670, the cloud computing server 104 may communicate the synchronized high bitrate video frames 434 to the end user. The synchronized high bitrate video frames 434 may be sent to the companion app 160 for streaming and/or download by the user device 106 via the signal HBOUT. Next, the method 650 may move to the step 672. The step 672 may end the method 650.

Referring to FIG. 13, a method (or process) 700 is shown. The method 700 may generate index information for high bitrate video frames. The method 700 generally comprises a step (or state) 702, a step (or state) 704, a step (or state) 706, a step (or state) 708, a step (or state) 710, a decision step (or state) 712, a step (or state) 714, a step (or state) 716, a step (or state) 718, a decision step (or state) 720, a step (or state) 722, a step (or state) 724, and a step (or state) 726.

The step 702 may start the method 700. In the step 704, the processor 114 may generate the high bitrate video frames 410a-410n and the low bitrate video frames 420a-420n. Next, in the step 706, the processor 114 may apply the timestamp 454 to the metadata 412a-412n and the metadata 422a-422n. In the step 708, the communication device 308 may upload the low bitrate video frames 420a-420n to the third party monitoring service 210. Next, in the step 710, the processor 114 may apply event IDs detected using the computer vision operations on the high bitrate video frames 410a-410n to the metadata 412a-412n. Next, the method 700 may move to the decision step 712.

In the decision step 712, the processor 114 may determine whether the communication device 308 has received manual tags provided by the third party monitoring service 210. For example, the tags may be manually added as described in association with FIG. 6. If the third party monitoring service 210 has communicated the tags, then the method 700 may move to the step 714. In the step 714, the processor 114 may apply the tags to the metadata 412a-412n. Next, the method 700 may move to the step 716. In the decision step 712, if the third party monitoring service 210 has not provided the manual tags, then the method 700 may move to the step 716.

In the step 716, the processor 114 may index the metadata 412a-412n between the high bitrate video frames 410a-410n and the low bitrate video frames 420a-420n to apply the metadata 422a-422n to the low bitrate video frames 420a-420n (as described in association with FIG. 8). Next, in the step 718, the communication device 308 may upload the low bitrate video frames 420a-420n and the metadata 422a-422n (e.g., the signal LBRVID) to the cloud computing service 104. Next, the method 700 may move to the decision step 720.

In the decision step 720, the processor 114 may determine whether the communication device 308 has received the modification signal MOD. If the communication device 308 has not received the modification signal MOD, then the method 700 may return to the step 704. If the communication device 308 has received the modification signal MOD, then the method 700 may move to the step 722.

In the step 722, the processor 114 may compare the metadata in the modification signal MOD (e.g., comprising the metadata 422b-422d from the low bitrate video frames 420b-420d in the low bitrate selection 432) to the metadata 412a-412n of the high bitrate video frames 410a-410n stored in the local storage 324. Next, in the step 724, the processor 114 may add or remove video frames from the high bitrate video frames 410a-410n based on the comparison of the metadata in the modification signal MOD and the metadata 412a-412n. In the step 726, the communication device 308 may communicate the modified high bitrate video frames 414 to the cloud service 104. The modified high bitrate video frames 414 may be selected and/or modified versions of the high bitrate video frames 410a-410n that have been determined from the modification signal MOD. The modified high bitrate video frames 414 may be communicated as the signal SYNC. Next, the method 700 may return to the step 704.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. A system comprising:
   a smart security device configured to (i) capture pixel data of an area, (ii) generate first video frames at a first bitrate and second video frames at a second bitrate from said pixel data, (iii) analyze said first video frames to detect objects, (iv) store (a) said first video frames, (b) said second video frames and (c) metadata comprising index information for said first video frames and said second video frames, (v) communicate said second video frames and said metadata and (vi) control a light in response to said objects detected; and
   a computing device configured to (i) receive said second video frames and said metadata from said smart security device, (ii) generate an interface configured to enable a search of said second video frames based on said metadata, (iii) receive a video selection input and an input command from a user via said interface, (iv) display a subset of said second video frames using said interface in response to said video selection input and (v) communicate said input command to said smart security device, wherein (a) said subset of said second video frames is selected from said second video frames by matching said video selection input with said metadata, (b) said input command enables said user to select a modification to said first video frames stored on said smart security device using said display of said subset of said second video frames on said interface based on said metadata and (c) said smart security device (i) generates a subset of said first video frames by performing said modification to said first video frames in response to said input command and (ii) communicates said subset of said first video frames to said computing device.

2. The system according to claim 1, wherein said second bitrate comprises said pixel data of said area encoded at a lower bitrate than said first bitrate.

3. The system according to claim 1, wherein said second video frames captured at said second bitrate comprise a lower resolution and a lower frame rate than said first video frames captured at said first bitrate.

4. The system according to claim 1, wherein said smart security device (i) comprises a camera configured to capture said first video frames and (ii) is configured to appear as an outdoor light fixture by generating said light.

5. The system according to claim 1, wherein said metadata is generated by a processor implemented by said smart security device in response to said analysis of said first video frames performed by said processor.

6. The system according to claim 1, wherein (i) said second video frames are presented to a remote user, (ii) said remote user is configured to provide tag input to said second video frames and (iii) said tag input is (a) communicated to said smart security device and (b) used as said metadata for said first video frames.

7. The system according to claim 1, wherein said metadata comprises a timestamp as said index information that associates each of said second video frames to a corresponding one of said first video frames.

8. The system according to claim 7, wherein said subset of said second video frames are selected from said second video frames based on said timestamp that matches a time selection provided as said video selection input.

9. The system according to claim 1, wherein (i) said metadata comprises an event ID as said index information that associates each of said second video frames to a corresponding one of said first video frames and (ii) said event ID corresponds to said objects detected.

10. The system according to claim 9, wherein said event ID comprises at least one of a first alert intrusion, a loiterer alert intrusion, an undeterred intrusion, a detection of a specific person and a detection of a vehicle.

11. The system according to claim 1, wherein (i) said input command comprises said metadata that corresponds to adding a first number of said second video frames to said subset of said second video frames or removing a second number of said second video frames from said subset of said second video frames and (ii) said modification of said first video frames comprises using said metadata to add said first number of said first video frames to said subset of said first video frames or remove said second number of said first video frames from said subset of said first video frames.

12. The system according to claim 1, wherein said subset of said first video frames provides evidence to said user for forensic analysis.

13. The system according to claim 1, wherein said computing device is configured to implement a cloud-based video management system that scales resources based on demand.

14. The system according to claim 1, wherein (i) a frame rate of said second video frames is less than said frame rate of said first video frames and (ii) said index information is configured to associate each of said second video frames to a plurality of said first video frames.

15. An apparatus comprising:
a camera configured to capture pixel data of an area;
a processor configured to (i) process said pixel data arranged as (a) first video frames having a first bitrate and (b) second video frames having a second bitrate, (ii) analyze said first video frames to detect objects, (iii) generate metadata comprising index information for said first video frames and said second video frames, (iv) generate a subset of said first video frames in response to a modification signal and (v) generate a control signal in response to said objects detected;
a storage device configured to store (i) said first video frames, (ii) said second video frames and (iii) said metadata;
a communication device configured to (i) communicate said second video frames and said metadata to a remote device, (ii) communicate said subset of said first video frames to said remote device and (iii) receive said modification signal from said remote device; and
a light configured to be turned off or on in response to said control signal, wherein (a) said modification signal is generated in response to a user selection from said subset of said second video frames, (b) said user selection comprises (i) a start frame and (ii) a number of video frames, (c) said subset of said first video frames comprises said number of video frames starting from said start frame and (d) said user selection is provided to said remote device using an interface generated by said remote device.

16. The apparatus according to claim 15, wherein said apparatus further comprises a wall plate adapter (i) configured as a housing for said camera, said processor, said storage device and said communication device and (ii) configured to connect to a fixture comprising said light.

17. The apparatus according to claim 15, wherein said apparatus is implemented as a smart security floodlight.

18. The apparatus according to claim 15, wherein (i) said light comprises a plurality of light panels configured to output a white light at 10,000 lumens, a red light at 1,000 lumens, and a blue light at 1,000 lumens, (ii) said white light, said red light and said blue light are controlled independently and (iii) control of said light panels comprises turning said light panels on/off, dimming said light panels and strobing said light panels.

19. The apparatus according to claim 15, wherein said processor is configured to (i) generate a plurality of parallel video streams comprising the same video content from said pixel data, (ii) said first video frames and said second video frames comprise two of said plurality of parallel video streams and (iii) each of said plurality of parallel video streams comprise a different bitrate.

* * * * *